(12) United States Patent
Nishimura et al.

(10) Patent No.: US 7,334,022 B2
(45) Date of Patent: Feb. 19, 2008

(54) CONTENT DISTRIBUTION SYSTEM, CONTENT DISTRIBUTION CONTROL SERVER, CONTENT TRANSMISSION PROCESSING CONTROL METHOD, CONTENT TRANSMISSION PROCESSING CONTROL PROGRAM, CONTENT TRANSMISSION PROCESSING CONTROL PROGRAM STORAGE MEDIUM, CONTENT TRANSMISSION DEVICE, CONTENT TRANSMISSION METHOD, CONTENT TRANSMISSION CONTROL PROGRAM AND CONTENT TRANSMISSION CONTROL PROGRAM STORAGE MEDIUM

(75) Inventors: Takanori Nishimura, Kanagawa (JP); Keigo Ihara, Tokyo (JP); Junko Fukuda, Kanagawa (JP); Takahiko Sueyoshi, Tokyo (JP); Takao Yoshimine, Kanagawa (JP)

(73) Assignee: Sony Corporation, Tokyo (JP)

( * ) Notice: Subject to any disclaimer, the term of this patent is extended or adjusted under 35 U.S.C. 154(b) by 690 days.

(21) Appl. No.: 10/143,022

(22) Filed: May 13, 2002

(65) Prior Publication Data

US 2002/0194351 A1 Dec. 19, 2002

(30) Foreign Application Priority Data

May 16, 2001 (JP) ............................. 2001-147137

(51) Int. Cl.
*G06F 15/16* (2006.01)
*G06F 15/173* (2006.01)
*G06F 11/00* (2006.01)

(52) U.S. Cl. ...................... 709/208; 709/203; 709/223; 709/232; 370/231; 370/235

(58) Field of Classification Search ................ 709/226, 709/203, 208, 223, 232; 370/231, 235
See application file for complete search history.

(56) References Cited

U.S. PATENT DOCUMENTS

| | | | | |
|---|---|---|---|---|
| 6,006,264 | A * | 12/1999 | Colby et al. | 709/226 |
| 6,633,570 | B1 * | 10/2003 | Lovell et al. | 370/400 |
| 6,742,023 | B1 * | 5/2004 | Fanning et al. | 709/219 |
| 2002/0157034 | A1 * | 10/2002 | Sagar | 714/4 |

* cited by examiner

*Primary Examiner*—Jason Cardone
*Assistant Examiner*—Tanim Hossain
(74) *Attorney, Agent, or Firm*—Oblon, Spivak, McClelland, Maier & Neustadt, P.C.

(57) ABSTRACT

In a content distribution system, content distribution control server, content transmission processing control method, content transmission processing control program, content transmission processing control program storage medium, content transmission device, content transmission control program, and content transmission control program storage medium, content can be reliably transmitted in accordance with the communication environment of a user terminal. A live casting server 150 of a server reservation control center 5 limits the number of streams by which the user PC 4 performs the parallel transmission of a plurality of live content at different transmission rates, in accordance with the type of circuit, which can previously prevent the user PC 4 from performing the parallel transmission of live content using the untransmittable number of streams, thus making it possible to reliably transmit the live content in accordance with the communication environment of the user PC 4.

50 Claims, 61 Drawing Sheets

160

Welcome to Personal Casting World

- LOGIN
    USER ID:
    PASSWORD:

- MEMBER REGISTRATION
- WHAT'S PERSONAL CASTING TV ?
- TODAY'S LIVE
- PROGRAM GUIDE
- MY CHANNEL
- LIVE RESERVATION
- PICKED-UP PROGRAM
- IMAGE STATION

BE A MEMBER
    USER REGISTRATION IS NECESSARY FOR
    USING PERSONAL CASTING SERVICE

MEMBER REGISTRATION >>>LINK TO REGISTRATION PAGE>>>

WHAT CAN YOU DO IN LIVE DISTRIBUTION?
    EXAMPLES

WHAT IS REQUIRED FOR LIVE DISTRIBUTION?
    CREDIT CARD

TO WATCH LIVE
    REPRODUCTION SOFTWARE IS NECESSARY.
    IF YOU DO NOT HAVE IT, PLEASE PRESS THE
    REPRODUCTION SOFTWARE BUTTON BELOW
    TO DOWNLOAD IT.

DISTRIBUTOR MAY LIMIT VIEWERS OF LIVE BY PASSWORD.
    SUCH LIVE IS FOR ONLY SPECIFIC VIEWERS,
    NOT GENERAL VIEWERS.

PROCEDURE FOR LIVE DISTRIBUTION
    BE A PREMIUM MEMBER
    PLAN LIVE
    RESERVE DISTRIBUTION
    CONFIRM RESERVATION
    CONNECT
    START DISTRIBUTION

```
· PRESENT TIME 15:05 (USED IN SERVICE)

· SPECIAL PROGRAM
   · GENRE
   · TIME      LIVE TITLE   DISTRIBUTOR   OUTLINE  MODE
   · ON DEMAND  MOVIE TITLE  DISTRIBUTOR   OUTLINE  OPEN OR CLOSE

· PRIVATE PROGRAM
   · GENRE
   · TIME     LIVE TITLE   DISTRIBUTOR   OUTLINE  CAPACITY   CLOSE
```

PRESENT TIME 15:08 (USED IN SERVICE)

GENRE: ROCK MUSIC
LIVE TITLE : ○○○○
DISTRIBUTOR (MAIL ADDRESS):△△△@XX.com
HOMEPAGE:http://www.△○△xxx.com
CAPACITY: 50
CLOSE OR OPEN

OUTLINE
· · · · ·
· · · · ·

DETAILED INFORMATION
· · · · ·
· · · · ·

PASSWORD:

| REPRODUCTION | ~175

NOTE: REPRODUCTION SOFTWARE IS NECESSARY
   FOR REPRODUCTION

| REPRODUCTION SOFTWARE | ~176

CLICK AND DOWNLOAD

| JULY ▼ | 2000 |
|---|---|

| SUN | MON | TUE | WED | THR | FRI | SAT |
|---|---|---|---|---|---|---|
|  |  |  |  |  |  | 1 |
| 2 | 3 | 4 | 5 | 6 | 7 | 8 |
| 9 | 10 | 11 | 12 | 13 | 14 | 15 |
| 16 | 17 | 18 | 19 | 20 | 21 | 22 |
| 23 | 24 | 25 | 26 | 27 | 28 | 29 |
| 30 | 31 |  |  |  |  |  |

THIS WEEK'S PROGRAMS

SPECIAL PROGRAM
JULY 5, 2000
   TIME   GENRE   LIVE TITLE   DISTRIBUTOR   OUTLINE   OPEN
   TIME   GENRE   MOVIE TITLE   DISTRIBUTOR   OUTLINE   OPEN

LIVE CHANNEL
JULY 5, 2000
   GENRE   TIME   LIVE TITLE   DISTRIBUTOR   OUTLINe   CAPACITY   PRIVATE

| CONTENTS OF RESERVATION | USER ID | CHARGING FLAG INFORMATION | RESERVATION ID |
|---|---|---|---|
| ・○ DAY ○ MONTH △:□—□:△<br>・2ch<br>・○△Kbps<br>. . . | ○○○○ | YES | ××××|
| ・× DAY △ MONTH ○:×—○:△<br>・4ch<br>・△□Kbps<br>. . . | ×△○○ | NO | △△△△ |
| | | | |
| | | | |

INPUT SCREEN FOR BEING A MEMBER          210

| INPUT ITEM | INPUT FIELD |
|---|---|
| NAME (CHINESE CHARACTER)<br>(ROMAN LETTERS)<br>DESIRED USER ID<br>PASSWORD<br>E-MAIL ADRESS<br>DO YOU WANT TO DISCLOSE<br>MAIL ADDRESS? | △○ 太郎<br>○○ TAROU<br>○○○○<br>× × × ×<br>△△△@○○.COM<br>YES |

PLEASE CHECK THE CHECK BOX AND ANSWER
THE FOLLOWING INPUT ITEMS
IF YOU ARE A PREMIUM MEMBER.

PREMIUM MEMBER ☑          211

| INPUT ITEM | INPUT FIELD |
|---|---|
| ADDRESS<br>TELEPHONE NUMBER<br>CREDIT CARD NUMBER<br>EXPIRATION DATE OF<br>CREDIT CARD<br>PORTABLE PHONE NUMBER<br>FAX NUMBER | 3-5-5, ○○, CITY,<br>03-1234-5670<br>1234-5678-9102<br>MAY, 2003<br>090-1000-2000<br>03-1234-5671 |

( CANCEL )     ( REGISTER )
    212              213

```
NEW RESERVATION:
SETTING OF TITLE, DISTRIBUTION ENVIRONMENT AND OPTIONS

PROGRAM TITLE (THIS CAN BE CHANGED LATER IN EDITING PROGRAM)
    [                    ]

DISTRIBUTION ENVIRONMENT
    [                                            ▼]                441

DO YOU WANT TO ADVERTISE THIS LIVE AS SPECIAL LIVE IN
PERCAS TV TOP PAGE? (¥500 EXCL. TAX)
IF YOU CHECK HERE, YOU CAN NOT CANCEL THIS RESERVATION.
YOU CAN SELECT THE CONTENTS OF PICKUP AND WHETHER TO
ADVERTISE IT OR NOT, IN EDITING PROGRAM.
 ○ DESIER    ⦿ NOT DESIER

NEXT
RETURN TO MY CHANNEL
```

NEW RESERVATION: TIMETABLE

START DATE [D ▽] DAY [M ▽] MONTH
START TIME [H ▽] HOUR [M ▽] MINUTE
DISTRIBUTION TIME [M ▽] MINUTES
　　　　　　　YOU HAVE "300MINUTES" LEFT FOR DISTRIBUTION
DISTRIBUTION CHANNEL
[CH　　　　　　　　　　　　　　　　　　　　　　▽] CH
　　　　　　　　　　　　　　　　　　　　　　　　450

CONFIRMATION OF RESERVED TIME

| MARCH | APRIL | MAY |
|---|---|---|

| SUN | MON | TUE | WED | THR | FRI | SAT |
|---|---|---|---|---|---|---|
|  |  |  |  |  | 1 | 2 | 3 |
| 4 | 5 | 6 | 7 | 8 | 9 | 10 |
| 11 | 12 | 13 | 14 | 15 | 16 | 17 |
| 18 | 19 | 20 | 21 | 22 | 23 | 24 |
| 25 | 26 | 27 | 28 | 29 | 30 | 31 |

| SUN | MON | TUE | WED | THR | FRI | SAT |
|---|---|---|---|---|---|---|
| 1 | 2 | 3 | 4 | 5 | 6 | 7 |
| 8 | 9 | 10 | 11 | 12 | 13 | 14 |
| 15 | 16 | 17 | 18 | 19 | 20 | 21 |
| 22 | 23 | 24 | 25 | 26 | 27 | 28 |
| 29 | 30 | 31 |  |  |  |  |

| SUN | MON | TUE | WED | THR | FRI | SAT |
|---|---|---|---|---|---|---|
|  |  |  | 1 | 2 | 3 | 4 | 5 |
| 6 | 7 | 8 | 9 | 10 | 11 | 12 |
| 13 | 14 | 15 | 16 | 17 | 18 | 19 |
| 20 | 21 | 22 | 23 | 24 | 25 | 26 |
| 27 | 28 | 29 | 30 | 31 |  |  |

443

NEXT
RETURN TO MY CHANNEL

222 — [
PUBLIC LEVEL:PULIC PASSWORD(      ) SECERT(      )
·TITLE:××××LIVE
·GENRE:MUSIC
·E-MAIL DISCLOSURE:YES   NO
·WEB DISCLOSURE:YES(URL         ) NO
·PASSWORD:PASSWORD
·FRIEND LIST
   E-MAIL ADRESS(        )(        )(        )
·OUTLINE:WHTIN 20 LETTERS
·DETAILS:WITHIN 200 LETTERS 223   224

RESERVATION  CANCEL

403

- USER ID
- CHANNEL: CHANNEL 1 (CAPACITY 5)
- RESERVED DATE AND TIME  MARCH 30  12:00-12:10
- PUBLIC LEVEL : PUBLIC PASSWORD(× × × × ×)  SECRET(× × × × ×)
- TITLE : × × × ×  LIVE
- GENRE: MUSIC
- E-MAIL DISCLOSURE :  YES  NO
- WEB DISCLOSURE :  YES (URL      )  NO
- PASSWORD:PASSWORD
- FRIEND LIST
- E-MAIL ADDRESS(○○@××.com) (△△@××.com) (××@○○.com)
- OUTLINE: WITHIN 20 LETTERS
- DETAILS: WITHIN 200 LETTERS FEE: ¥1500
TELEPHONE CHARGE FOR CONNECTING TO ACCESS PORT IS CHARGED
BY A TELECOMMUNICATION CARRIER, OTHER THAN THE ABOVE FEE.

△△△@○○○.com
PLEASE CHECK THE ABOVE MAIL ADDRESS.
WE WILL SEND RESERVATION ID TO THE ABOVE MAIL ADDRESS.
PLEASE MAKE A RECONFIRMATION ON MY CHANNEL PAGE BY
6 HOURS BEFORE DISTRIBUTION, AFTER OBTAINING RESERVATION ID.
THIS RESERVATION IS CANCELED IF YOU DO NOT MAKE A
RECONFIRMATION.

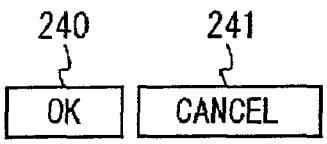

NEW RESERVATION: COMPLETED

THANK YOU FOR RESERVATION

PLEASE CHECK MAIL AND MAKE A RECONFIRMATION ON MY CHANNEL PAGE WITH CORRESPONDING PC

RETURN TO MY CHANNEL

245

| O K |

MY CHANNEL

RESERVATION LIST  /250
RESERVED DATE AND TIME, CHANNEL, TITLE,
WAITING FOR RECONFIRMATION, CANCEL

IF YOU WANT TO CHANGE DATE, TIME, OR CHANNEL,
PLEASE CANCEL RESERVATION AND MAKE A NEW RESERVATION.

NUMBER OF VIEWERS  /251
YOU CAN CONFIRM DATA OF THE NUMBER OF VIEWERS OF
CONTENTS WHICH HAVE BEEN DISTRIBUTED SO FAR.

CHANGE REGISTRATION INFORMATION FILE  /252
YOU CAN CHANGE USER INFORMATION

- USER ID
- CHANNEL: CHANNEL 1 (CAPACITY 5)
- RESERVED DATE AND TIME  MARCH 30 12:00-12:10
- PUBLIC LEVEL : PUBLIC PASSWORD(× × × × ×)  SECRET(× × × × ×)
- TITLE : × × × × LIVE
- GENRE : MUSIC
- E-MAIL DISCLOSURE :  YES  NO
- WEB DISCLOSURE :  YES (URL  )  NO
- PASSWORD:PASSWORD
- FRIEND LIST
- E-MAIL ADDRESS(○○@× ×.com) (△△@× ×.com) (× ×@○○.com)
- OUTLINE: WITHIN 20 LETTERS
- DETAILS: WITHIN 200 LETTERS

RESERVATION ID:

ENTER RESERVATION ID YOU RECEIVED VIA MAIL
PLEASE CANCEL THIS RESERVATION AND MAKE A NEW RESERVATION
IF YOU WANT TO CHANGE DATE, TIME OR CHANNEL.

PLEASE MAKE A RECONFIRMATION WITH CORRESPONDING PC BECAUSE
THE PC CONNECTION SETTING IS AUTOMATICALLY REGISTERED BY
PRESSING RECONFIRM BUTTON.

261  262
[RECONFIRM]  [RETURN]

NEW RESERVATION: ENTER CARD INFORMATION
452 RESERVATION CONTENTS DISPLAY FIELD

| RESERVED DATE | RESERVED TIME ZONE | DISTRIBUTION CH | DISTRIBUTION TIME | FEE |
|---|---|---|---|---|
| 03/30 | 12:00~12:10 | 1ch | 10 MINUTES | ¥1500 |

| TYPE OF CARD | ▓▓▓▓▓▓▓▓ ▽ |
|---|---|
| CARD NUMBER | ☐ (ONE-BYTE LETTER, DO NOT INCLUDE HYPHENATION) |
| EXPIRATION DATE | M ▽ MONTH  Y ▽ YEAR |

453 CARD INFORMATION INPUT FIELD

RESERVE
RETURN TO PAGE FOR SETTING RESERVED DATE AND TIME
RETURN TO MY CHANNEL

NEW RESERVATION CARD AUTHORITY

WE ARE NOW AUTHORIZING CREDIT INFORMATION.
PLEASE WAIT.

```
RESERVATION ID:○○○○
RESERVED DATE AND TIME FOR LIVE DISTRIBUTION:
    2001:03:30:12:00:00-2001:03:30:12:10:00
SERVER CONNECTABLE TIME FOR LIVE:
    2001:03:30:11:55:00-2001:03:30:12:15:00

TELEPHONE NUMBER FOR CONNECTION
    CARRIER 01:03-1234-5670
    CARRIER 02:03-1234-5671
    CARRIER 03:03-1234-5672
    CARRIER 04:03-1234-5673
SERVER INFORMATION FOR CONNECTION DESTINATION
    TYPE OF SERVER:RealServer5
    SERVER NAME:LiveServer.com
    CONNECTION PORT:555
    STREAM PATH TO SERVER:/channel1/stream.rm
ADDRESS INFORMATION FOR DISTRIBUTION REQUEST:
    rtsp//liveserver.com:554/channel1/stream.rm
TRANSMISSION BAND:    20kbps, 34kbps, 45kbps, 80kbps, 220kbps
TITLE:××××LIVE
OUTLINE:··········
PUBLIC LEVEL:·········
ADDRESS INFORMATION IN FRIEND LIST
    LIST01:○○@××.com
    LIST02:△△@××.co.jp
    LIST03:××@○○.com
PASSWORD FOR DISTRIBUTION REQUEST:×××××
```

FIG. 38

```
1   ReservationID=A0000123
    Content=A0000123
    ContentType=LiveReservation
    LiveReservationTime=2001:03:30:11:55:00-2001:03:30:12:00:00-2001:03:30:12:10:00
5   PPPReservationTime=2001:03:30:11:55:00-2001:03:30:12:15:00
    InternetConnection=Yes
    PPPUserID=aaaa
    PPPUserPassword=bbbb
    CarrierName0=ANALOG(NTT)
10  CarrierName1=ISDN(NTT)
    CarrierName2=PHS64k(DDI)
    CarrierName3=PHS32k(DDI)
    CarrierTelephoneNumber0=03-12345670
    CarrierTelephoneNumber1=03-12345671
15  CarrierTelephoneNumber2=03-12345672
    CarrierTelephoneNumber3=03-12345673
    CarrierMaxBandWidth0=33600
    CarrierMaxBandWidth1=64000
    CarrierMaxBandWidth2=58400
20  CarrierMaxBandWidth3=29200
    NTPServer0=NtpServer.com
    NTPServer1=Internet1.NtpServer.com; Internet2.NtpServer.com;
    NTPServerPort0=123
    NTPServerPort1=123;123;
25  LiveServerUserID=aaaa
    LiveServerUserPassword=bbbb
    LiveServerType=RealServer5
    LiveServerName0=LiveServer.com
    LiveServerName1=Internet.LiveServer.com
30  LiveServerPort0=4040
    LiveServerPort1=4040
    LiveServerStreamPath0=/channel1/stream.rm
    LiveServerStreamPath1=/channel1/stream.rm
    LiveServerStreamPath0=rtsp://liveserver.com:554/channel1/stream.rm
35  LiveServerStreamPath1=rtsp://liveserver.com:554/channel1/stream.rm
    LiveServerMaxBandWidth0=65536
    LiveServerMaxBandWidth1=250000
    LiveMultiStream=yes
    LiveRealServerMultiStreamMax=3
40  LiveRealServerMultiStreamTypeMask=0x001f
    LiveRealServerMultiStreamTypeMaskMust=0x0001
    LiveRealServerMultiStreamTypeMaskDefault=0x0005
    Title=TEST STREAM
    Description=TEST STREAM.¥nTHIS STREAM IS FOR PRESENT SCENERY AROUND THE OFFICE
45  OpenType=Open
    Friends=nishy@aaa.com, ihara@bbb.com
```

FIG. 39

0x0001 : 20kbps
0x0002 : 34kbps
0x0004 : 45kbps
0x0008 : 80kbps
0x0010 : 220kbps

```
NEW RESERVATION : SETTING FOR CONNECTION

AUTOMATIC SETTING
DOWNLOAD RESERVATION FILE
```

16:16 (USED IN SERVICE)
16:09 (IN YOUR PC)

RESERVATION HAS BEEN ACCEPTED.
AS SEEN ABOVE, THERE IS DIFFERENCE BETWEEN TIME TO BE
USED IN SERVICE AND TIME OF YOUR PC.
DISTRIBUTION SHOULD START BASED ON TIME TO BE USED IN
SERVICE.
YOU CAN HAVE AN ACCESS TO SITE AFTER 5 MIN. BEFORE THE
RESERVED TIME.

IF YOU USE A DIAL-UP ROUTER, PLEASE REGISTER THE FOLLOWINGS
AS A DIAL DESTINATION. IN THIS CASE, YOU CAN USE ONLY THE
ISDN CONNECTION.

ISDN ACCESS PORT NUMBER:03-1234-5679
LOGIN ID:RESERVATION ID
PASSWORD:× × × × × × ×

291

| OK |

SENDER:PERSONAL CASTING SERVICE
DATE AND TIME:AT 17:15 ON JULY 3, 2000
RECEIVER:△△@××.co.jp
RE:INFORMATION OF LIVE DISTRIBUTION
ATTACHMENT:

LIVE DISTRIBUTION IS HELD BY MR./MS.○○○(USER NAME)

·DISTRIBUTION DATE AND TIME  12:00 TO 12:10 ON MARCH 30
·TITLE:××××LIVE
·ADDRESS FOR DISTRIBUTION REQUEST:
    rtsp//liveserver.com:554/channel1/stream.rm
·PASSWORD:××××××

MY CHANNEL

RESERVATION LIST /350          310  311

RESERVED DATE AND TIME, CHANNEL, TITLE, RECONFIRMED, CHANGE, CANCEL

IF YOU WANT TO CHANGE DATE, TIME OR CHANNEL, PLEASE CANCEL
THE RESERVATION AND MAKE A NEW RESERVATION

NUMBER OF VIEWERS /351
YOU CAN SEE DATA ON THE NUMBER OF VIEWERS OF LIVE PROGRAMS
WHICH HAVE BEEN DISTRIBUTED SO FAR

CHANGE REGISTRATION INFORMATION FILE /352
YOU CAN CHANGE THE USER INFORMATION

- USER ID
- CHANNEL: CHANNEL 1 (CAPACITY 5)
- RESERVED DATE AND TIME  MARCH 30 12:00-12:10
- PUBLIC LEVEL : PUBLIC  PASSWORD(× × × × ×)  SECRET(× × × × ×)
- TITLE : × × × × LIVE
- GENRE :   MUSIC
- E-MAIL DISCLOSURE :   YES   NO
- WEB DISCLOSURE :   YES  (URL         )   NO
- PASSWORD:PASSWORD
- FRIEND LIST
- E-MAIL ADDRESS(○○@××.com) (△△@××.com) (××@○○.com)
- OUTLINE: WITHIN 20 LETTERS
- DETAILS: WITHIN 200 LETTERS

RESERVATION ID:

ENTER RESERVATION ID YOU RECEIVED VIA A MAIL.
IF YOU WANT TO CHANGE DATE, TIME OR CHANNEL, PLEASE CANCEL
THIS RESERVATION AND MAKE A NEW RESERVATION.

321  322

[UPDATE] [RETURN]

17:08 (USED IN SERVICE)
17:11 (IN YOUR PC)

CHANGE HAS BEEN ACCEPTED.
AS SEEN ABOVE, THERE IS DIFFERENCE BETWEEN TIME TO BE
USED IN SERVICE AND TIME OF YOUR PC.
DISTRIBUTION SHOULD START BASED ON TIME TO BE USED IN
SERVICE.
YOU CAN HAVE AN ACCESS TO SITE AFTER 5 MIN. BEFORE
THE RESERVED TIME.

IF YOU USE A DIAL-UP ROUTER, PLEASE REGISTER THE FOLLOWINGS
AS A DIAL DESTINATION. IN THIS CASE, YOU CAN USE ONLY THE
ISDN CONNECTION.

ISDN ACCESS PORT NUMBER: 03-1234-5679
LOGIN ID: RESERVATION ID
PASSWORD: × × × × × × × ×

- USER ID
- CHANNEL:  CHANNEL 1 (CAPACITY 5)
- RESERVED DATE AND TIME  MARCH 30 12:00-12:10
- PUBLIC LEVEL : PUBLIC PASSWORD(× × × ×) SECRET(× × × ×)
- TITLE : × × × × LIVE
- GENRE  MUSIC
- E-MAIL DISCLOSURE :  YES  NO
- WEB DISCLOSURE :  YES (URL  )  NO
- PASSWORD:PASSWORD
- FRIEND LIST
- E-MAIL ADDRESS(○○@× ×.com) (△△@× ×.com) (× ×@○○.com)
- OUTLINE: WITHIN 20 LETTERS
- DETAILS: WITHIN 200 LETTERS

THIS RESERVATION IS CANCELLED 341   342
CANCEL  RETURN

RESERVATION HAS BEEN CANCELLED.

- USER ID
- CHANNEL:  CHANNEL 1 (CAPACITY 5)
- RESERVED DATE AND TIME   MARCH 30 12:00-12:10
- PUBLIC LEVEL : PUBLIC PASSWORD(× × × × ×)  SECRET(× × × ×)
- TITLE : × × × × LIVE
- GENRE   MUSIC
- E-MAIL DISTRIBUTION :   YES   NO
- WEB DISTRIBUTION :   YES (URL   )   NO
- PASSWORD:PASSWORD
- FRIEND LIST
- E-MAIL ADDRESS(○○@× ×.com) (△△@× ×.com) (× ×@○○.com)
- OUTLINE: WITHIN 20 LETTERS
- DETAILS: WITHIN 200 LETTERS

RESERVATION ID:

IF YOU USE A DIAL-UP ROUTER, PLEASE REGISTER THE FOLLOWINGS AS A DIAL DESTINATION.  IN THIS CASE, YOU CAN USE ONLY THE ISDN CONNECTION.

ISDN ACCESS PORT NUMBER:03-1234-5679
LOGIN ID:RESERVATION ID
PASSWORD:× × × × × × ×

361 — REGISTER PC CONNECTION SETTING AGAIN
362 — RETUEN

FIG. 49

CONTENT DISTRIBUTION SYSTEM, CONTENT DISTRIBUTION CONTROL SERVER, CONTENT TRANSMISSION PROCESSING CONTROL METHOD, CONTENT TRANSMISSION PROCESSING CONTROL PROGRAM, CONTENT TRANSMISSION PROCESSING CONTROL PROGRAM STORAGE MEDIUM, CONTENT TRANSMISSION DEVICE, CONTENT TRANSMISSION METHOD, CONTENT TRANSMISSION CONTROL PROGRAM AND CONTENT TRANSMISSION CONTROL PROGRAM STORAGE MEDIUM

BACKGROUND OF THE INVENTION

1. Field of the Invention

This invention relates to content distribution, and more particularly, is suitably applied to a computer network system in which live content provided from a user personal computer (PC) connected to the Internet is distributed to clients via a prescribed streaming server.

2. Description of the Related Art

In a computer network system, as a typical method for providing content created by a user via the Internet, the user opens a homepage.

In the case where the user opens a homepage, the user gets a homepage creation program with the user PC, creates the homepage having hyperlinks to a plurality of content, with the homepage creation program, and stores it in a streaming server of an internet service provider (ISP).

Then, the ISP provides the homepage from the streaming server to client's who have got access via the Internet, and in response to clicking on an anchor on the homepage, it provides the content being linked to the anchor.

In addition, the streaming server stores motion pictures and audio, in addition to still pictures, as content which is uploaded with the user PC, and thereby realizing live distribution by stream-distributing, for example, live content composed of motion pictures to clients via the Internet in response to the clients' requests.

In the computer network system having such configuration, in the case where a circuit connecting a user PC and the Internet can be used for the wide band transmission in broadband, the user PC can perform the parallel transmission of a plurality of content at different transmission rates, to a streaming server, and then the streaming server can perform the multistream distribution to plural clients with its stream distribution function.

However, if the user PC has setting of the number of streams exceeding the number of streams capable of performing the parallel transmission of a plurality of content at different transmission rates from the user PC to the streaming server, the transmission of content needs a wider band than the band of the circuit and therefore the transmission of the content may be interrupted, which causes a problem in that the live distribution can not be reliably performed.

SUMMARY OF THE INVENTION

In view of the foregoing, an object of this invention is to provide a content distribution system capable of reliably performing the transmission processing of content according to the communication environment of a user terminal.

The foregoing object and other objects of the invention have been achieved by the provision of a content distribution system which is constructed by connecting user terminals and a content distribution control server for distributing content received by a user terminal, to clients, via a network. A user terminal transmits the type of circuit which can connect the user terminal and the network, to a content distribution control server as circuit-type information, and the content distribution control server limits the number of streams according to the circuit-type information in order that the user terminal can perform the parallel transmission of a plurality of content at different transmission rates to the content distribution control server via the circuit.

The content distribution control server limits the number of streams according to the type of circuit in order that the user terminal performs the parallel transmission of a plurality of content at different transmission rates, thus making it possible to previously prevent the user terminal from performing the parallel transmission of content using the untransmittable number of streams.

Further, in a content distribution system constructed by connecting a content transmission device for providing content and a content distribution control server for distributing content received from the content transmission device, to clients via the network, the content distribution control server receives the type of circuit which can connect the content transmission device and the network, from the content transmission device as circuit-type information, limits according to the circuit-type information the number of streams in order that the content transmission device performs the parallel transmission of a plurality of content at different transmission rates to the content distribution control server via the circuit, and then notifies the content transmission device of the number of streams as setting information, and thereby the content transmission device automatically limits and sets the number of streams for the parallel transmission to the content distribution control server based on the setting information.

The content transmission device receives the number of streams which is limited according to the type of circuit by the content distribution control server, as setting information, and automatically limits and sets the number of streams for the parallel transmission to the content distribution control server based on the number of streams, thus making is possible to previously prevent the content transmission device from performing the parallel transmission of content using the untransmittable number of streams.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 16 is a schematic diagram showing a personal casting service top page screen;

FIG. 17 is a schematic diagram showing a screen explaining an outline of a personal casting service;

FIG. 18 is a schematic diagram showing a live contents showing screen;

FIG. 19 is a schematic diagram showing a live content detailed information screen;

FIG. 20 is a schematic diagram showing a program guide list screen;

FIG. 21 is a schematic diagram showing a reservation table;

FIG. 23 is a schematic diagram showing an input screen for member registration;

FIG. 25 is a schematic diagram showing a distribution environment setting screen;

FIG. 27 is a schematic diagram showing a new reservation setting screen;

FIG. 31 is a schematic diagram showing a reservation confirmation screen;

FIG. 32 is a schematic diagram showing a reservation registration procedure completion screen.

FIG. 34 is a schematic diagram showing a my channel screen;

FIG. 35 is a schematic diagram showing a reconfirm screen;

FIG. 36 is a schematic diagram showing a card information input screen;

FIG. 37 is a schematic diagram showing a card authority screen;

FIG. 38 is a schematic diagram showing a reservation setting information file;

FIG. 39 is a schematic diagram showing the contents of reservation data;

FIG. 40 is a schematic diagram showing selectable transmission rates;

FIG. 41 is a schematic diagram showing a connection setting screen;

FIG. 42 is a schematic diagram showing a reconfirmation completion screen;

FIG. 43 is a schematic diagram showing an e-mail screen;

FIG. 44 is a schematic diagram showing a my channel screen reconfirmed;

FIG. 45 is a schematic diagram showing a reservation setting information changing screen;

FIG. 46 is a schematic diagram showing a changing completion screen;

FIG. 47 is a schematic diagram showing a reservation cancel screen;

FIG. 48 is a schematic diagram showing a cancel notification screen;

FIG. 49 is a schematic diagram showing a reservation confirmation screen;

DETAILED DESCRIPTION OF THE EMBODIMENT

Figure 1:
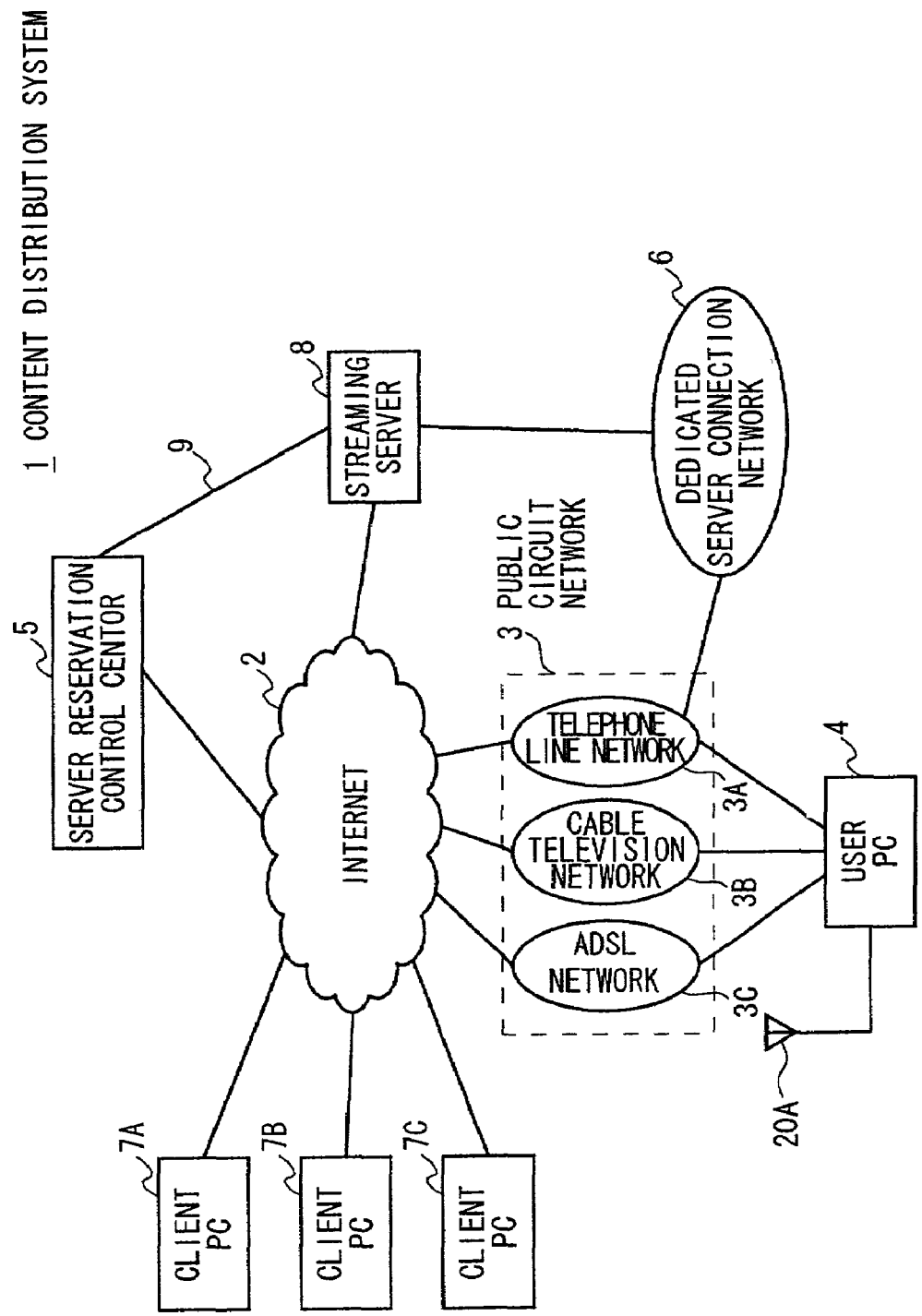
FIG. 1 is a block diagram showing the whole construction of a content distribution system of one embodiment of this invention.

Preferred embodiments of this invention will be described with reference to the accompanying drawings:

(1) Content Distribution System (1-1) Whole Construction of Content Distribution System Referring to FIG. 1, reference numeral 1 shows a content distribution system as a network system of the present invention as a whole, and the content distribution system 1 realizes a personal casting service which will be described later.

This content distribution system 1 comprises a user personal computer (PC) which is owned by a content provider, connected to the Internet 2 via an internet service provider (ISP), not shown, and a public circuit network 3 (telephone line network 3A, cable television network 3B or asymmetric digital subscriber line (ADSL) network 3C), a server reservation control center 5 connected to the Internet 2, and a streaming server 8 for stream-distributing content received from the user PC 4 via the public circuit network 3 or a dedicated server connection network 6, to plural client PCs 7A, 7B and 7C via the Internet 2.

In this arrangement, in the case of transmitting content to the streaming server 8, the user PC 4 establishes a transmission line to the streaming server 8 by performing Point to Point Protocol (PPP) connection to an access port of the dedicated server connection network 6 via, for example, the telephone line network 3A of the public circuit network 3, in order to reliably transmits the content to the streaming server 8 through the transmission line.

Note that, the user PC 4 can also connect to the streaming server 8 via the public circuit network 3, the ISP, and the Internet 2 and in this case, the user PC 4 can transmit content to the streaming server 8 through the transmission line which is optionally selected out of the connectable telephone line network 3A, cable television network 3B, and ADSL network 3C.

The streaming server 8 can stream-distribute the content, which has been received from the user PC 4 via the dedicated server connection network 6 or the Internet 2, to the plural client PCs 7A, 7B and 7C via the Internet 2.

In addition, the streaming server 8 is also connected to the server reservation control center 5 via a dedicated line 9, so as to communicate identification data via the dedicated line 9 for identifying the user PC 4, and the client PCs 7A, 7B and 7C.

Actually, the user PC 4 makes a request for a time zone to use the stream distribution function of the streaming server 8 to the server reservation control center 51 resulting in registering the reservation in the streaming server 8 via the server reservation control center 5.

During the time zone reserved by the user PC 4, while the streaming server 8 receives the content transmitted from the user PC 4 via the dedicated server connection network 6 and stores it in the buffer, it reads the content and performs the stream distribution to the requesting client PCs 7A, 7B and 7C.

As described above, the content distribution system 1 can realize personal broadcasting, that is, a personal casting service of providing content transmitted from the user PC 4, to the client PCs 7A, 7B and 7C via the streaming server 8 within a reserved time zone in real time.

Note that, in the following explanation, this embodiment uses the streaming server 8 having a stream distribution function. However, a server having other various functions can be employed to provide content if it can provide the content in real time.

(1-2) Construction of User PC

A next explanation is about the construction of the user PC 4 which is used for transmitting to the steaming server 8 live content such as a music live shot-by a content provider who is a broadcaster.

Figure 2:
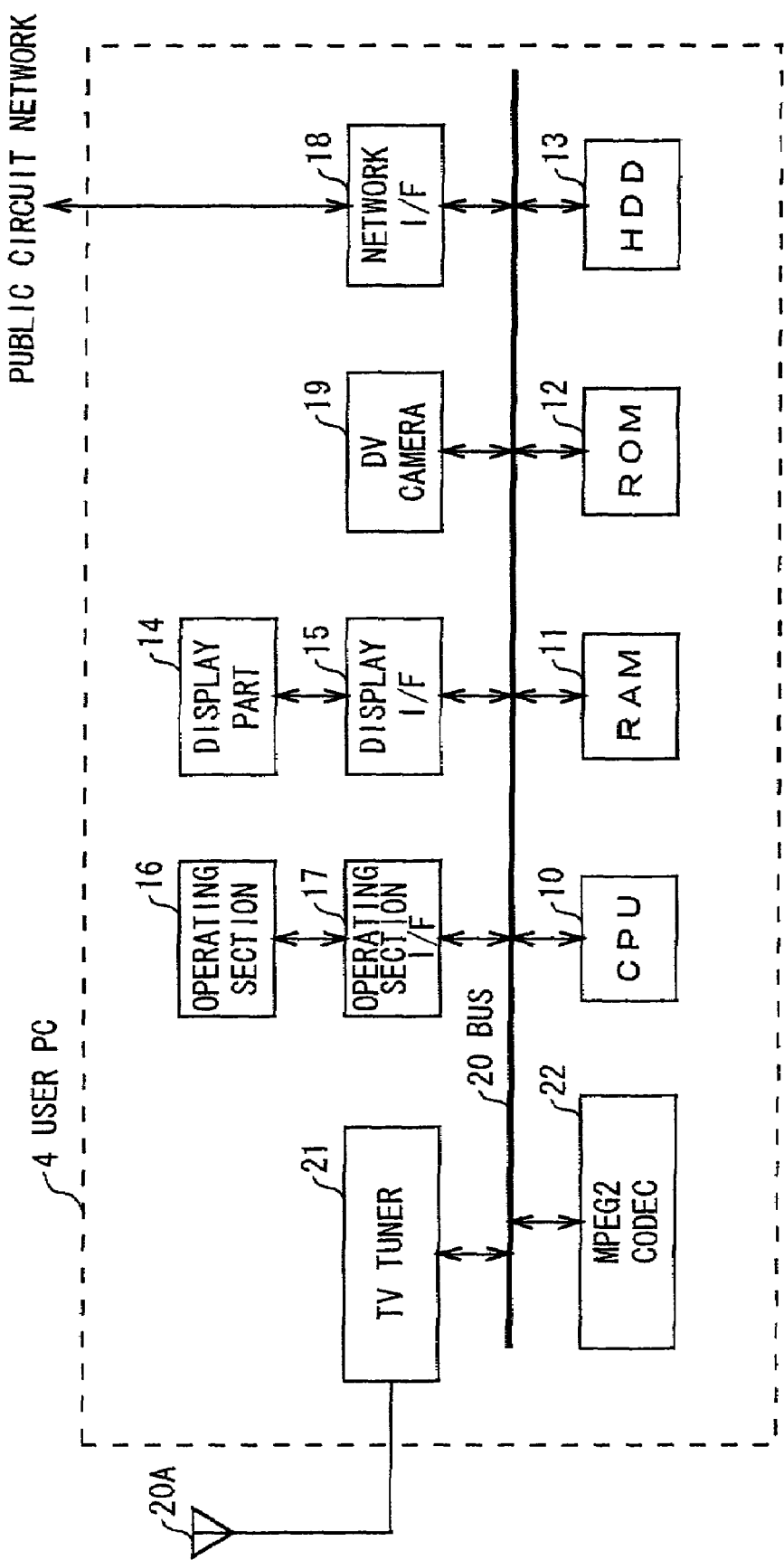
FIG. 2 is a block diagram showing the circuit construction of a user PC.

Referring to FIG. 2, the user PC 4 comprises a central processing unit (CPU) 10 for performing various calculation processing and for controlling each circuit, a random access memory (RAM) 11 serving as a working memory of the CPU 10, a read only memory (ROM) 12 storing a series of programs to be executed by the CPU 10, a hard disk 13 storing programs such as an operating system (for example, "Windows 95/98/2000 (Microsoft corporation)" and application programs, to be executed by the CPU 10, a display part 14 which is a liquid crystal display, for example, for receiving and displaying processing results from the CPU 10 via a bus 20 and display interface 15, an operating section 16 composed of operating buttons such as a keyboard, mouse, jog dial which can be rotated, pressed, described later, for entering commands by a content provider, an operating section interface 17 for transmitting the command entered with the operating section 16, to the CPU 10 via the bus 20, a network interface 18 for communicating data with an external device connected to the Internet 2 (FIG. 1) or the dedicated server connection network 6 via the public circuit network 3, a digital video camera integrally attached to the user PC 4, and an MPEG 2 CODEC 22 for compression-coding live content under the moving picture experts group (MPEG) 2 standard. Note that, the hard disk 13 is also used for storing live content and various control data, and data therein is read/recorded by the CPU 10.

Figure 3A:
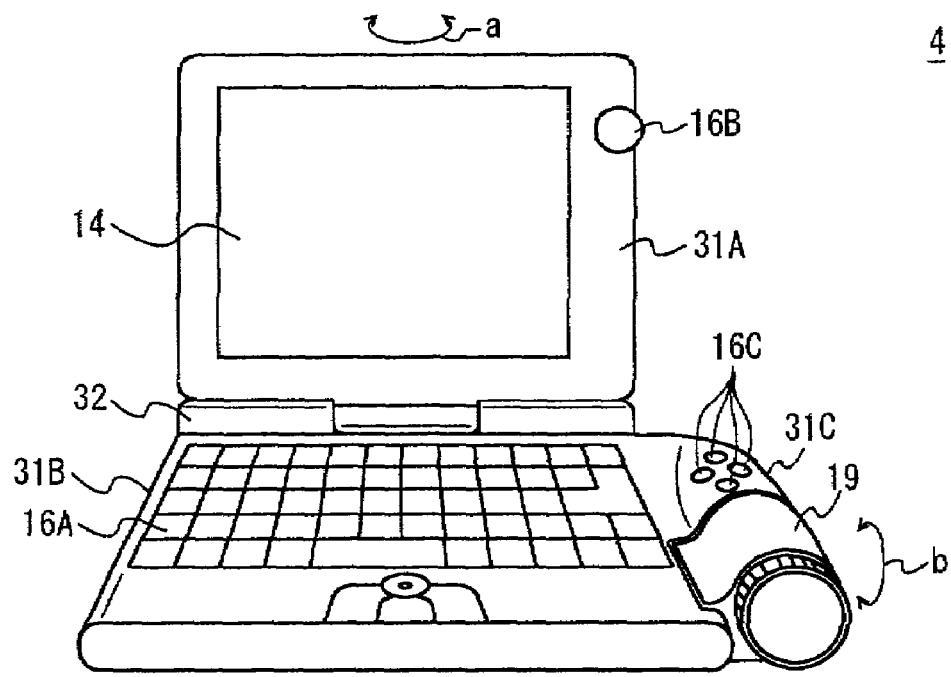
FIGS. 3A and 3B are schematic perspective views showing the external arrangement (1) of the user PC.

The user PC 4 comprises a display case 31A having the display part 14 which is a liquid crystal display and a keyboard case 31B having a keyboard 16A as shown in FIG. 3A, and the cases are connected to each other so as to be turned at a hinge 32.

Figure 3B:
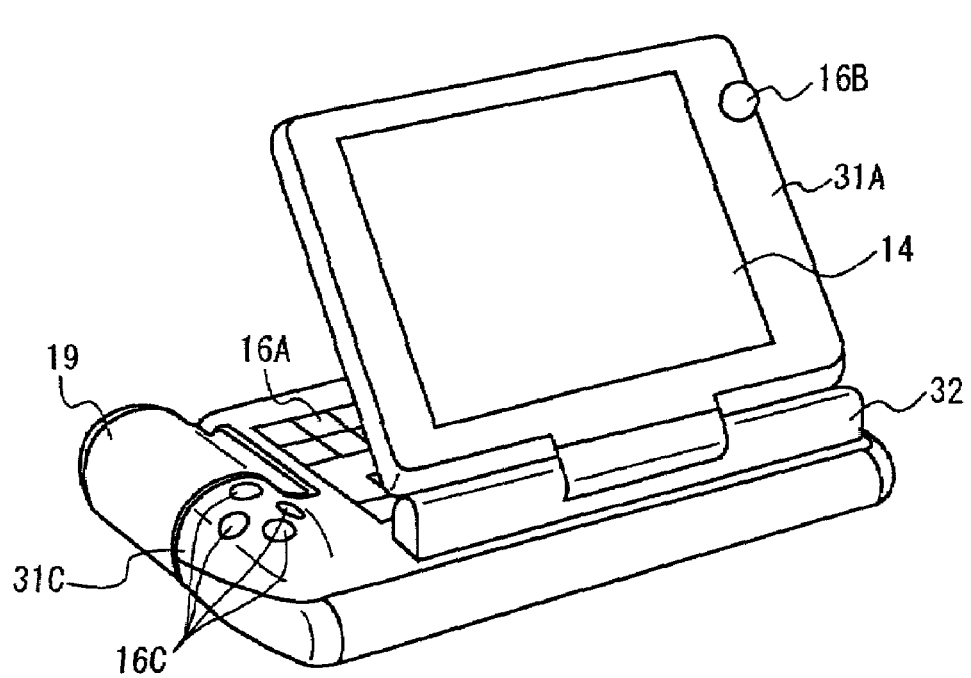

The display case 31A is attached to the keyboard case 31B so as to be turned in a direction shown by an arrow a, and as shown in FIG. 3B, the user PC 4 can be used with the display case 31A turned by 180° and the jog dial 16B which can be rotated, turned, and pressed, is arranged at the upper right end of the display case 31A.

As to the keyboard case 31B, an operating button case 31C having plural (four) operating buttons 16C is attached to the right side of the keyboard case 31B, and a digital video camera 19 is attached at one point on the right side so as to be rotated in a direction shown by an arrow b.

Figure 4A:
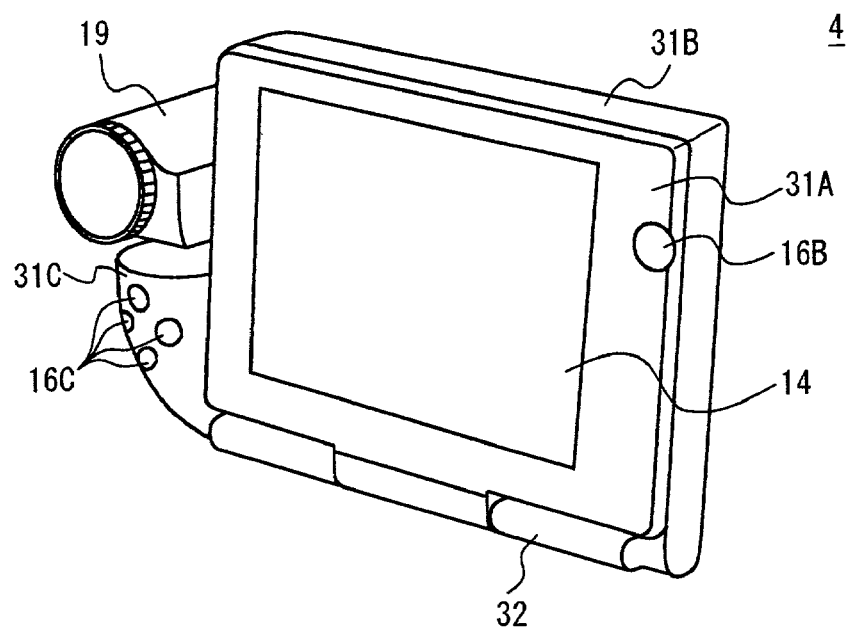
FIGS. 4A and 4B are schematic perspective views showing the external arrangement (2) of the user PC.

Note that, the user PC 4 in a style shown in FIG. 4A can be used, and in this style, a content provider holds the user PC 4, so as to capture the content provider himself with the digital video camera 19. In this case, the content provider can capture a subject while viewing the captured subject on the display part 14 because the display part 14 faces to the content provider.

In the case of using the user PC 4 in such a style, however, the keyboard 16A is positioned behind the display part 14, so that it is difficult for the content provider to correctly operate the keyboard 16A.

Considering this point, the user PC 4 makes it possible to enter a command of capture with the digital video camera 19 and commands relating to the capture (commands such as capture start, stop, zoom, addition of effects, and transmission and storing of contents) with the jog dial 16B and operating buttons 16C.

Figure 4B:
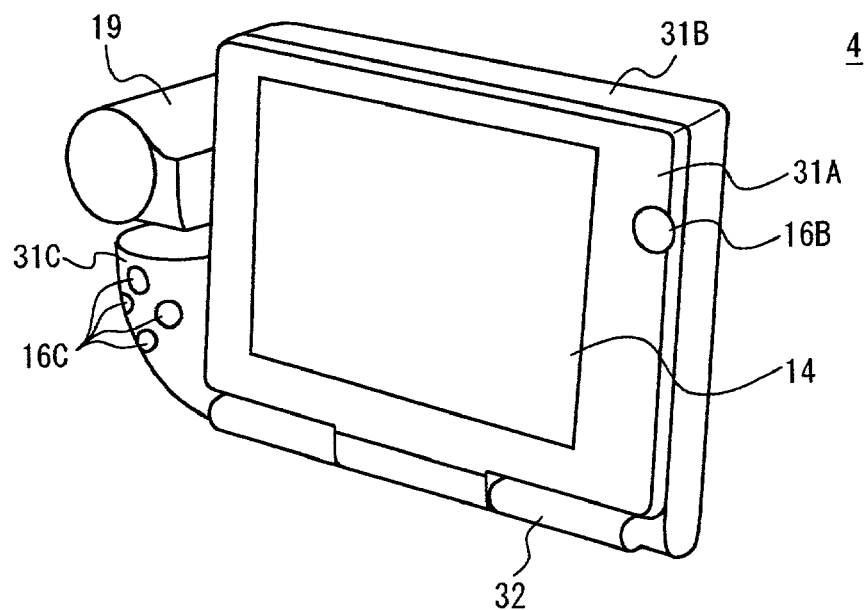

In addition, the user PC 4 in a style shown in FIG. 4B can be used and in this style, the content provider holds the user PC 4, so as to capture a front subject with the digital video camera 19 while viewing the subject on the display part 14.

Actually, in the user PC 4 (FIG. 2), the CPU 10 reads and executes various programs stored in the ROM 12 and the hard disk 13 when the power is turned ON, in order to perform various processing such as capture processing, content processing, transmission of content to the streaming server 8, and World Wide Web (WWW) browsing.

Figure 5:
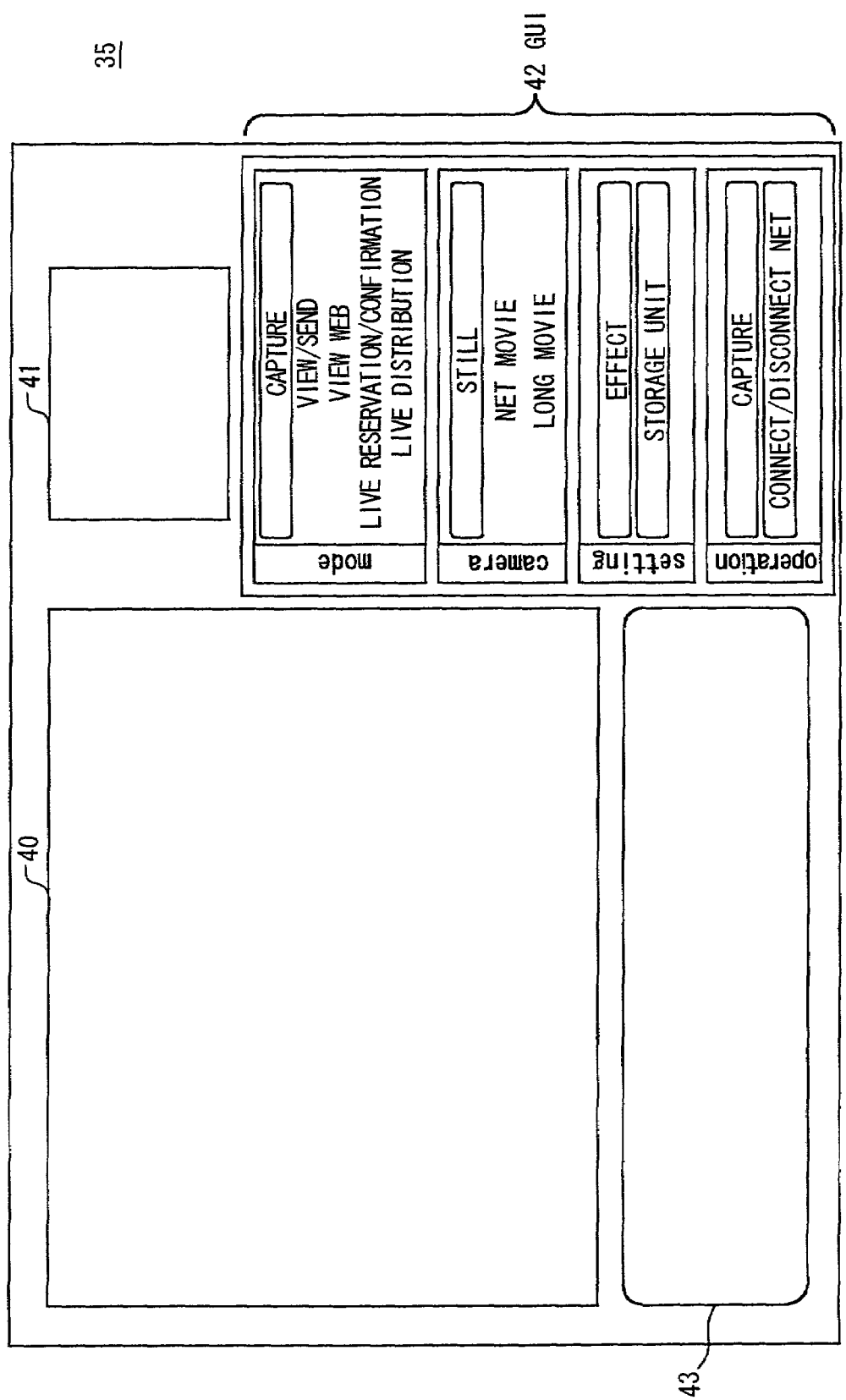
FIG. 5 is a schematic diagram showing an initial screen when the user PC starts an application program.

Hereinafter, explanation is made about various functions which are realized by executing prescribed processing in accordance with the aforementioned various programs by the CPU 10 of the user PC 4. First, the user PC 4 displays an initial screen 35 as shown in FIG. 5 on the display part 14 under the control of the CPU 10.

This initial screen 35 has a large main picture display area 40 for displaying pictures captured with the digital video camera 19, a small sub picture display area 41 for displaying the preview of the last picture captured at the last-time photographing, and under the sub picture display area 41, it has a graphical user interface (GUI) 42 for letting the content provider select a main item: a mode, the type of picture (camera), setting (setting), or command (operation), and also under the main picture display area 40, it has a status window 43 for showing the various conditions of the user PC 4.

The main item "mode" of the GUI 42 has five kinds of selectable modes: a capture mode (a mode when "capture" is selected), an uploading mode (a mode when "view/send" is selected), a Web confirmation mode (a mode when "view web" is selected", a live reservation/confirmation mode (a mode when "live reservation/confirmation" is selected), and a live distribution mode (a mode when "live distribution" is selected). Note that, the capture mode is initially selected when the user PC 4 starts.

Figure 6A:
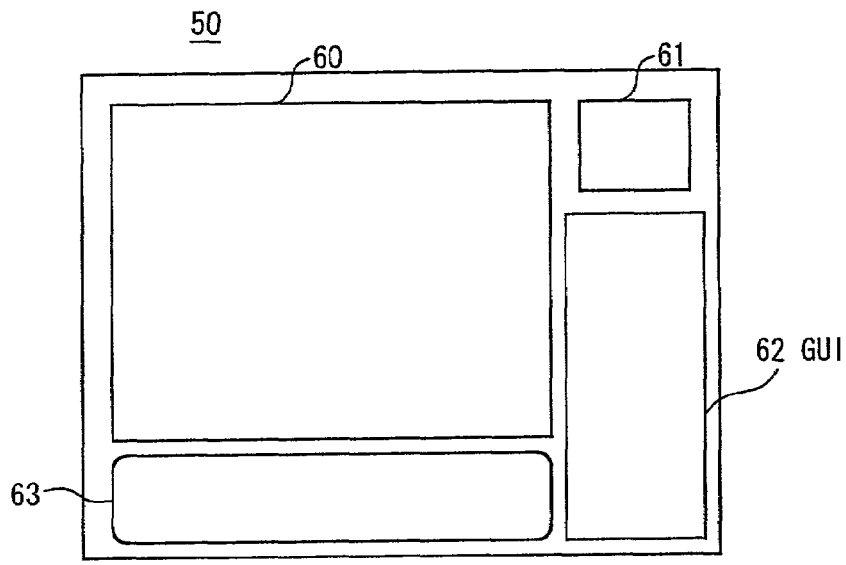
FIGS. 6A and 6B are schematic diagrams showing the entire arrangement of a capture mode screen.

This capture mode is a mode for capture with the digital video camera 19 of the user PC 4, and the CPU 10 displays a capture mode screen 50 as shown in FIG. 6A on the display part 14 when the capture mode is selected or in an initial condition.

This capture mode screen 50 has a main picture display area 60 and a sub picture display area 61, similar to the aforementioned initial screen 35 (FIG. 5), and the main picture display area 60 displays a currently captured picture and the sub picture display area 61 displays the preview of the last picture captured at the last-time photographing.

Figure 6B:
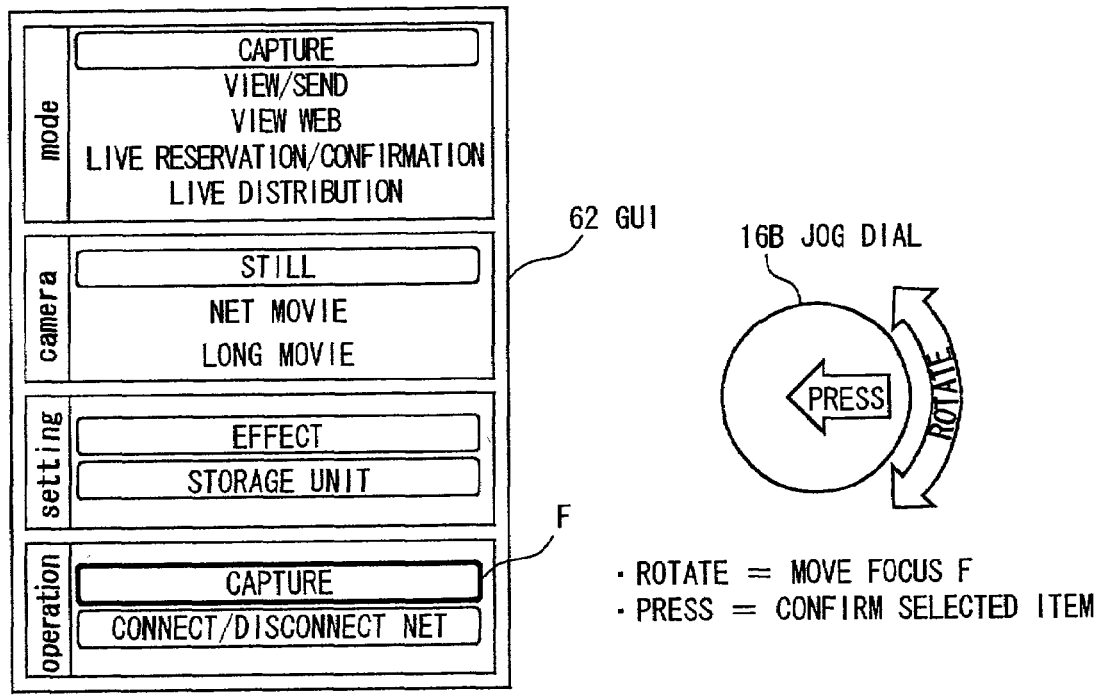

In addition, the capture mode screen 50 has a GUI 162 similar to that of the initial screen 35, and the GUI 162 has main items: "mode", "camera", "setting" and "operation" as shown in FIG. 6B as well.

Each main item has plural sub items, and a desired sub item is selected and confirmed by rotating the jog dial 16B of the display case 31A to move a focus F shown by a thick line frame onto the sub item and then pressing the jog dial 16B.

In addition, in the capture mode, prescribed commands (for example, a command for selecting and confirming an effect time to apply a special effect to the pictures in photographing) are previously assigned to the operating buttons 16C (FIG. 3 and FIG. 4) provided on the operating button case 3C.

Therefore, the content provider can execute various operations in the capture mode only by operating the jog dial 16B or operating buttons 16C, so as to easily perform capture operations even when the keyboard 16A is difficult to operate as shown in FIGS. 4A and 4B.

Note that, in the capture mode, commands for selecting and confirming an effect item to apply its special effect to pictures in photographing are previously assigned to the operating buttons 16C as default. However, the commands can be arbitrarily assigned to the operating buttons 16C or other commands can be assigned to the operating buttons 16C in another mode. In this configuration, the user PC 4 can have improved operability.

In addition, in the capture mode, the status window 63 displays the current conditions of the user PC 4 (for example, a battery level and the capacity of free area of the hard disk 13), the processing status in the currently selected mode (for example, the data size of the currently captured pictures, designated storage unit for picture data, the kinds of commands assigned to the operating buttons 16C and the like).

Figure 7A:
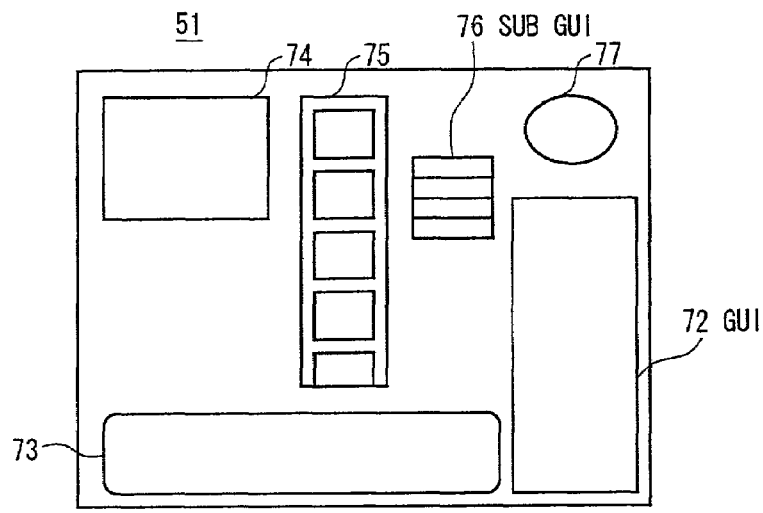
FIGS. 7A-7C are schematic diagrams showing the entire arrangement of an uploading mode screen.

Next, the uploading mode is a mode for allowing the content provider to view the content captured in the aforementioned capture mode, on the display part 14, and for transmitting the picture data of the content to a server (now shown) which is an uploading destination, connected to the Internet 2. The CPU 10 displays the uploading mode screen 51 as shown in FIG. 7A on the display part 14.

This uploading mode screen 51 has a GUI 72 and status window 73 similar to those of the capture mode screen 50 (FIG. 6), and newly has a preview area 74, a list display area 75 for displaying a plurality of main still pictures out of captured content, in a line, and a transmission capsule icon 77.

Figure 7B:
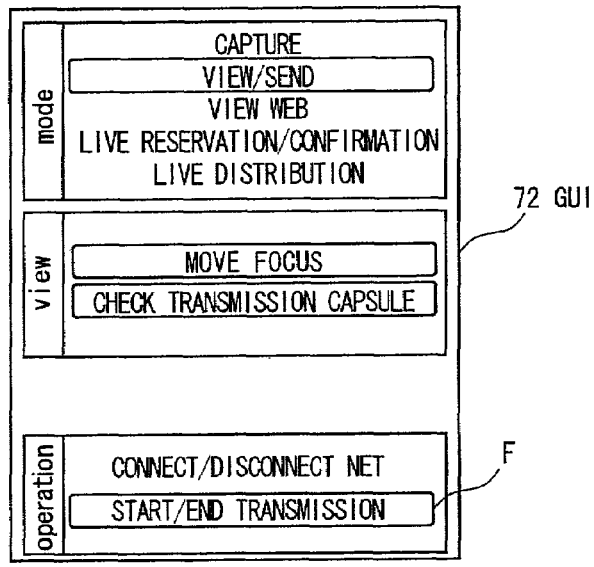

As shown in FIG. 7B, the GUI 172 of the uploading mode screen 51 has "operation" item and "view" item other than "mode" item as shown in FIG. 7B.

The "operation" item has sub items: "connect/disconnect net" for connection to/disconnection from the Internet 2 and "start/end transmission" item for starting/ending the transmission of content. The "view" item has sub items: a "move focus" item for moving the focus F to the list display area 75, and "check transmission capsule" for confirming the contents of the transmission capsule icon 77, that is, for allowing the content provider to confirm a list of contents selected to be transmitted.

Similar to the case of the capture mode screen 50 (FIG. 6), in the CUI 72, a desired sub item is selected and confirmed by rotating the jog dial 16B of the display case 31A to move the focus F onto the sub item and then pressing the jog dial 16B.

In addition, in the uploading mode, commands for the reproduction/stop of content being displayed on the preview area 74 and the display of a still picture are assigned to the operating buttons 16C (FIG. 3 and FIG. 4), and the status window 73 displays a file name, file size and format (Joint Photographic Experts Group (JPEG), MPEG or the like) of picture data, information (server name of uploading destination and its Uniform Resource Locator (URL)) indicating the currently designated transmission destinations, and the like.

When the CPU 10 confirms that the content provider has moved the focus F onto "move focus" item and confirmed the "move focus" item by rotating the jog dial 16B and pressed the jog dial 16B, it moves the focus F onto the list display area 75.

The content provider rotates the jog dial 16B while the focus F is on the list display area 75, in order to move the focus F between the still pictures of the list display area 75. Then, the content provider presses the jog dial 16B while the focus F is on a desired still picture, so as to select the desired still picture and confirm the content to be transmitted with ease.

Figure 7C:
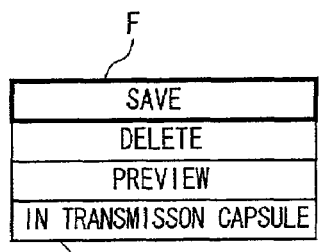

At this point, the CPU 10 displays a sub GUI 76 next to the list display area 75 and moves and displays the focus F onto an item of the sub GUI 76 as shown in FIG. 7C.

The sub GUI 76 has selectable items: "save" item, "delete" item, "preview" item and "in transmission capsule" item. When the "in transmission capsule" item is selected and confirmed with the focus F by rotating and pressing the jog dial 16B, the CPU 10 adds the content selected and confirmed in the list display area 75, to a list of contents of the transmission capsule icon 77 for transmission.

Then, when the content provider returns the focus F to the GUI 72 and selects and confirms the "start/end transmission" item with the focus F, the CPU 10 transmits all contents including the above content added to the transmission capsule icon 77, to the server which is an uploading destination.

Figure 8A:
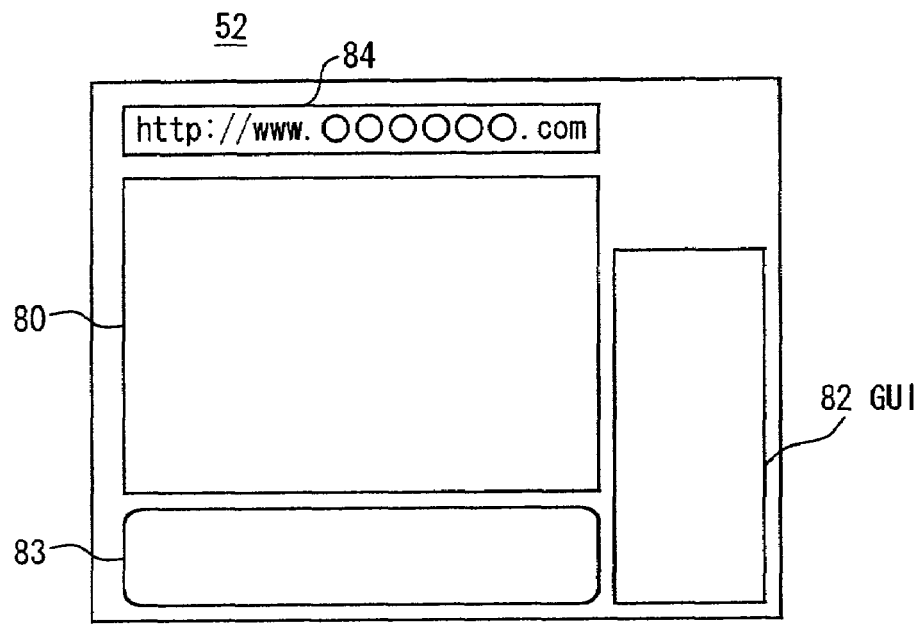
FIGS. 8A and 8B are schematic diagrams showing the entire arrangement of a Web confirmation mode screen.

Next, the Web confirmation mode is a mode for browsing by connecting to the Internet. When the web confirmation mode is selected, the CPU 10 displays a Web confirmation mode screen 52 as shown in FIG. 8A on the display part 14.

This Web confirmation mode screen 52 has a GUI 82 and status window 83 similar to those of the capture mode screen 50 (FIG. 6), and newly has a browser display area 80 for displaying a Web browser and a URL display field 84 for displaying the URL of the resource displayed on the browser display area 80.

In the case of selecting the Web confirmation mode, the CPU 10 reads and executes browser software (for example, Internet Explorer (Microsoft corporation) or Netscape Navigator (Netscape corporation)) from the hard disk 13, in order to display the browsed pictures based on the browser software on the browser display area 80.

Figure 8B:
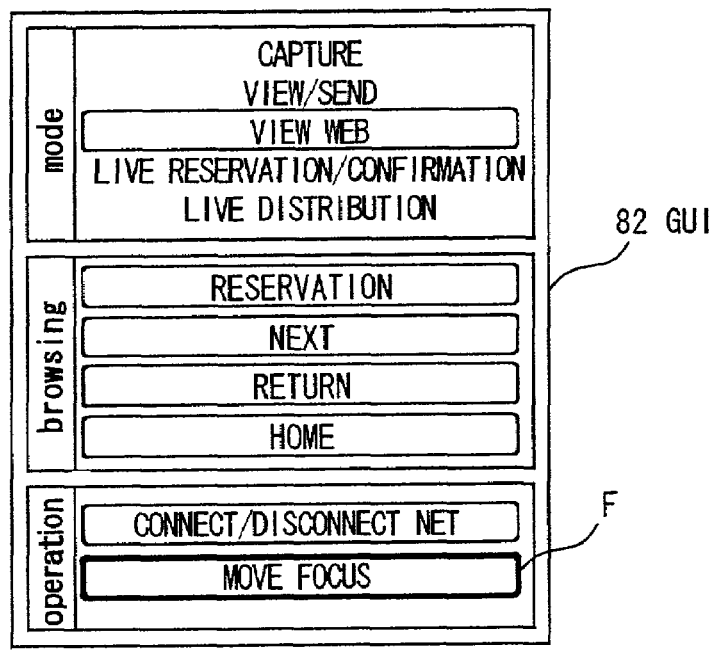

In addition, as shown in FIG. 8B, the GUI 82 of the Web confirmation mode screen 52 has "browsing" item, instead of "setting" item" and "camera" item of the initial screen 35.

This "browsing" item has sub items: "reservation" for jump to a prescribed Web page, "next" item and "return" item for operating browser. In this Web confirmation mode, typical browsing processing can be executed, such as entering an URL for browsing.

Similar to the case of the capture mode screen 50, in the GUI 82, a desired sub item is selected and confirmed by rotating the jog dial 18B of the display case 31A to move the focus F onto the sub item and then pressing of the jog dial 16B.

Figure 9A:
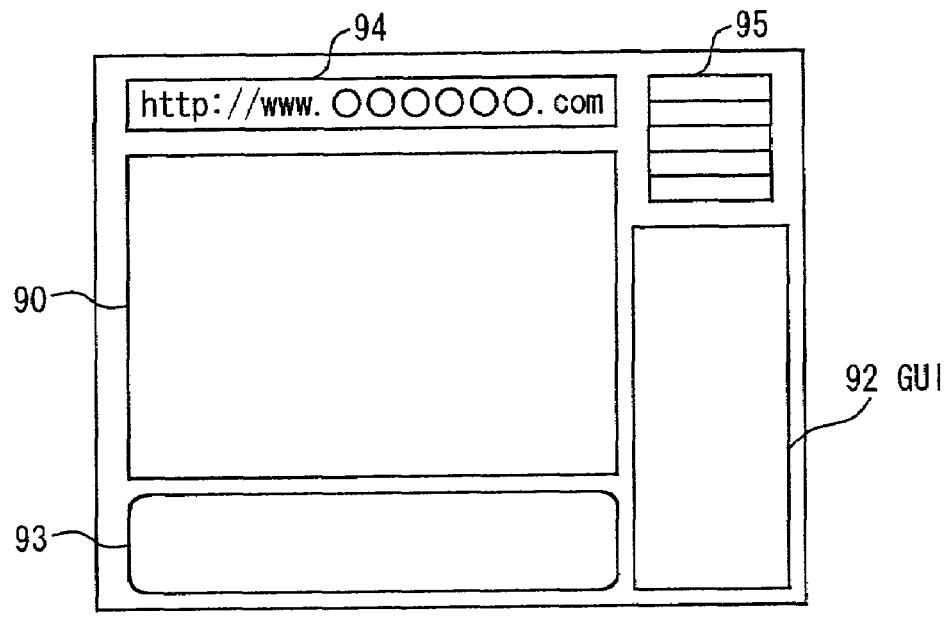
FIGS. 9A and 9B are schematic diagrams showing the entire arrangement of a live reservation/confirmation mode screen.

Next, the live reservation/confirmation mode is a mode for reservation for a time zone to perform personal broadcasting of live content with the stream distribution function of the streaming server 8. When the live reservation/confirmation mode is selected, the CPU 10 displays a live reservation/confirmation mode screen 53 as shown in FIG. 9A on the display part 14.

This live reservation/confirmation mode screen 53 has a browser display area 90, GUI 92, status window 93 and URL display area 94 similar to those of the Web confirmation mode screen 52 (FIG. 8), and newly has a reservation list display area 95.

Figure 9B:
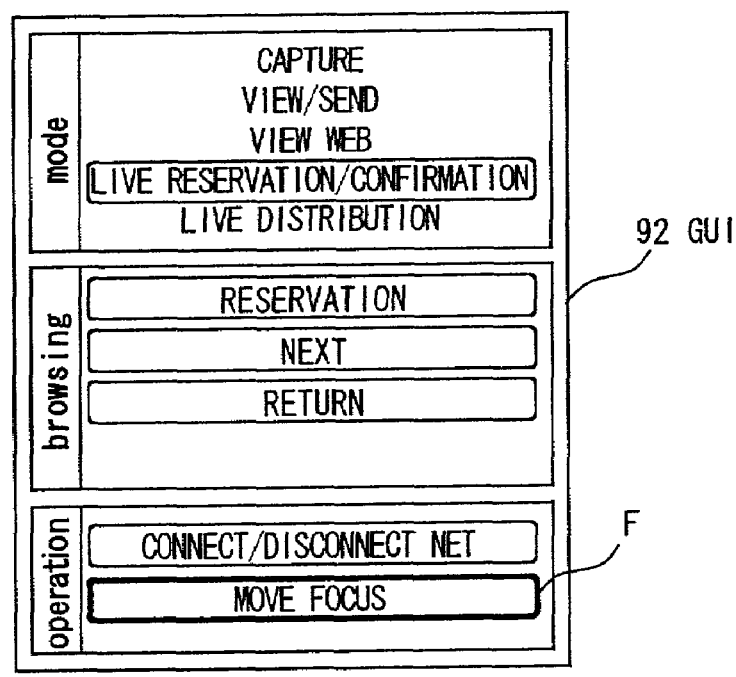

In addition, as shown in FIG. 9B, the GUI 92 of the live reservation/confirmation mode screen 53 has "mode" item, "operation" item and "browsing" item, similar to the GUI 82 of the Web confirmation mode screen 52 (FIG. 8). The "browsing" item has "reservation" item for jump to a Web page for live reservation, "next" item and "return" item for operating browsing and so on.

Similar to the case of the Web confirmation mode screen 52, in the GUI 92, a desired sub item is selected and confirmed by rotating the jog dial 16B of the display case 31A to move the focus F onto the sub item and then pressing the jog dial 16B.

Note that, the Web page for live reservation is a reservation Web page for live reservation which the live casting server, described later, of the server reservation control center 5 has stored in a hard disk thereof.

When the content provider selects and confirms the "reservation" item with the focus F, the CPU 20 of the user PC 4 gets access to the live casting server in the server reservation control center 5, so as to communicate various data relating to live reservation, such as transmitting reservation request information to the live casting server or downloading a live reservation setting information file from the live casting server.

The reservation list display area 95 of the live reservation/confirmation mode screen 53 displays a list of the reserved items of the live reservations registered in the server reservation control center 5, and outline information including a time zone set for each reserved item.

When the content provider selects and confirms an arbitrary reserved item in the reservation list display area 95 with the focus F by rotating and pressing the jog dial 16, the CPU 10 of the user PC 4 controls the live casting server in the server reservation control center 5 to jump to a Web page of a reservation confirmation screen showing the reserved contents of the reserved item. This live reservation processing to be executed between the CPU 10 of the user PC 4 and the server reservation control center 5 will be explained later.

Next, the live distribution mode is a mode for distributing live content captured with the digital video camera 19 of the user PC 4, via the Internet 2 to the client PCs 7A, 7B, and 7C in real time, with the stream distribution function of the steaming server 8, like personal broadcasting.

Figure 10A:
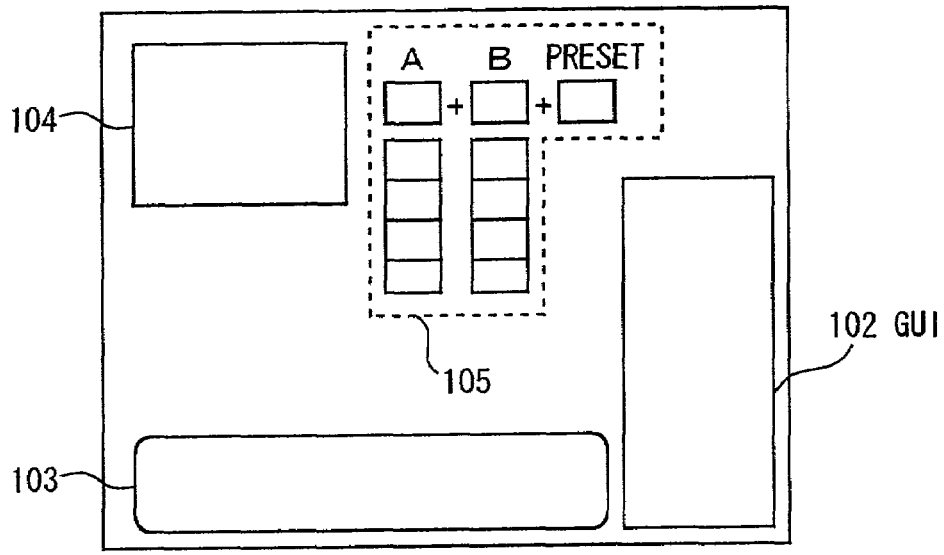
FIGS. 10A and 10B are schematic diagrams showing the entire arrangement of a live distribution mode screen.

Actually, when the content provider selects the live distribution mode, the CPU 10 of the user PC 4 displays the live distribution mode screen 54 as shown in FIG. 10A on the display part 14.

This live distribution mode screen 54 has an effect item display field 105 for selecting special effects to be applied to motion picture data in the live distribution, and a preview picture display area 104 for displaying the effect pictures subjected to the special effect, in addition to a GUI 102 and status window 103. Note that, the effect pictures displayed in the preview picture display area 104 are pictures of content to be actually transmitted to the streaming server 8.

The status window 103 of this case displays distribution information indicating that the live distribution is being performed, live distribution passage time information indicating the passage time after the live distribution starts, time information of the service provider in the personal casting service, time information of the user PC 4, time zone information indicating the reserved start time and end time for the live distribution, picture size information, bit rate information indicating the transmission rate (bit rate) of distribution data, title information of the live content, connection-destination information indicating the streaming server 8 being connected and its channel, viewer information indicating the number of client PCs 7A, 7B and 7C which are receiving the live content being stream-distributed from the streaming server 8, and so on.

Figure 10B:
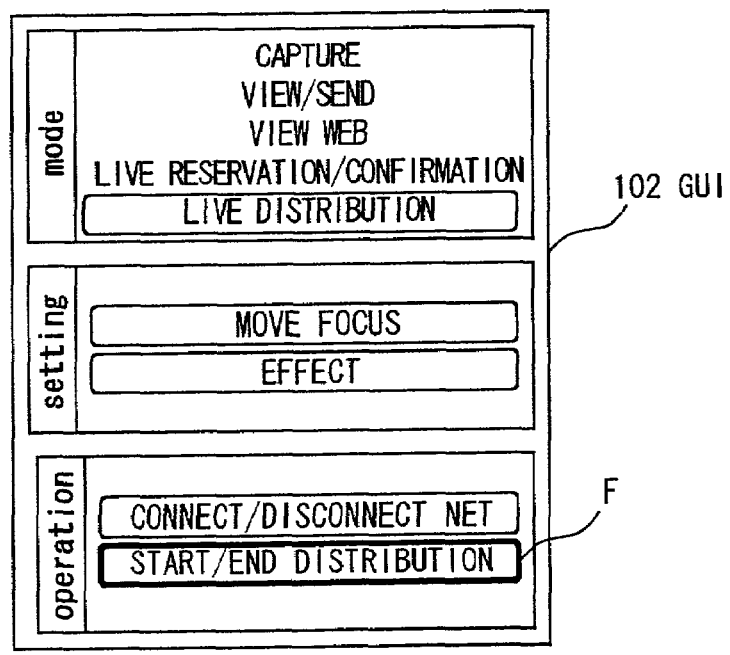

In addition, as shown in FIG. 10B, the GUI 102 of the live distribution mode screen 54 has "mode" item, "operation" item and "setting" item. And the "operation" item has "connect/disconnect net" item for connecting to/disconnecting from the Internet 2, and "start/end distribution" item for starting/ending live distribution.

Further, the "setting" item has sub items: "effect setting" item for selecting special effects to be applied to motion picture data of live content, and "move focus" item for moving the focus F onto the effect item display field 105.

Note that, the "effect setting" item is for selecting effect items to be applied to the motion picture data of live content and displaying the selected effect items in the effect item display field 105.

Furthermore, in the "move-focus" item, the focus F is firstly moved on the effect item display field, and then a desired sub item is selected and confirmed by rotating the jog dial 16B to move the focus F onto the sub item in the effect item display field 105, and then pressing the jog dial 16B.

When "start/end distribution" item is selected and confirmed with the focus F by rotating and pressing the jog dial 16B, the CPU 10 of the user PC 4 establishes a transmission line with the streaming server 8 by the dedicated line connection via the dedicated server connection network 6 or by the Internet connection via the Internet 2, in accordance with the reservation setting information file for live distribution which is supplied from the live casting server in the server reservation control center 5 in the aforementioned live reservation/confirmation mode.

Then, the CPU 10 of the user PC 4 transmits the motion picture data of the live content captured with the digital video camera 19 to the streaming server 8 in real time based on the contents (for example, data transmission rate and so on) of the reservation setting information file. Note that, the communication connection processing and the transmission processing of live content after the communication connection between the CPU 10 of the user PC 4 and the streaming server 8 will be described later.

Figure 11:
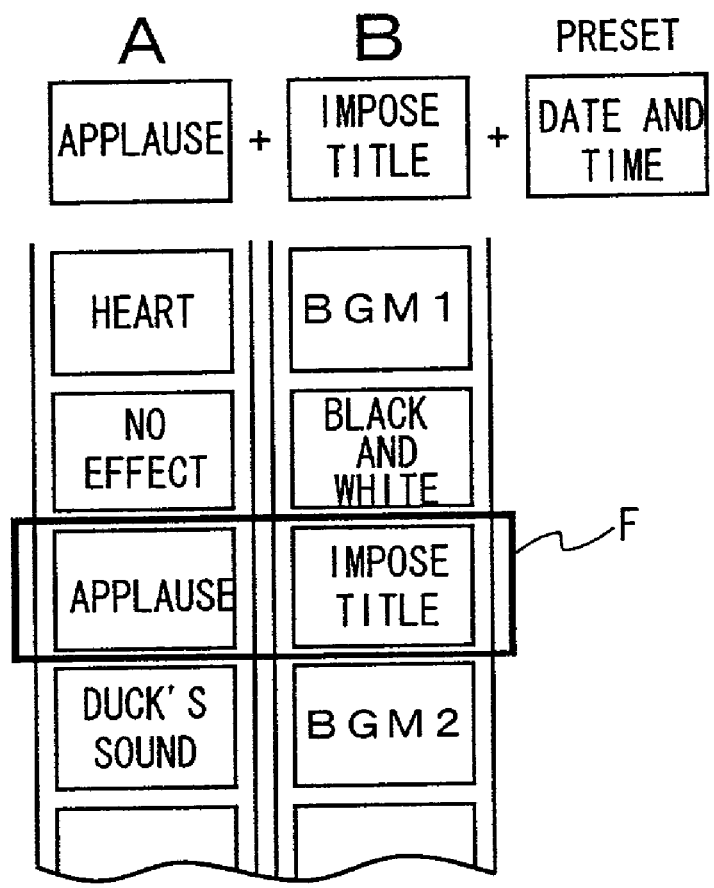
FIG. 11 is a schematic diagram showing an effect item display field.

As shown in an enlarged diagram of FIG. 11, the effect item display field 105 of the live distribution mode screen 54 displays effect items corresponding to button A and button B of the operating buttons 16C provided on the operating button case 31C, in a line, respectively.

The effect items arranged in a line in correspondence with button A and button B are previously set so as to match the contents of the live content to be live-distributed.

In this case, the effect items, that is, "heart", "no effect", "applause", . . . are set in order for button A. The CPU 10 of the user PC 4 rotates the effect items corresponding to button A in a circle in accordance with the rotation operation of the jog dial 16B by the content provider, and then applies the special effect of an effect item selected and confirmed with the focus F, to the motion picture data of the live content captured with the digital video camera 19.

Similarly, the effect items, that is, "BGM1", "black & white", "impose title", . . . are set in order for button B. The CPU 10 of the user PC 4 rotates the effect items corresponding to button B in a circle in accordance with the rotation operation of the jog dial 16 by the content provider, and then applies the special effect of a desired effect item selected and confirmed with the focus F to the motion picture data of the live content captured with the digital video camera 19.

When button A is pressed while "applause" item and "impose title" item are selected with the focus F, for example, the special effect "applause" is applied to the motion pictures of the live content captured with the digital video camera 19.

Similarly, when button B is pressed while "applause" item and "impose title" item are selected with the focus F, title imposing processing corresponding to "impose title" is performed on the motion picture data of the live content captured with the digital video camera 19.

The special effects corresponding to button A are temporarily applied, while the special effects corresponding to button B are continuously applied.

Therefore, a toggle button is employed for button B out of the operating buttons 16C of the user PC 4, so that the title imposing processing corresponding to "impose title" item is continuously performed after button B is pressed till button B is pressed again.

In addition, a preset effect item previously set is displayed on the right side of the effect items of button B. As to the preset effect item displayed, the special effect corresponding to the preset effect item is continuously applied, regardless of the operations of button A and button B, unless the preset effect item is changed through the effect setting which will be described later.

In this case, "date and time" item is set as a preset effect item, so that date and time are continuously superimposed onto the motion picture data of the live content captured with the digital video camera 19.

The special effects previously set to the effect item display field 105 are applied in correspondence with button A and button B as described above, considering that the motion picture data of live content captured with the digital video camera 19 is distributed in real time to the client PCs 7A, 7B and 7C.

That is, the CPU 10 of the user PC 4 can easily apply the special effect corresponding to an effect item to the motion picture data of live content captured with the digital video camera 19 only by pressing button A or button B once as described above, and as a result, the motion picture data of the live content captured with the digital video camera 19 can be transmitted to the streaming server 8 in real time while being subjected to the special effects.

The CPU 10 of the user PC 4 can apply a special effect only by pressing button A or button B once, but when button A or button B is pressed, the CPU 10 applies only the special effect of the effect item enclosed by the focus F of the effect item display field 105.

Therefore, if the effect items displayed in the effect display field 105 or the display order of the effect items does not meet the content provider's requirements, it takes time to select a desired effect item through the rotation operation of the jog dial 16B, and as a result, a desired special effect may not be applied at desired timing.

Then, in a live distribution mode, by selecting the "effect setting" item in the GUI 102 of the live distribution mode screen 54 (FIG. 9B), the order of effect items out of the various kinds of effect items prepared can be set in the effect item display field 105 in advance.

Figure 12:
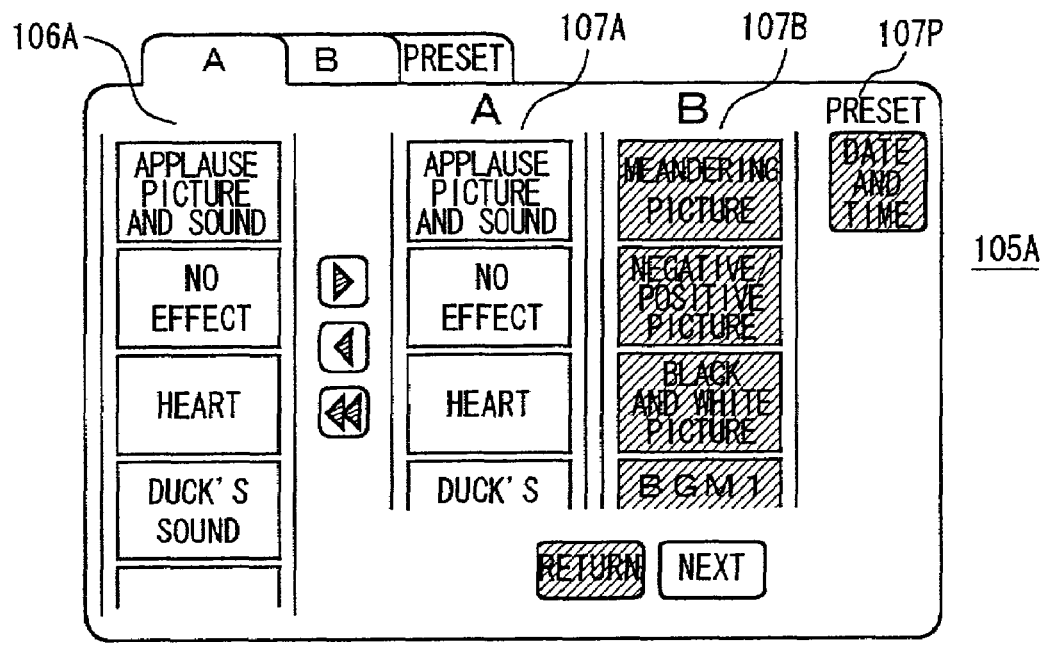
FIG. 12 is a schematic diagram showing an effect setting screen for button A.
Figure 13:
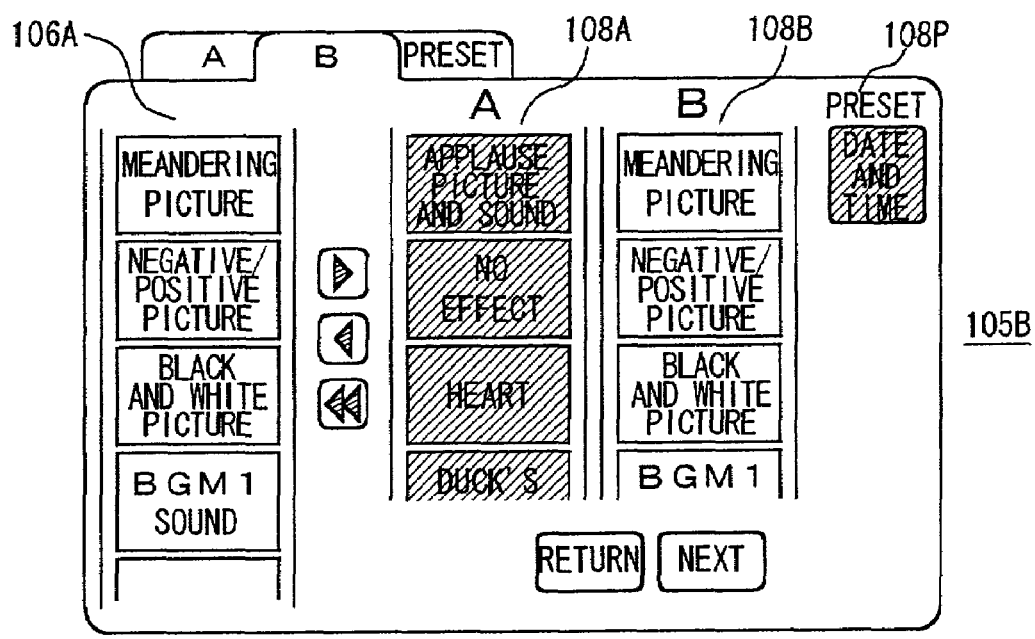
FIG. 13 is a schematic diagram showing an effect setting screen for button B.
Figure 14:
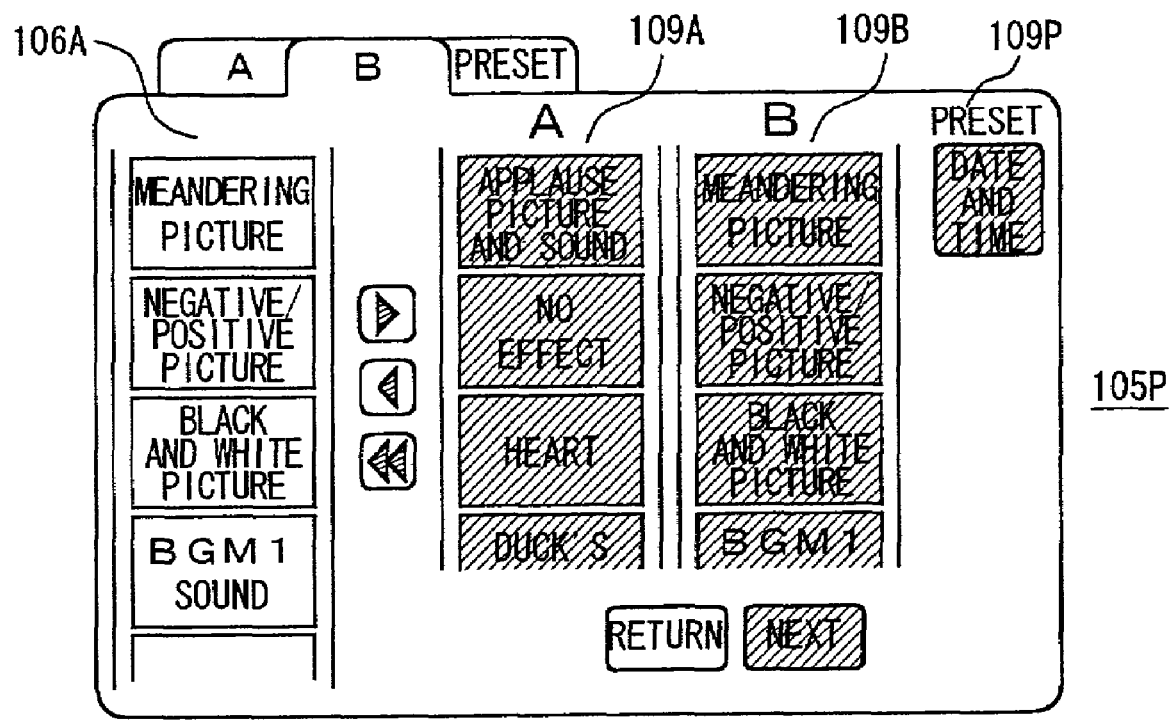
FIG. 14 is a schematic diagram showing an effect setting screen for preset.

Specifically, when the content provider selects the "effect setting" item in the GUI 102, the CPU 10 of the user PC 4 overlays an effect setting screen 105A, 105B or 105C shown in FIG. 12, FIG. 13, or FIG. 14, on the live distribution mode screen 54.

As shown in FIG. 12, the effect setting screen 105A for button A is a screen for setting effect items which correspond to button A. A button-A effect item list field 106A displaying various kinds of effect items prepared for button A is provided on the left side on the screen, and the various kinds of effect items prepared are arranged in the button-A effect item list field 106A so as to be scrolled upward and downward.

In addition, the button-A effect setting screen 105A has a registration list field 107 having the same structure of the aforementioned effect item display field 105, composed of a button-A registration list field 107A, a button-B registration list field 107B and a preset registration field 107P, on its right side.

In the button-A effect setting screen 105A, the button-B registration list field 107B and preset registration field 107P are netted, except for the button-A registration list field 107A, which can allow the content provider to easily recognize the currently settable button-A registration list field 107A.

In such the button-A effect setting screen 105A, the content provider sequentially selects desired effect items out of the button-A effect item list field 106A, and drugs and drops the selected effect items to the button-A registration list field 107A in order to set the desired effect items, of which the special effects are to be applied in correspondence with button A, in a desired order.

As shown in FIG. 13, the button-B effect setting screen 105B is a screen for setting effect items corresponding to button B. The button-B effect item list field 106B displaying various kinds of effect items prepared for button B is displayed on the left side on the screen, and the various kinds of effect items are displayed so as to be scrolled upward and downward.

Similarly to the button-A effect setting screen 105A, the button-B effect setting screen 105B has a registration list field 108 having the same structure of the effect item display field 105.

In the button-B effect setting screen 105B, a button-A registration list field 108A and a preset registration field 108P are netted, except for a button-B registration list field 108B, which can allow the content provider to easily recognize the currently settable button-B registration list field 108B.

In this button-B effect setting screen 105B, the content provider sequentially selects desired effect items in the button-B effect item list field 106B, and drugs and drops the selected effect items to the button-B registration list field 108B, so as to set the desired effect items, of which the special effects should be applied in correspondence with button B, in a desired order.

As shown in FIG. 14, the preset effect setting screen 105P is a screen for setting an effect item of which the special effect is applied from beginning to end, and has a preset effect item list field 106P displaying various kinds of preset effect items of which the special effects are to be applied from beginning to end. In the preset effect item list field 106P, the various kinds of preset effect items prepared are arranged so as to be scrolled upward and downward.

Similarly to the button-A effect setting screen 105A, the preset effect setting screen 105P has a registration list field 109 having the same structure as the effect item display field 105.

In this preset effect setting screen 105P, a button-A registration list field 109A and a button-B registration list field 109B are netted, except for the preset registration field 109P, which can allow the content provider to easily recognize the currently settable preset registration field 109P.

In such preset effect setting screen 105P, the content provider selects a desired preset effect item in the preset effect item list field 106P, and drugs and drops the selected preset effect item to the preset registration field 109P, so as to set the preset effect item of which the special effect should be continuously applied from beginning to end.

In general, in carrying out the live distribution, the content provider roughly plans the kinds of effect items of which the special effects should be applied, the timing and order of applying the special effects.

Therefore, the content provider previously sets the special effects to be applied, considering the kinds and order of effect items and so on, based on his plan, so as to perform the effect processing faithful to his plan, in the live distribution only by operating button A and button B of the operating buttons 16C with the user PC 4.

As described above, the user PC 4 stores the application programs for the aforementioned five functions: capture mode, uploading mode, Web confirmation mode, live reservation/confirmation mode, and live distribution mode, in the hard disk 13, resulting in offering aforementioned various processing functions. In addition to these, the user PC 4 stores an application program for automatically taking a reservation setting information file which is described later when live distribution is reserved, and an application program for executing the communication connection processing to the streaming server 8 when the live distribution starts, and the functions offered by these applications will be described in detail later.

(1-3) Construction of Server Reservation Control Center

When the user PC 4 as a live distributor transmits the motion picture data of live content to the streaming server 8, it needs to reserve the stream distribution function of the streaming server 8 for the distribution time zone, in the personal casting service of the content distribution system.

Figure 15:
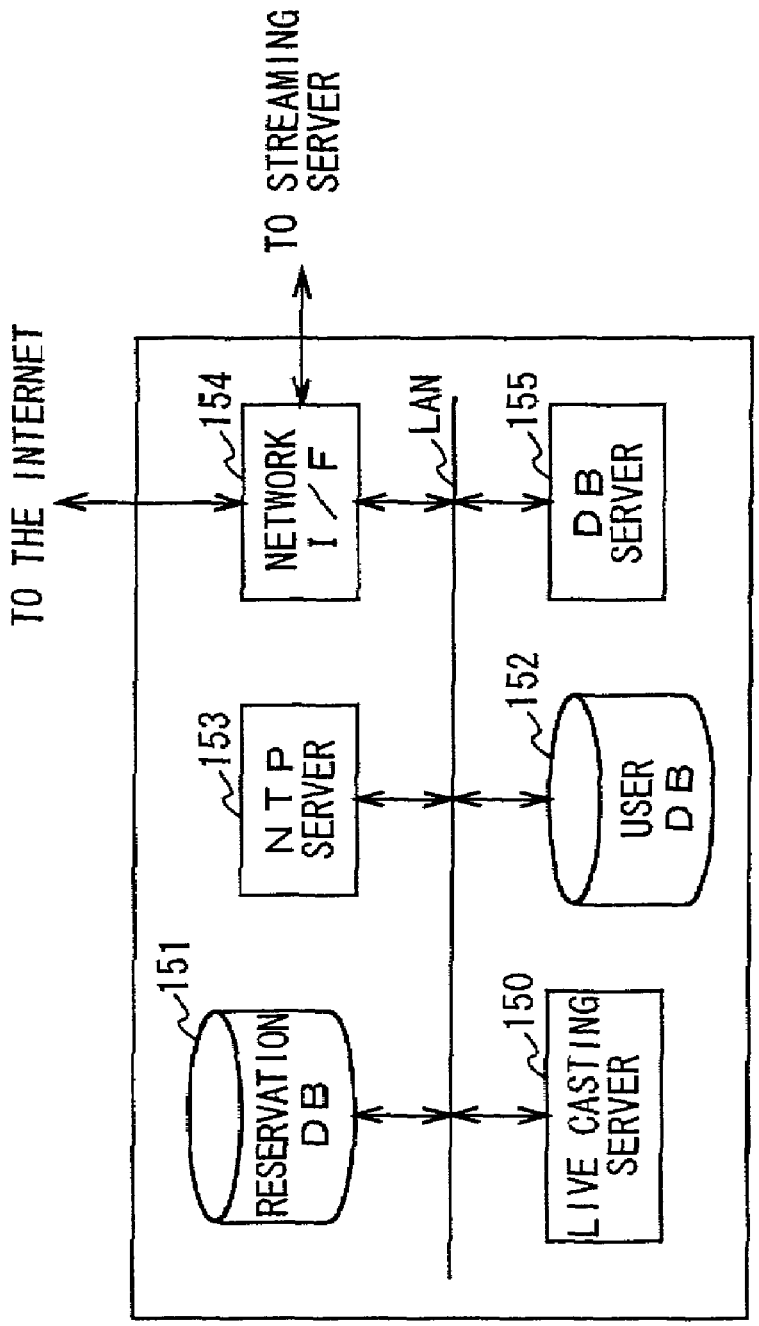
FIG. 15 is a block diagram showing the construction of a server reservation control center.

Next, the server reservation control center 5 which is a service provider for controlling the reservation registration of the streaming server 8 will be explained with reference to FIG. 15.

The server reservation control center 5 is composed of a live casting server 150, reservation database 151, user database 152, network time protocol (NTP) server 153, network interface 154, and database server 155, these units connected to each other with a local area network (LAN).

The server reservation control center 5 communicates various data with the user PC 4, client PCs 7A, 7B and 7C connected to the Internet 2, and with the streaming server 8 connected with the dedicated line 9 (FIG. 1), via the network interface 154.

The live casting server 150 of the server reservation control center 5 executes processing to control the whole personal casting service, including the reservation registrations of live distributions, charging processing, and member registration processing in the personal casting service.

In addition, the live casting server 150 stores in this hard disk a registration Web page so that the content provider obtains the right to use the personal casting service, a reservation Web page for accepting the reservation of live distribution by the content provider, a reservation confirmation Web page so that the content provider confirms and changes reservations, and a program guide Web page for allowing the client PCs 7A, 7B and 7C to check a program list relating to live distributions. Then when the user PC 4 or client PC 7A, 7B, 7C makes a request, the live casting server 150 transmits a Web page in response to the request, to the user PC 4 or client PC 7A, 7B, 7C.

Hereinafter, the various kinds of Web pages prepared in the live casting server 150 will be explained with reference to browser screens of the user PC 4, client PC 7A, 7B, 7C which has requested a Web page.

For example, when the content provider enters the URL for the top page (home page) of a Web page of the live casting server 150, it displays the live casting service top page screen 160 shown in FIG. 16 on the display part 14.

Note that, in addition to the aforementioned method of entering a URL, in order to request the live casting service top page screen 160 of the live casting server 150, the content provider can jump to the live casting service top page screen 160 by clicking on a link button on another homepage.

This live casting service top page screen 160 has link buttons: "member registration", "What's personal casting TV?", "today's live", "program guide", "my channel", "live reservation", "picked-up program", "Image Station", in addition to the field for entering user ID and password for login. When a click on a link button is made, the Web page being hyper-linked to the link button is transmitted from the live casting server 150 to the user PC 4, client PC 7A, 7B, 7C and is displayed.

When a click on "member registration" is made on the live casting service top page screen 160, the Web page for registration to be a member who can use the personal casting service is transmitted to the user PC 4, client PC 7A, 7B, 7C and is displayed. This processing will be described in detail later.

On the other hand, when a click on "What's personal casting TV?" is made on the personal casting service top page screen 160, an outline explanation screen 161 explaining an outline and a procedure for executing personal casting TV as shown in FIG. 17 is transmitted from the live casting server 150 to the user PC 4, client PC 7A, 7B, 7C and is displayed.

This outline explanation screen 161 has a column offering the member registration for the personal casting service, and a link button of "registration page" to jump to the Web page for "member registration".

Next, when a click on "today's live" is made on the personal casting service top page screen 160, a live contents showing screen 162 shown in FIG. 18 is transmitted from the live casting server 150 to the user PC 4, client PC 7A, 7B, 7C and is displayed.

This live contents showing screen 162 displays programs to be live-distributed today, and the current time of the service provider (reservation is carried out based on this time) is displayed at the upper part, and under that time, items relating to the distribution time, live title, distributor, outline and so on of a special program and private program to be live-distributed today are displayed (the names of items are displayed in this figure, but actually the contents of items (distributor, title name and so on) are displayed).

The special program means content which is provided by a company or the like, and the private program means content which is provided by a personal content provider having the user PC 4.

In addition, an "on demand" program is not a program for live distribution but for on-demand distribution, that is, its content is stored in the live casting server 150 and is distributed in response to a request from a client PC 7A, 7B, 7C

"Capacity" in the private program indicates the number of clients which can receive the live distribution of live content of the private program. "Open" or "close" indicates whether the distribution can be performed in response to a request from the client PC 7A, 7B, 7C, considering the aforementioned capacity ("open" means that distribution is possible, while "close" means that distribution is impossible).

"Live title" out of the items displayed in the live contents showing screen 162 is a link button, and when a click on its button is made, a live content detailed information screen 163 corresponding to "live title" as shown in FIG. 19 is transmitted from the live casting server 150 to the user PC 4, client PC 7A, 7B, 7C and is displayed.

When a correct password is entered and a click on "reproduction" button 175 is made on this live content detailed information screen 163 while live content is distributed, a distribution request for the live content is transmitted from the client PC 7A, 7B, 7C to the streaming server 8 via the Internet 2.

Thereby the client PC 7A, 7B 7C, which has made the distribution request, receives the stream distribution of the live content from the streaming server 8, and reproduces this in real time, so that the client user can watch it.

Note that, reproduction software for real-time reproduction (for example, "Real Player" (Real Network corporation), "Windows Media Player" (Microsoft corporation) or the like) is necessary for the client PC 7A, 7B, 7C to reproduce the live content stream-distributed from the streaming server 8.

If a client PC 7A, 7B, 7C which makes a distribution request does not store the aforementioned reproduction software, it can download the reproduction software from the live casting server 150 only by clicking on "reproduction software" button 176, so as to reproduce the live content stream-distributed from the streaming server 8, in real time.

Next, when a click on "program guide" is made on the live casting service top page screen 160, a program guide list screen 165 shown in FIG. 20 is transmitted from the live casting server 150 to the client PC 7A, 7B, 7C and is displayed.

This program guide list screen 165 displays a monthly calendar including the present date, and lists contents to be distributed on the date (July 5) displayed in inverse video in the monthly calendar.

In addition, in the program guide list screen 165, when a click on a desired date is made in the monthly calendar, a list of contents to be distributed on that date is displayed.

Note that, the program guide list screen 165 is a screen which collects the contents of the live contents showing screen 162 (FIG. 18). Its display arrangement may be arbitrarily determined, for example, a display arrangement like a television column of paper can be used, that is, a matrix display column having a vertical axis of time and a horizontal axis of channel is provided and title names, outlines, distributors and so on are indicated in the matrix display column.

Next, "my channel" in the personal casting service top page screen 160 (FIG. 16) is a Web page which is prepared for each content provider (user of premium member which is described later) having a right to be a distributor of live content. When a click on "my channel" is made, a Web page for confirming the contents of the reserved live distributions of the content provider at the current time is displayed.

In addition, when a click on "live reservation" is made on the personal casting service top page screen 160 (FIG. 16), a Web page for reservation of live distribution is displayed and will be described in detail later.

Users who are not members do not have user ID and password, so they can not perform login processing such as entering a user ID and password.

When such a user, who can not perform the login processing, clicks on "my channel" or ∫ live reservation", his PC does not display a Web page corresponding to the clicked item but displays the Web page corresponding to "What's personal casting TV?" of the personal casting service top page 160 (FIG. 16) to offer the registration to be a member.

Next, "picked-up program" in the personal casting service top page screen 160 (FIG. 16) is a Web page showing contents recommended by the service provider. When a click on this is made, a live content detailed information screen 163 (FIG. 19) showing service provider's recommendations is displayed.

As described above, the live casting server 150 stores aforementioned plural kinds of Web pages in its hard disk, and transmits Web pages to the user PC 4, client PCs 7A, 7B and 7C in response to clicks.

Returning to FIG. 15, the reservation database 151 is to store information on the reservation status relating to live distribution reserved in the live reservation mode and on charging which is made for the reservation.

In this case, as shown in FIG. 21, the reservation database 151 stores a reservation table 166 in which the contents of reservation including reserved time zone, channel, transmission band (bit per second (bps)), the user ID for identifying a user, charging flag information indicating whether charging can be made by concluding the reservation at the present time, and reservation ID to be used for identification when the reserved distribution is carried out are related to each other, for each reservation.

Each of information in the reservation table 166 is stored when the live casting server 150 performs the reservation processing, described later, and is referenced when the database server 155 performs identification processing.

The user database 152 is to store user information of registered users having a right to use the personal casting service (content providers who provide live content with user PC 4, client users who receive the stream distribution of live content with the client PCs 7A, 7B and 7C), that is, it stores the name, user ID, password, e-mail address, address, telephone number (portable telephone number and facsimile number), and the number and expiration date of a credit card for charging, for each registered user.

The user information stored in the user database 152 is stored when the live casting server 150 performs the member registration processing, described later, and is referenced when the live casting server 150 performs the live reservation.

The NTP server 153 controls the time information of the service provider side including the server reservation control center 5 and streaming server 8. Thereby, the live casting server 150 and the streaming server 8 obtain the time information from the NTP server 153 and control the start time and end time of live distribution based on the obtained time information.

This is because a live distribution should be carried out based on the exact time. And since the service provider side uses the standard time, the service reservation control center 5 and streaming server 8 of the service provider can operate in synchronization with each other based on the same standard time.

On the other hand, the user PC 4 may have time difference from the standard time of the service provider side, and if the user PC 4 does not know the time difference, the start time and end time of live distribution set by the user PC 4 are different from those set by the service provider side.

Therefore, the live casting server 150 obtains the above time difference based on the standard time obtained from the NTP server 153 and notifying the user PC 4 of the time difference when the user PC 4 carries out the live distribution.

When the user PC 4 or the PC of a dishonest user makes a request for connection to use the streaming server 8 to the access port of the dedicated server connection network 6, the database server 155 performs identification processing to detect whether the PC getting access is a user PC 4 having a rightful reservation in this time zone, in response to a request from the access server (not shown) of the dedicated server connection network 6.

When the database server 155 detects the honest user PC 4 through the identification processing, the communication connection between the streaming server 8 and the user PC 4 is established, so that the user PC 4 can make a request for stream distribution to the streaming server 8.

At this point, in order to identify whether the user PC 4 which has made a request for distribution is a user PC 4 having a rightful live reservation, the streaming server 8 requests the database server 155 to perform the identification processing.

The database server 155 performs the identification processing in response to a request from the streaming server 8, to detect whether a user PC 4 has a rightful live reservation or not. Note that, the database server 155 performs the identification processing by referencing the reservation database 151, and this identification processing will be described in detail later.

(1-4) Construction of Streaming Server

The streaming server 8 receives the motion picture data of live content transmitted from the user PC 4 having a rightful live reservation through the transmission line by the dedicated line connection (in the case of the connection via the dedicated server connection network 6) or the Internet connection (in the case of the connection via the public circuit network 3 and the Internet 2), and then steam-distributes the data via the Internet 2 to the client PCs 7A, 7B and 7C which have made a distribution request.

Further, the streaming server 8 has plural channels for each distribution environment, that is, for the dedicated line connection or the Internet connection, so that even if plural content providers get access as live distributors within the same time zone, the streaming server 8 can simultaneously execute the live distribution processing for the plural content providers.

In actual, the streaming server 8 has setting different for each channel, including the capacity capable of receiving distribution, the transmission band (for example, 20 kbps, 34 kbps, 45 kbps, 80 kbps, 220 kbps), and fee for use. And the content provider who performs live distribution via the streaming server 8 arbitrarily selects a distribution channel in the live reservation.

In addition, the streaming server 8 performs the stream distribution processing on the motion picture data of live content transmitted from the content provider of the user PC 4, as described above, and also performs the distribution processing on commercial content by taking it out of the hard disk or the like, within free time zones or between content and content.

Further, the streaming server 8 controls the reserved time zone for distribution, the number of client PCs 7A, 7B and 7C which are distribution destinations, based on the contents of live reservation of the user PC 4 accepted by the server reservation control center 5, and this processing will be described later.

(1-5) Communication Connection between Streaming Server and User PC for Live Distribution In the content distribution system 1, firstly the user PC 4 and the streaming server 8 (FIG. 1) should be connected to each other by the dedicated line connection or the Internet connection and then ensure a transmission line for live content to be transmitted from the user PC 4 to the streaming server 8, in order to perform live distribution.

When the user PC 4 has a distribution environment capable of connecting to not only the telephone line network 3A but also the cable television network 3B or ADSL network 3C, it arbitrarily selects a line out of them so as to transmit the live content to the streaming server through the transmission line by the dedicated line connection or Internet connection.

Note that, the dedicated server connection network 6 is a dedicated network provided for live distribution in the personal casting service offered by the content distribution system 1.

The dedicated line connection between the user PC 4 and the steaming server 8 only via the dedicated server connection network 6 has a following advantage.

That is, in the content distribution system 1, ensuring a transmission line between the user PC 4 and the streaming server 8 via the dedicated server connection network 6 can effectively avoid such cases that connection environment deteriorates due to the ISP and that a transmission band can not be ensured, resulting in reliably performing the live distribution.

If only the dedicated line connection is selectable, however, a digital circuit network such as the cable television network 3B or the ADSL line network 3C can not be used even the user PC 4 has a distribution environment capable of using such digital circuit network in the case where its communication rate is faster than that of the dedicated server connection network 6, also the user PC 4 may not distribute live content from another country.

On the other hand, the Internet connection between the user PC 4 and the streaming server 8 via the Internet 2 for live distribution has a following advantage.

That is, the user PC 4 can use setting of connection via the telephone line network 3A, cable television network 3B or ADSL network 3C which is generally used for getting access to the Internet 2, as it is, and can distribute live content from -another country, independent of the service area of the dedicated server connection network 6.

If only the Internet connection using the telephone line network 3A is selectable due to the distribution environment of the user PC 4, however, a necessary band may not be available for live distribution, and further a line connection port may not be available when live distribution is performed and furthermore, connection setting may need to be changed depending on a site.

Therefore, the content distribution system 1 can use the dedicated line connection and the Internet connection depending on the distribution environment of a user PC 4, and performs control so that the content provider can select a suitable distribution channel when reserving a live based on the distribution environment of the user PC 4, which will be described later.

By the way, the access server of the dedicated server connection network 6 requests the database server 155 (FIG. 15) to perform the identification processing for a normal user who has made a request for connection, to determine whether the PC of the requesting user has a rightful live reservation.

When the access server of the dedicated server connection network 6 determines that the user does not have a rightful live reservation, through the identification processing by the database server 155, it disconnects the line with the requesting PC immediately.

Although the dishonest PC can not use a line of the dedicated server connection network 6, one line is busy while the 3identification processing is performed.

Therefore, if the maximum number of users who are allowed to establish a connection is the same number of lines prepared, when many dishonest users simultaneously get access to the access port of the dedicated server connection network 6 in order to interrupt the personal casting service, a user PC 4 having a rightful live reservation may not establish a connection.

In addition, the content distribution system 1 allows the connection between the user PC 4 and the steaming server 8 from a prescribed time before a live distribution start time, based on the contents of live reservation in the personal casting service, and therefore, it finishes the identification processing and connection processing for the user PC 4 before the live distribution start time, so that the user PC 4 can start the live distribution at the live distribution start time.

In this case, however, when content providers have reservations for successive time zones in live reservation, one content provider who has a reservation for the latter time zone starts a connection from prescribed time before the live distribution start time while the other content provider who has a reservation for the former time zone is distributing content, and therefore the number of lines equivalent to the maximum number of users who can perform distribution is not enough.

Then, the streaming server 8 sets the number of lines for connection to the streaming server 8 to be double of the maximum number of users who are allowed to connect to the streaming server 8 within the same time zone (for example, when the maximum number of users who can establish a connection is 10, the number of lines is 20), thus making it possible to reduce the interruption of service due to the obstruction of dishonest users and to cope with the case where the connections of the former time zone and latter time zone overlap.

Further, the dedicated server connection network 6 for connection to the streaming server 8 may have not only an access port for a network (for example, public telephone network) of one telecommunication carrier but also access ports to which an access can be got from networks of plural telecommunication carriers.

In this case, when the user PC 4 selects a telecommunication carrier to connect, gets access to an access port corresponding to the network of the telecommunication carrier, to establish the communication connection with the streaming server 8 via the dedicated server connection network 6.

(1-6) Construction of Client PC

The motion picture data of live content transmitted from the user PC 4 to the streaming server 8 in real time is live-distributed via the streaming server 8 and is stream-distributed via the Internet 2 to the client PCs 7A, 7B, 7C who have made a distribution request, as described above.

Each client PC 7A, 7B, 7C can make a distribution request to the streaming server 8 on the live content detailed information screen 163 (FIG. 19) of the live casting server 15, and also can make a distribution request directly to the streaming server 8 by entering the URL of the streaming server 8.

In this embodiment, the client PCs 7A, 7B and 7C can make a distribution request to the streaming server 8 on the live content detailed information screen 163 (FIG. 19), and can reproduce live content in real time with prescribed application program (for example, "Real player" (Real Networks corporation), "Windows Media Player" (Microsoft corporation) or the like) while the streaming server 8 performs the stream distribution.

(2) Operations of Content Distribution System

Next, various processing in the content distribution system 1 for realizing the live casting service will be explained in order.

(2-1) Member Registration

In order that the content provider having the user PC 4 performs the live distribution in the personal casting service, he firstly needs to register at the live casting server 150 of the server reservation control center 5 for obtaining a right to perform the live distribution in the personal casting service.

Figure 22:
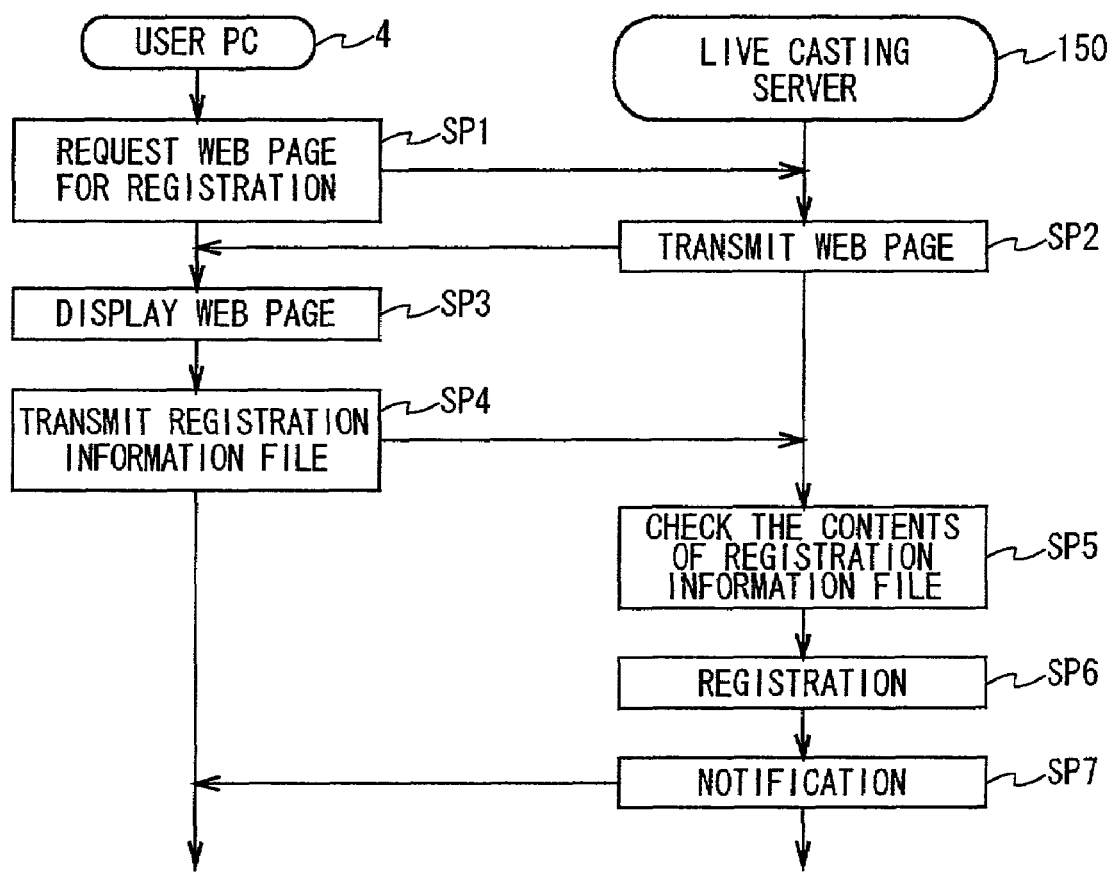
FIG. 22 is a flowchart showing a sequence of member registration processing.

That is, in order to perform the member registration in the content distribution system 1, as shown in FIG. 22, the user PC 4 connects to the Internet 2 and makes a request for a Web page to the live casting server 150 (FIG. 15) at step SP1, and moves to next step SP2.

When the user PC 4 connects to the Internet 2, the user PC 4 displays an initial screen 35 in accordance with the aforementioned application program when its power is turned ON. Then when the content provider selects the Web confirmation mode on the initial screen 35, the user PC 4 displays the Web confirmation mode screen 52 (FIG. 8) on the display part 14.

Then, the content provider enters the URL of the Web page of the live casting server 150 on the Web confirmation mode screen 52 in the Web confirmation mode, to make a request for the Web page.

The live casting server 150 takes the Web page in response to the request and transmits it to the user PC 4 via the Internet 2 at step SP2 and moves to next step SP3.

The user PC 4 receives the Web page transmitted from the live casting server 15 and displays the received Web page in the browser display screen 80 of the Web confirmation mode screen 52 at step SP3 and moves to next step SP4.

By the way, following operations and processing are actually carried out between the user PC 4 and the live casting server 150 when the request for a Web page is made and the Web page is then transmitted.

When the user PC 4 makes a request for a Web page to the live casting server 150 based on the URL directly entered in the URL display field 84 on the Web confirmation mode screen 52, the user PC 4 firstly displays the live casting service top page screen 160 (FIG. 16) received from the live casting server 150, in the browser display screen 80.

When the content provider clicks on "member registration" on this live casting service top page screen 160, the CPU 10 of the user PC 4 makes a request for the Web page to perform member registration to the live casting server 150 via the Internet 2, in response to this click operation.

Then, the live casting server 150 transmits the Web page for member registration, and by receiving the Web page, the CPU 10 of the user PC 4 displays a member registration input screen 167 as shown in FIG. 23 in the browser display screen 80 of the Web confirmation mode screen 52

The member registration input screen 167 has items necessary for member registration and the input field for the items.

This personal casting service has two kinds of member registrations: a normal member to receive live distribution from the streaming server 8, like the aforementioned client PCs 7A, 7B and 7C, and a premium member to use the personal casting service as a live distributor in addition to the above service. And the member registration input screen 167 has an input field 210 common to normal and premium members and an input field 211 only for premium members.

Client users who register only for a normal member with the client PCs 7A, 7B and 7C on this member registration input screen 167 fill in the input field 210.

In addition, the member registration screen 167 has a cancel button 212 to delete the entered contents and a registration button 213 to confirm the entered contents. When a click on the registration button 213 is made, the client PC 7A, 7B, 7C transmits the contents entered in the input field 210 as registration information to the live casting server 150 via the Internet 2.

When a registration for a premium member is conducted, on the other hand, the content provider checks the check box of "premium member registration" to fill in the input field 210 and the input field 211.

When the content provider finishes filling in the input field 210 and the input field 211 and then clicks on the registration button 213, the CPU 10 of the user PC 4 creates the registration information file having the same contents of the member registration input screen 167, to transmit it to the live casting server 150 via the Internet 2 and to store the registration information file into the hard disk 13 at step SP4, and then moves to next step SP5.

At step SP5, the live casting server 150 receives the registration information file transmitted from the user PC 4 via the Internet 2 and then determines whether to accept the registration by referencing the contents of the received registration information file, and then moves to next step SP6.

If any of the prescribed items is not answered, the live casting server 150 notifies the user PC 4 of this missing item for reenter.

In addition, the live casting server 150 gets access to the check server of a credit company via the Internet 2 to determine whether the credit card in the registration information file is valid, and then accepts the registration only when the credit card is valid.

When the registration is accepted, the live casting server 150 performs the registration processing by storing the item information of the registration information file in the user database 152 at step SP6, and moves to next step SP7. Note that, the live casting server 150 creates a Web page of "my channel" for the registered user and stores it in the hard disk 13 in the premium member registration processing.

The live casting server 150 notifies the user PC 4 of the completion of the registration processing via the Internet 2 at step SP7 and then terminates the member registration processing.

(2-2) Distribution Reservation

Under the completion of the aforementioned member registration processing, the content provider having the user PC 4 can become a broadcaster to perform the live distribution using the personal casting service and can make a reservation for live distribution to the live casting server 150.

In order that the content provider uses the personal casting service in the content distribution system 1, the content provider registers a live reservation at the live casting server 150 and makes a reconfirmation to the live casting server 150 by prescribed time (6 hours) before the live distribution start time, and thereby concluding the reservation.

In the content distribution system 1, a content provider who has made a reservation has to make a reconfirmation in this way, thus live is actually performed at higher probability and free time zones are reduced.

In addition, the content distribution system 1 previously sets the maximum number of frames (for example, one frame is ten minutes) which each registered content provider can reserve for one month, which prevents the personal casting service from being used by few content providers.

(2-3) Reservation Registration

Figure 24:
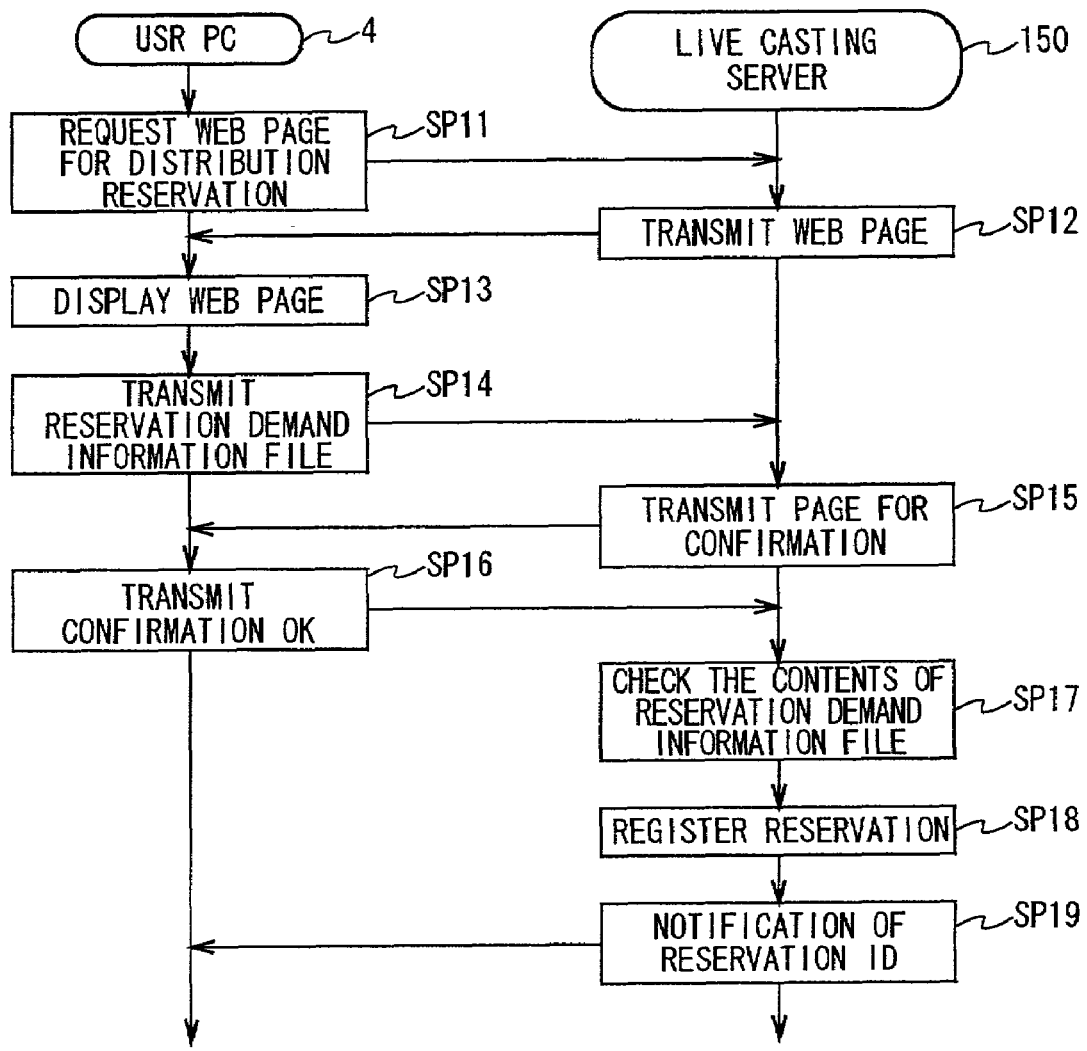
FIG. 24 is a flowchart showing a sequence of reservation confirmation processing.

Hereinafter, a sequence of the reservation registration processing between the user PC 4 and the live casting server 150 when the aforementioned reservation registration is performed for live reservation will be explained with reference to the flowchart of FIG. 24.

At step SP11, the user PC 4 starts prescribed application program to display the initial screen 35 (FIG. 5) on the display part 14 when its power is turned ON, and when the content provider selects the live reservation/confirmation mode on the initial screen 35, the user PC 4 displays the live reservation/confirmation mode screen 53 (FIG. 9).

The content provider moves the focus F to select and confirm "reservation" item in the GUI 92 by operating the jog dial 16B on the live reservation/confirmation mode screen 53.

Thereby, the CPU 10 of the user PC 4 makes a request for a Web page (Web page which is displayed when a click on "live reservation" is made on the personal casting service top page screen 160) for live reservation at the live casting server 150 and moves to next step SP12.

The user PC 4 can make a request for the Web page for live reservation not only by selecting and confirming "reservation" item with the function realized by the application program, but also by directly entering the URL.

Specifically, the user PC 4 makes a request for the personal casting service top page 160 (FIG. 16) based on the URL directly entered by the content provider, performs the login processing by entering the user ID and password on the personal casting service top page 160, and then make a request for the Web page for live reservation by clicking on "live reservation" item.

When receiving a request for the Web page for live distribution from the user PC 4, the live casting server 150 transmits the Web page to the user PC 4 via the Internet 2 at step SP12, and then moves to next step SP13.

The user PC 4 receives the Web page from the live casting server 150 and displays a distribution environment setting screen 400 as shown in FIG. 25 on the basis of the Web page in the browser display screen 90 of the live reservation/confirmation mode screen 53 at step SP13.

This distribution environment setting screen 400 is a screen which is used by the content provider to arbitrarily select the distribution environment according to the type of circuit which can connect the user PC 4 and the Internet 2, and has a program title input field and a radio button 441 for setting the distribution environment.

Note that, the distribution environment setting screen 400 has an inquiry if the content provider wants to advertise the live content of the live entered in the program title input field on the personal casting service top page 160 (FIG. 16) as a special live, and a check box for answering this inquiry.

Figure 26:
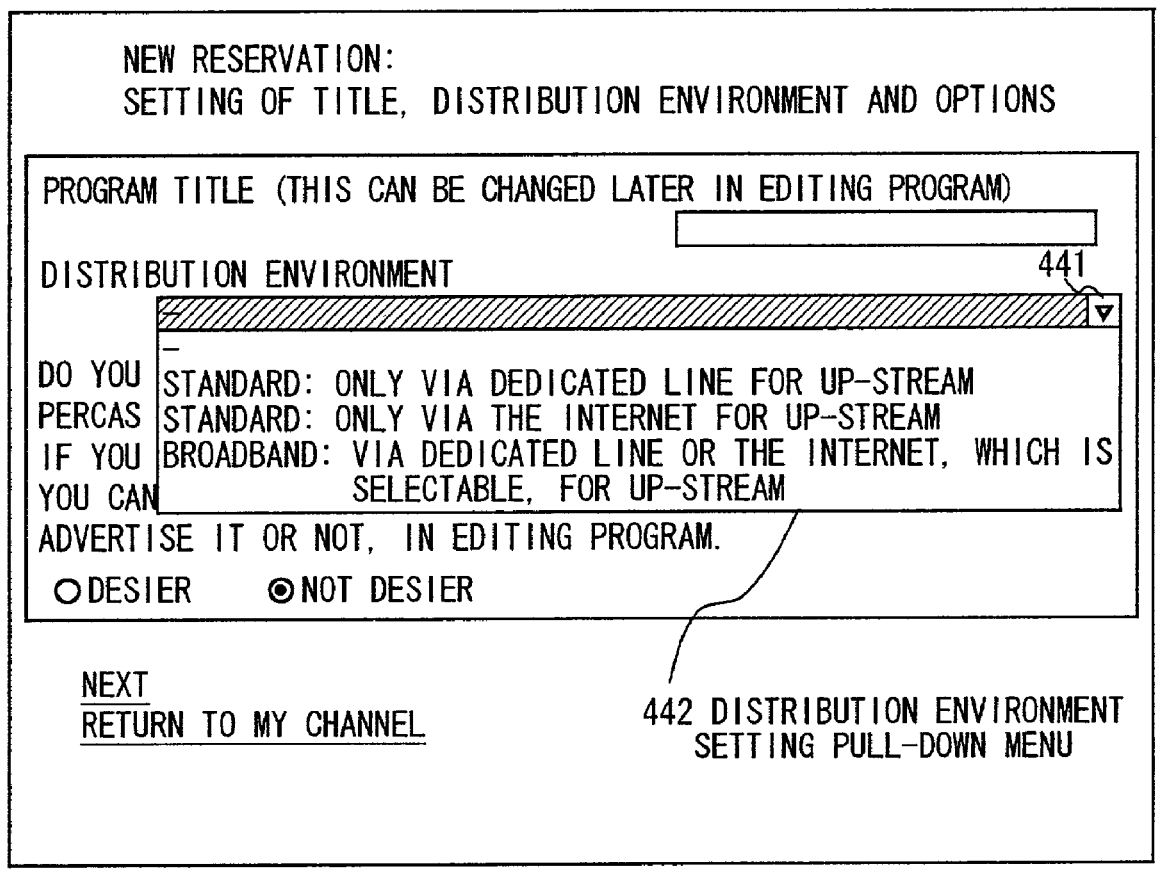
FIG. 26 is a schematic diagram showing the distribution environment setting screen for selecting a distribution environment.

When the content provider clicks on the radio button 441 of "distribution environment" on the distribution environment setting screen 400, the CPU 10 of the user PC 4 displays a distribution environment setting pull-down menu 442 as shown in FIG. 26.

The distribution environment setting pull-down menu 442 has items which can be arbitrarily selected by the content provider:

"standard: only via dedicated line for up-stream" item,
"standard: only via the Internet for up-stream" item, and
"broadband: via dedicated line or the Internet.

"Standard: only via dedicated line for up-stream" item is an item for selecting a dedicated line connection of a narrow band by the dedicated server connection network 6 for the transmission processing of live content from the user PC 4 to the streaming server 8. "Standard: only via the Internet for up-stream" item is an item for selecting the Internet connection of a narrow band via the telephone line network 3 and the Internet 2.

Further, "broadband: via dedicated line or the Internet, which is selectable, for up-stream" item is an item capable of arbitrarily selecting one of the dedicated line connection of a narrow band by the dedicated server connection network 6 and the broadband Internet connections via any of the telephone line network 3A, cable television network 3B and ADSL network 3C, and the Internet 2.

As a result, the content provider can select an item from the distribution environment setting pull-down menu 442 based on the distribution environment of the user PC 4.

In actual, the content provider can select "broadband: via dedicated line or the Internet, which is selectable, for up-stream" item if the user PC 4 connects to the cable television network 3B or ADSL network 3C and has a distribution environment capable of realizing the high rate data transmission.

Specifically, if the user PC 4 has a distribution environment capable of realizing the high rate data transmission using the cable television network 3B or the ADSL network 3C, the CPU 10 of the user PC 4 can use a transmission line having a broadband (250 kbps, for example) by the Internet connection, in order to perform the parallel transmission of a plurality of content, which is to be transmitted at respective transmission rates of 20 kbps, 45 kbps, and 80 kbps, at different transmission rates to the streaming server 8 within that band (that is, the total of transmission rates, 145 kbps, should be less than 250 kbps).

If the user PC 4 uses the wide band transmission line by the Internet connection in this way, it can perform the transmission processing of live content with widely meeting the communication environments of the client PCs 7A, 7B and 7C which are to receive the stream distribution of the live content.

When "next" is selected after selecting any item from the distribution environment setting pull-down menu 422, the CPU 10 of the user PC 4 displays a new reservation setting screen 401 as shown in FIG. 27 for performing the live reservation under the selected distribution environment.

Figure 28:
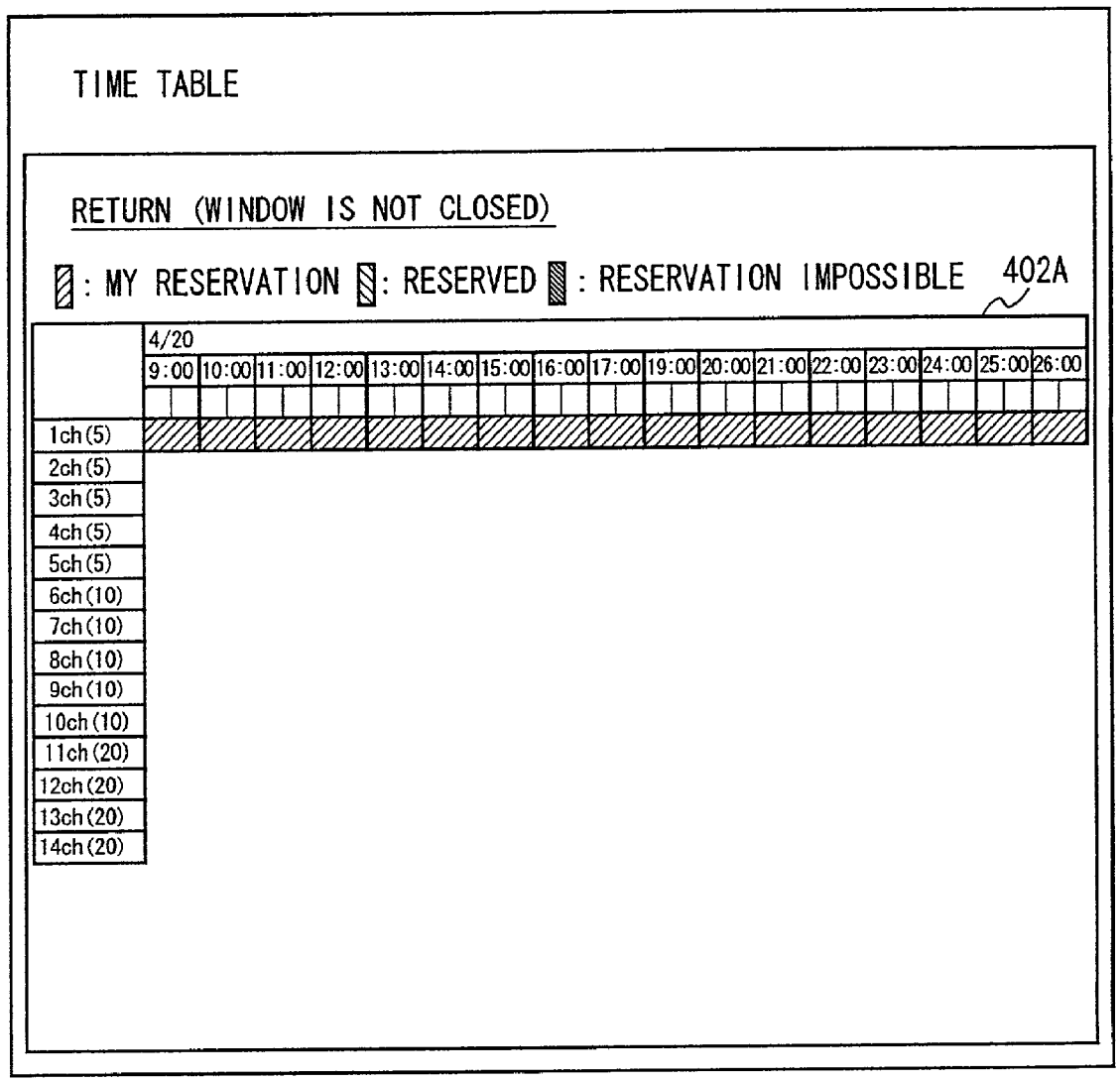
FIG. 28 is a schematic diagram showing a timetable screen.

The new reservation setting screen 401 displays a monthly calendar 433 for confirming the reservation status for next three moths, and when a click on the cursor placing on a desired date is made, the CPU 10 of the user PC 4 displays a timetable screen 402 showing the reservation status for each time zone of the clicked date as shown in FIG. 28.

A reservation status display field 402A of the timetable screen 402 shows the capacity for distribution on each distribution channel, reservation status ("my reservation", "reserved" or "reservation impossible") of each time zone in different colors, for each distribution channel, so that the content provider determines a distribution channel, time zone and so on, by referencing the reservation status display field 402A.

This capacity of each distribution channel is preset for each distribution channel, and the content provider of the user PC 4 confirms the capacity of the distribution channel on the reservation status display field 402A in order to select a distribution channel having desired capacity.

After the content provider determines the distribution channel and time zone by referencing the timetable screen 402, the content provider returns to the new reservation setting screen 401 (FIG. 27) to enter each item of "start date", "start time", and "distribution time" and then clicks on the radio button 450 of "distribution CH (channel)".

Figure 29:
FIG. 29 is a schematic diagram showing a new reservation setting screen for selecting a distribution channel.

Then the CPU 10 of the user PC 4 overlays a distribution CH pull-down menu 451 as shown in FIG. 29 on the new reservation setting screen 401. The distribution CH pull-down menu 451 shows the number of people who can receive distribution (5 channel for five people who can receive distribution and 10 channel for ten people), for each distribution channel (1CH-10CH) under the distribution environment selected on the distribution environment setting screen 400.

Figure 30:
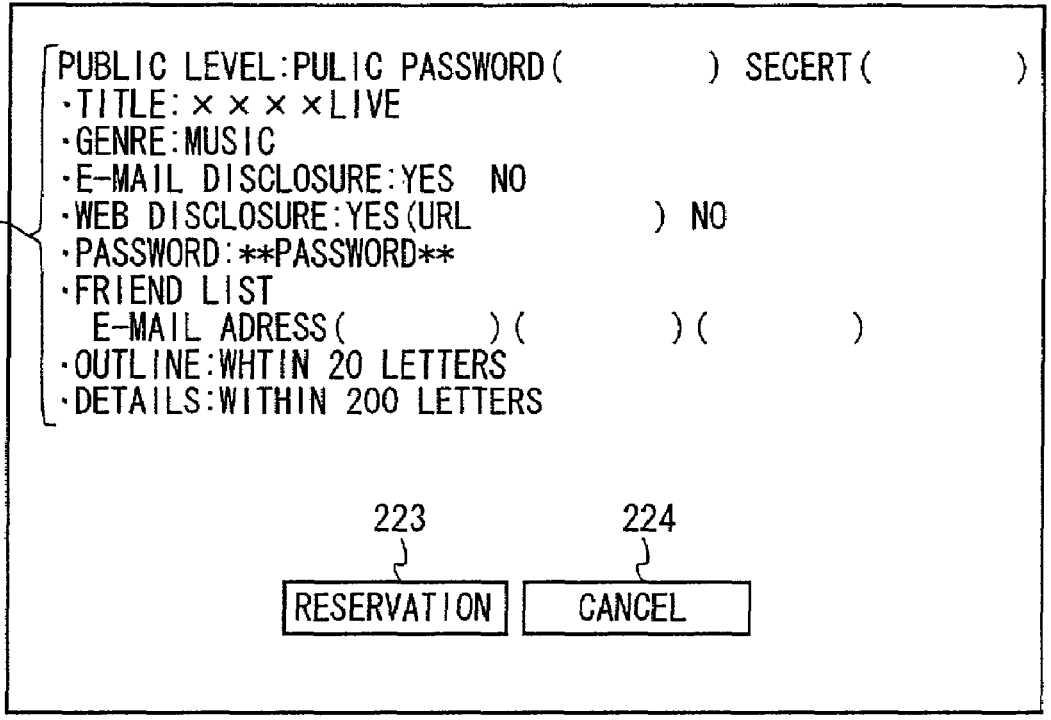
FIG. 30 is a schematic diagram showing a reservation screen.

When the content provider selects a desired distribution channel based on desired capacity for distribution and clicks on "next", the CPU 10 of the user PC 4 displays a reservation screen 402 as shown in FIG. 30.

The reservation screen 402 has a reservation input field 222 having plural input areas for items to be answered by the content provider for live reservation, a reservation button 223 for confirming the entered contents in the reservation input field 222 and a cancel button 224 for canceling the entered contents of the reservation input field 222.

This reservation input field 222 has "publication level" of live content to be live-distributed, "title" to enter the title of the live content, "genre" to enter the genre of the live content, "e-mail disclosure" to determine whether the e-mail address of the content provider is disclosed, "Web disclosure" to determine whether the URL of a Web page of the content provider is disclosed, "password" to enter password, "friend list" to enter the e-mail addresses of friends who receive the live distribution, "outline" to enter an outline of the live content within fixed number of letters (within 20 letters, for example), and "detailed" to enter the details of the live content within fixed number of letters (within 200 letters, for example), as items to be answered.

"Public level" in the reservation input field 222 is a public level in live distribution based on the live reservation, that is, an item which the content provider can limit the destinations of live distribution, and "public" level, "password" level, and "secret" level are selectable.

"Public" level allows distribution without any limitations and when the "public" level is designated, all normal members can receive the stream distribution of the live content based on the live reservation. It should be noted that the number of recipients is within the capacity.

"Password" level limits the recipients of stream distribution of live content based on the live reservation, and only members who can enter a correct password can receive the stream distribution. The content provider who selects "password" level needs to enter a password which is to be used by recipients.

"Secret" level is a public level to allow only members who enter a correct password to receive the stream distribution of live content based on the live reservation, similar to "password" level. Therefore, the content provider who selects "secret" level needs to enter a password which is to be used by recipients.

When the content provider selects "password" level or "secret" level, information including the distribution time of the live content and the password is transmitted to the e-mail addresses designated in "friend list" which is described later.

"Password" level and "secret" level both allow only specific members to receive the stream distribution of the live content but have big differences.

When "password" level is selected, the reserved live content are advertised on the aforementioned live contents showing screen 162 (FIG. 18) corresponding to the "today's live" and program guide list screen 165 (FIG. 20) corresponding to "program guide". When "secret" level is selected, on the other hand, the live content based on the live reservation is not advertised and the live distribution of the live content itself is performed in secret.

Therefore, when "secret" level is selected, only people having the e-mail addresses entered in "friend list" which is described later are notified of the stream distribution of live content based on the live reservation.

The content provider can select a public level out of the aforementioned "public" level, "password" level and "secret" level, considering the live content to be distributed and so on.

For example, when the content provider wants to stream-distribute the live content to specific few people, it is preferable that he selects a distribution channel for little capacity (low price), but if he selects "public" level to allow the free publication, specific people may not be able to receive the stream distribution of the live content due to the capacity when members other than the specific people make a distribution request.

Therefore, to avoid such condition, the content provider can select "password" level or "secret" level in order to reliably and economically stream-distribute the live content to the specific people via the streaming server 8.

In addition, "friend list" in reservation input field 222 is a field for entering the e-mail addresses of friends who the content provider of the user PC 4 wants to receive a notification of the stream distribution of live content on the distribution channel within the time zone based on the live reservation.

The live casting server 150 transmits an e-mail including various information for receiving the stream distribution of the live content based on the live reservation to the e-mail addresses entered in "friend list", which will be explained later.

When the content provider finishes filling in the reservation input field 222 of the reservation screen 402 and clicks on the reservation button 223, the CPU 10 of the user PC 4 creates a reservation demand information file having the same contents as the reservation screen 402 and new reservation setting screen 401 (FIG. 29), and transmits the reservation demand information file to the live casting server 150 via the Internet 2, and then moves to next step SP15.

Note that, the content provider enters letters in each blank of the reservation input field 222 by operating the key board or the like on the reservation screen 402. However, as items such as "genre" of which the contents to be entered are fixed, the content provider can perform the input operation by selecting and designating any out of plural selectable items displayed in a pull-down menu.

At step SP15, the live casting server 150 receives the reservation demand information file, which was created based on the contents entered by the content provider, via the Internet 2, and transmits the confirmation Web page to the user PC 4 for reconfirmation whether the contents of the received reservation demand information file are correct, and then moves to next step SP16.

Thereby, the user PC 4 displays the reservation confirmation screen 403 as shown in FIG. 31 based on the confirmation Web page received from the live casting server 150.

The content provider reconfirms the contents of the live reservation on the reservation confirmation screen 403, and knows a message informing that a reconfirmation should be conducted by a prescribed time (for example, 6 hours) before the live distribution start time, and then clicks on an OK button 240 if the contents of the live reservation are correct, or clicks on a cancel button 241 otherwise.

When the content provider clicks on the cancel button 241, the user PC 4 transmits this information to the live casting server 150. The live casting server 150 deletes the reservation demand information file and makes the user PC 4 display the reservation screen 402 (FIG. 30) for reenter.

When the content provider clicks on the OK button 240, on the contrary, the CPU 10 of the user PC 4 transmits this information to the live casting server 150 via the Internet 2 at step SP16 and then moves to next step SP17.

Since the live casting server 150 receives the OK sign from the user PC 4, it checks the contents of the reservation demand information file received from the user PC at step SP14, to determine whether to accept the reservation at step 17, and then moves to next step SP18.

In actual, the live casting server 150 checks whether there are any mistakes in the contents of the reservation demand information file, whether the desired distribution channel is free within the desired time zone, and further whether the content provider, who wants this live reservation, has reservations more than the set maximum number of frames.

Specifically, as described above, in the live casting service, each content provider has the maximum number of frames (for example, one frame is equivalent to ten minutes) for reservation for live distribution for one month.

Therefore, the live casting server 150 detects whether the number of frames reserved by the content provider for live for one month reaches the set maximum number of frames, as one of check items to accept a live reservation, and if yes, the live casting server 150 does not accept the live reservation.

When the number of frames reserved by the content provider for live for one month does not reach the set maximum number of frames, on the contrary, the live casting server 150 determines that the result of this check has no problem and then accepts the live reservation if the results of the other check items have no problem as well.

In order that the live casting server 150 checks the number of frames reserved by a content provider for one month, the user database 152 stores the reservation status of live reservations for at least last one month for each content provider who is a premium member.

When the live casting server 150 accepts the live reservation, it creates a reservation ID which is used for identification when the live is conducted, and performs the reservation registration by recording the reservation contents information including the reserved time zone, distribution channel, transmission band (bit per second (bps)), mail addresses of friend list, based on the contents of the reservation demand information file, and the user ID and reservation ID for identifying the content provider, in the reservation database 151 (FIG. 15), at step SP18, and then moves to next step SP19.

Note that, the charging flag information indicating whether charging is possible is "no" at the time of the reservation registration. And when the reservation registration is concluded by reconfirmation thereafter, this charging flag is changed to be "yes".

In addition, the live casting server 150 adds the information on the-live reservation to the Web page of "my channel" (personal casting service top page screen 160) of the content provider who made the reservation registration.

In addition, when the public level in the live reservation is "public" level or "password" level, the live casting server 150 updates the live contents showing screen 162 corresponding to "today's live" of the aforementioned personal casting service top page screen 160 to advertise the live content based on the live reservation.

That is, the live casting server 150 stores the matter in that the stream distribution of live content is conducted based on the live reservation, in a viewable format, thereby allowing the client users of the client PCs 7A, 7B and 7C who get access via the Internet 2, to see the live contents showing screen 162 and to know that the live distribution based on the live reservation is carried out.

When not only "public" level but also "password" level is set, the live casting server 150 allows the live contents showing screen 162 informing that the live distribution based on the live reservation is carried out, to be seen, thereby allowing other parties to know about the live distribution.

When "secret" level is set, on the other hand, the live casting server 150 never advertise the information on the live distribution to be carried out based on the live reservation, on the live contents showing screen 162 corresponding to "today's live" and the program guide list screen 165 corresponding to "program guide".

Therefore, as to the live distribution of "secret" level, the live casting server 150 receives an e-mail which is described later, and informs only specific members who can receive the live distribution that the live distribution is carried out.

After the reservation registration processing, the live casting server 150 transmits the Web page for making the content provider agree to instructions about copyright, prohibited items and so on for using the personal casting service, to the user PC 4 which then displays the Web page on the display part 14.

Then the live casting server 50 receives the notification of the agreement of content provider, from the user PC 4, and transmits a reservation registration completion screen 404 for indicating the completion of the reservation registration as shown in FIG. 32, to the user PC 4 which then displays it.

This reservation registration completion screen 404 shows a message informing the content provider of the necessity of reconfirmation, and has "OK" button 245 to make a reconfirmation.

When a click on the "OK" button 245 is made on the reservation registration completion screen 404, the live casting server 150 completes the reservation procedure, except for reconfirmation, and then transmits an e-mail including the reservation ID for live reservation to the user PC 4 at step SP19, and terminates a sequence of the reservation registration processing for the live distribution.

(2-4) Reconfirmation

In the personal casting service of the content distribution system 1, the content provider needs to make a reconfirmation by 6 hours before the live distribution start time as described above, and the reservation of the live distribution is compulsory cancelled if the reconfirmation is not made.

That is, in the content distribution system 1, the content provider who has obtained the reservation ID for live reservation via the e-mail from the live casting server 150, makes a reconfirmation with the user PC 4, in order to conclude the reservation of live distribution.

Note that, the content provider can use a PC different from the user PC 4 to be used for live distribution, to conduct the aforementioned reservation registration procedure till the reception of the reservation ID for live reservation, but he has to use the user PC 4 to be used for live distribution to make a reconfirmation.

Figure 33:
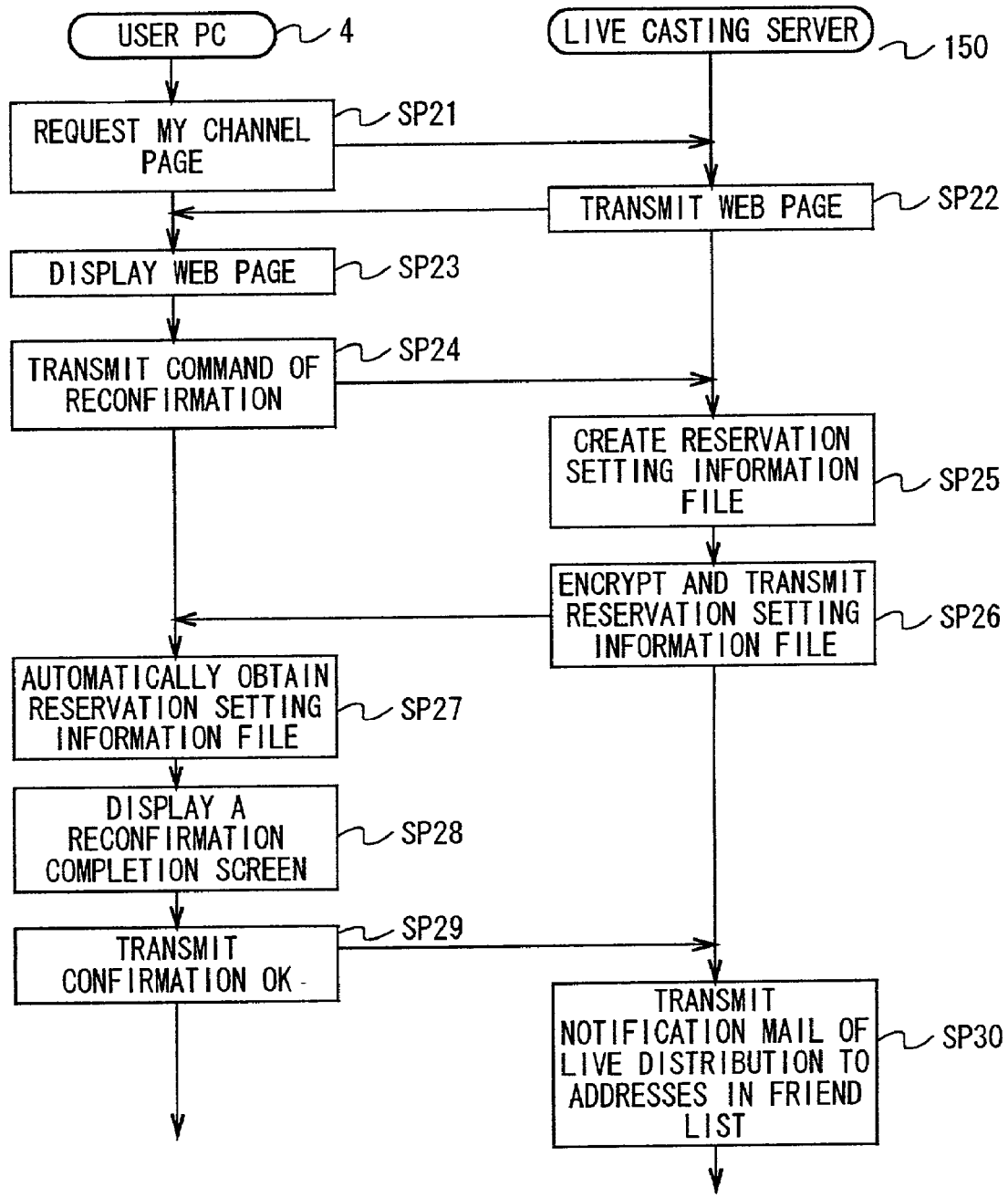
FIG. 33 is a flowchart showing a sequence of reconfirmation processing.

Therefore, in the following explanations, the user PC 4 is used to make a reconfirmation, and the processing operations of the user PC 4 and live casting server 150 for reconfirmation will be explained with-reference to a sequence of the reconfirmation processing shown in FIG. 33.

At step SP21, the user PC 4 displays the initial screen 35 (FIG. 5) in accordance with the aforementioned application programs when the power is turned ON, and when a live reservation/confirmation mode is selected on the initial screen 35, the user PC 4 displays the live reservation/confirmation mode screen 53 (FIG. 9A) on the display part 14.

When the content provider selects and confirms a reserved item to be reconfirmed, out of plural reserved items being displayed on the reservation list display area 95, on the live reservation/confirmation mode screen 53, by operating the jog dial 16B, the user PC 4 makes a request for a Web page of "my channel" corresponding to the content provider to the live casting server 150 via the Internet 2, and then moves to next step SP22.

Note that, the user PC 4 displays the personal casting service top page screen 160 (FIG. 16) by directly entering the URL, and performs the login processing by entering the user ID and password on the personal casting service top page screen 160, and by clicking on the link button of "my channel", a request can be made for the Web page of "my channel".

At step SP22, the live casting server 150 transmits the requested Web page of "My channel" to the user PC 4 via the Internet 2, and then moves to next step SP23.

At step SP23, the user PC 4 displays a my channel screen 182 as shown in FIG. 34 in the browser display screen 90 of the live reservation/confirmation mode screen 53, based on the Web page received from the live casting server 150.

This my channel screen 182 has a reservation list 250 listing the reserved lives which are currently registered in the live casting server 150, a link button 251 for jump to the Web page for allowing the content provider to confirm the number of viewers who saw his lives in the past, and a link button 252 for jump to the Web page for changing the reservation setting information file of the content provider registered in the user database 152.

In addition, the my channel screen 182 explains a method of canceling a live reservation and a method of changing the user information, and especially, explains that in order to change the contents of live reservation relating to the distribution channel, date and time in the personal casting service, the live reservation is canceled once and a live reservation should be newly made. On the other hand, regarding to information such as title name and outline, other than the distribution channel, date and time, it can be changed, without canceling the reservation.

The reservation list 250 displays "reserved data and time", "channel", "title", a status item showing that this live reservation has "not reconfirmed" or "reconfirmed", and "cancel" button to cancel this reservation, for each live reservation (the figure shows only one reservation).

As to the status item, when the live reservation has not reconfirmed, "not reconfirmed" appears as shown in the figure, while "reconfirmed" appears on the my channel screen 182 after the reconfirmation is made.

When a click on "not reconfirmed" on the my channel screen 182, the user PC 4 makes a request for a reconfirmation screen to the live casting server 150 via the Internet 2.

Then, the live casting server 150 transmits the Web page for the reconfirmation screen to the user PC 4 via the Internet 2 in response to the request for the reconfirmation screen, and then the user PC 4 displays a reconfirmation screen 183 as shown in FIG. 35.

This reconfirmation screen 183 displays items such as "user ID", "channel", "reserved date and time", "public level", "title", "genre", "e-mail disclosure", "Web disclosure", "password", "friend list", "outline", and "details", set for the live reservation, an input field for reservation ID, and a message for guiding the content provider to enter the reservation ID for a reconfirmation.

When the content provider makes a reconfirmation, he enters the reservation ID included in the e-mail transmitted from the live casting server 150 in the aforementioned registration procedure of the live reservation, in the input field for the reservation ID and then clicks on the reconfirmation button 261. If the content provider wants to return to the my channel screen 182 (FIG. 34) displaying the reservation list 250 and so on, he just clicks on a return button 262.

By the way, when the content provider clicks on the reconfirmation button 261 on the reconfirmation screen 183, the setting for establishing a transmission line with the streaming server 8 for live distribution is automatically made, and therefore the reconfirmation screen 183 displays a message in that the reconfirmation should be made with the user PC 4 to be used for live distribution.

In actual, when the content provider clicks on the reconfirmation button 261, the CPU 10 of the user PC 4 transmits this information to the live casting server 150 via the Internet 2, and then receives the Web page for entering the card information of a credit card for reconfirmation, from the live casting server 150.

The user PC 4 displays a card information input screen 405 as shown in FIG. 36 based on the Web page received from the live casting server 150, and makes the content provider who is a premium member, enter the card information of a credit card for reconfirmation.

This card information input screen 405 displays the reserved contents set on the aforementioned new reservation setting screen 401 (FIG. 29) as "reserved date", "reserved time zone", "distribution channel", "distribution time" and "fee" of the reservation contents display field 452, for the reconfirmation by the content provider, and also displays a card information input field 453 of a credit card for confirmation.

When the content provider enters the card information of a credit card in the card information input field 453 and clicks on "reservation", the CPU 10 of the user PC 4 transmits this information as an instruction of reconfirmation to the live casting server 150 via the Internet 2 at step SP24.

The live casting server 150 gets access to the user database 152 of the server reservation control center 5 when receiving that instruction, to execute the identification processing of the credit card and to display a card authority screen 406 as shown in FIG. 37.

This card authority screen 406 displays a comment "Credit information is under authorization. Please wait.", to inform the content provider that the identification processing is being conducted.

When the live casting server 150 identifies that the content provider is a right premium member, through the identification processing of the user database 152 by the server reservation control center 5, the live casting server 150 references the reservation database 151 and user database 152 to create a reservation setting information file as shown in FIG. 38 about the live reservation corresponding to the reconfirmation instruction at step SP25.

The live casting server 150 deletes data relating to the live reservation from the reservation database 151 at 6 hours before the live distribution start time based on the live reservation to cancel the live reservation, out of plural live reservations registered in the reservation database 151.

That is, after 6 hours before the live distribution start time based on a live reservation, data relating to the live reservation is deleted from the reservation database 151.

Therefore, even if the live casting server 150 receives the reconfirmation instruction after 6 hours before the live distribution start time, the reservation database 151 has no data relating to the live reservation.

In this case, the live casting server 150 transmits a Web page for displaying a message such as "The live reservation has been canceled due to the failure of reconfirmation. Please make a reservation for live again", to the user PC 4.

When the live casting server 150 receives the reconfirmation instruction by 6 hours before the live distribution start time, the live casting server 150 creates a reservation setting information file 184 relating to the live reservation.

In this case, the live casting server 150 creates reservation data based on the contents of the reservation demand information file relating to the live reservation corresponding to the reconfirmation instruction and the guidelines of the live casting server 150, in accordance with a prescribed application program, and then creates the reservation setting information file 184 based on the reservation data.

For example, as shown in FIG. 39, as the contents of the reservation data of the reservation setting information file 184, the line 1 describes "Reservation ID=A0000123" for the reservation ID of the reservation setting information file 184, the line 4 describes "LiveReservationTime=2001:03:30:11:55:00-2001:03:30:12:00:00-2001:03:30:12:10:00" for the reserved date and time of live distribution (from 12:00:00 on Mar. 30, 2001 to 12:10:00 on Mar. 30, 2001) in the reservation setting information file 184, and the line 5 describes "PPPReservationTime=2001:03:30:11:55:00-2001:03:30:12:15:00" for the server connectable time zone for live (from 11:55:00 on Mar. 30, 2001 to 12:15:00 on Mar. 30, 2001) in the reservation setting information file 184.

In addition, the line 6 describes "InternetConnection=Yes" indicating whether the Internet connection is allowed for live distribution. Although this is not especially indicated in the reservation setting information file 184, "Yes" is described when the Internet connection is allowed for connection between the user PC 4 and the streaming server 8, and "No" otherwise. And when only the Internet connection is allowed, "Must" is described.

That is, "InternetConnection=No" means that only the dedicated line connection is allowed, "InternetConnection=Yes" means that any of the dedicated line connection and Internet connection is allowed, and "InternetConnection=Must" means that only the Internet connection is allowed.

In actual, "InternetConnection=No" is set to the reservation data when the content provider selects "standard: only via dedicated line for up-stream" in the distribution environment setting pull-down menu 442 of the distribution environment setting screen 400 (FIG. 26).

In addition, since "InternetConnection=Yes" allows any of the dedicated line connection via the dedicated server connection network 6, the Internet connection via the telephone line network 3A, and the broadband Internet connection via the high rate digital line network via the cable television network 3B or ADSL network 3C, this is set in the reservation data when the content provider selects "broadband: via dedicated line or the Internet, which is selectable, for up-stream" item on the distribution environment setting screen 400 (FIG. 26).

Furthermore, since "InternetConnection=Must" allows only the Internet connection via the telephone line network 3A, this is set in the reservation data when the content provider selects "standard: only via the Internet for up-stream".

Hereinafter, this reservation data shows the explanation of the case where the content provider selects "broadband: via dedicated line or the Internet, which is selectable, for up-stream" item as an example.

The line 7 shows that the user ID is "PPPUserID=aaaa" in conducting the PPP connection, and the line 8 shows that the password is "PPPUserPassword=bbbb" in conducting the PPP connection.

Lines 9 to 12 show that the types of circuits for conducting the dedicated line connection with the streaming server 8 via the dedicated server connection network 6, and describe "CarrierName0=analogue", "CarrierName1=ISDN", "CarrierName2=PHS64K" and "CarrierName3=PHS32K" in this example.

Lines 13 to 16 show the telephone numbers of access ports of the dedicated server connection network 6 for conducting the dedicated line connection with the streaming server 8 via the aforementioned lines, and describe "CarrierTelephoneNumber0=03-12345670", "CarrierTelephoneNumber1=03-12345671", "CarrierTelephoneNumber2=03-12345672", "CarrierTelephoneNumber3=03-12345673" for each telecommunication carrier.

Lines 17 to 20 show the transmission band (kbps) for the aforementioned lines, and describe "CarrierMaxWidth0=33600", "CarrierMaxBandWidth1=64000", "CarrierMaxWidth2=58400", and "CarrierMaxWidth3=29200".

Note that, lines 9 to 20 are data necessary for conducting the dedicated line connection, and is data which is not described when "standard: only via the Internet for up-stream" is selected on the distribution environment setting screen 400.

The type of circuit to be used in conducting the Internet connection is recognized by the user PC 4 itself and therefore is not described in the reservation data.

Lines 25 and 26 show the user ID and password for connecting with the streaming server 8 and describe "LiveServerUserID=aaaa" and "LiveServerUserPassword=bbbb".

Lines 28 and 29 separately show the server name when connection with the streaming server 8 is made by the dedicated line connection and the server name when connection with the streaming server 8 is made by the Internet connection, and describe "LiveServerName0=LiveServer.com" and "LiveServerName1=Internet.LiveServer.com", respectively.

Line 36 shows the actual transmission band in the dedicated line connection, and describes "LiveServerMaxBandWidth0=65536 bps". Similarly, line 37 shows the actual transmission band in the broadband Internet connection, and describes "LiveServerMaxBandWidth1=25000 bps".

That is, when the dedicated line connection is made, the live content is uploaded from the user PC 4 to the streaming server 8 at the transmission rate of 65536 kbps at maximum which depends on the transmission band of the ISDN circuit connecting the dedicated server connection network 6 and the user PC 4. When the broadband Internet connection is made, on the other hand, the live content is uploaded from the user PC 4 to the streaming server 8 at the transmission rate of 250000 kbps at maximum which depends on the digital line network of cable television network 3B or the ADSL network 3C.

The line 38 shows whether the multistream live distribution by the streaming server is allowed, as the guideline of the live casting server 150 depending on the processing ability of the streaming server 8 and the distribution environment of the user PC 4, and describes "LiveMutiStream=Yes".

That is, when the live casting server 150 determines that the multistream distribution is possible, based on the distribution environment of the user PC 4 by the broadband Internet connection and the processing ability of the streaming server 8, and line 38 describes "LiveMultiStream=Yes".

Furthermore, the line 39 shows the maximum number of streams which the streaming server 8 can distribute in the live distribution by the multistream distribution, and only when the line 38 describes "LiveMultiStream=Yes", the line 39 describes "LiveRealServerMultiStreaMax=3", for example. Therefore, when "LiveMultiStream=No", the description of the line 39 is omitted.

The line 40 shows the types of transmission rates settable to transmit the live content from the user PC 4 to the streaming server 8, in the live distribution by the multistream distribution via the streaming server 8, as the guideline of the live casting server 150, and describes "LiveRealServerMultiStreamTypeMask=0x001f".

The "LiveRealServerMultiStreamTypeMask=0x001f" indicates a combination of selectable plural transmission rates in hexadecimal notation, that is, "0x0001:20 kbps", "0x0002:34 kbps", "0x0004;45 kbps", "0x0008:80 kbps", and "0x0010:220 kbps". This "0x001f" means that the transmission rates, "0x0001", "0x0002", "0x0004", "0x0008", and "0x0010" are all selectable and settable.

In this case, since the total of "0x0001", "0x0002", "0x0004", "0x0008", and "0x0010" in hexadecimal notation does not exceed "0x001f", the all transmission rates are selectable.

In this case, since the maximum number of streams which the streaming server 8 can transmit in the multistream live distribution is 3 ("LiveRealServerMultiStreamMax=3"), the user PC 4 can select, for example, "0x0001", "0x0004", and "0x0008" out of the aforementioned transmission rates, in order to perform the parallel transmission of a plurality of live content at the different transmission rates, 20 kbps, 45 kbps, and 80 kbps (the total of transmission rates, 145 kbps, is smaller than 250 kbps ("LiveServerMaxBandWidth1=250000" on the line 37)), to the streaming server 8 via the cable television network 3B or ADSL network 3C and the Internet 2.

The line 41 shows a transmission rate necessary for the multistream distribution as the guideline of the live casting server 150, and describes "LiveRealServerMultiStreamTypeMaskMust=0x0001" in this case.

Thereby, the content provider of the user PC 4 compulsory selects the transmission rate of 20 kbps in selecting transmission rates for the multistream distribution.

As a result, even when the user PC 4 performs the live distribution by the broadband Internet connection, not only client users who can use the broadband but also client users who can not receive live distribution in broadband can receive the stream distribution.

The line 42 shows a transmission rate which is determined as default to perform the multistream distribution, as the guideline of the live casting server 150, and describes "LiveRealServerMultiStreamTypeMaskDefault=0x0005".

In this case, "0x0005" in "LiveRealServerMultiStreamTypeMaskDefault=0x0005" specifies only a combination of transmission rate items, "0x0001:20 kbps" and "0x0004:45 kbps", which shows selectable transmission rates shown in FIG. 40, thus automatically selecting a transmission rate 20 kbps or 45 kbps as default.

Thereby, even when a beginner content provider does not select a transmission rate, the user PC 4 can set one transmission rate 20 kbps or 45 kbps, which is selected as recommended rate as default, based on the reservation data.

Note that, line 45 designates the public level as "OpnType", and describes "OpenType=Public".

Finally, line 46 shows the transmission designations which receive the reservation contents of the live reservation via an e-mail, and indicates that an e-mail is to be transmitted to, for example, "nishy@aaa.com" and "ihara@bbb.com".

The reservation setting information file 184 (FIG. 38) created based on the reservation data includes information such as "reservation ID", "reserved date and time for live distribution", "server connectable time for live", "telephone number for connection", "server information of connection destination", "address information for distribution request", "transmission band", "title", "outline", "public level", "friend list address information", and "password for distribution request".

"Reservation ID" describes the reservation ID corresponding to "ReservationID=A0000123" in the aforementioned reservation data. "Reserved date and time for live distribution" describes the start time and end time of live distribution corresponding to "LiveReservationTime=2001: 03:30:11:55:00-2001:03:30:12:00:00-2001:03:30:12:10:00" in the reservation data. And "server connectable time for live" describes the time zone for allowing connection with the streaming server 8, corresponding to "PPPReservationTime=2001:03:30:11:55:00-2001:03:30:12:15:00".

In this case, it is described that the time zone for allowing the connection with the streaming server 8 is after five minutes before the live distribution start time till five minutes after the live distribution end time.

"Telephone number for connection" describes the telephone numbers of the access ports of the dedicated server connection network 6 for conducting the dedicated line connection with the streaming server 8, and in this example, describes the telephone numbers corresponding to "CarrierTelephoneNumber0=03-12345670", "CarrierTelephoneNumber1=03-12345671", "CarrierTelephoneNumber2=03-12345672", "CarrierTelephoneNumber3=03-12345673" in the reservation data.

Actually, as the connection processing with the streaming server 8 by the dedicated line connection, processing of calling the telephone number of the access port of any telecommunication carrier selected by the content provider is performed.

"Server information of connection destination" is an item which is decided according to a distribution channel selected through the live reservation, and information including "the kind of server", "server name", "connectable port", "stream path to server", on the server to be connected is described in accordance with the contents of reservation data at the time of designating the distribution channel.

"Address information for distribution request" shows URL information based on the reservation data, to be used for connection with the streaming server 8 when the client PCs PC 7A, 7B, and 7C make a request for stream distribution of live content to the streaming server 8.

Therefore, when the client PCs 7A, 7B and 7C make a request for the stream distribution of live content, they can use the URL to connect with the streaming server 8 via the Internet 2.

"Transmission band" describes 20 kbps, 34 kbps, 45 kbps, 80 kbps, and 220 kbps corresponding to "0x0001:20 kbps", "0x0002:34 kbps", "0x0004:45 kbps", "0x0008:80 kbps", "0x0010:220 kbps" which are a combination determined by "LiveRealServerMultiStreamTypeMask=0x001f" in the reservation data, as selectable transmission rates for the distribution channel.

"Title", "outline", "Public level" describe the contents which were registered on the reservation screen 402 (FIG. 30) and the reservation confirmation screen 403 (FIG. 31) in the live reservation.

"Friend list address information" describes the e-mail addresses registered in the live reservation, corresponding to "Friends=nishy@aaa.com,ihara@bbb.com" of the reservation data.

"Password for distribution request" also describes password information which was registered in the live reservation. In the case where "public level" is "public" level, however, the client PCs 7A, 7B and 7C can make a request for live distribution without entering the password for distribution request, so that the reservation setting information file does not includes "password for distribution request".

As described above, the reservation setting information file 184 created by the live casting server 150 includes various information such as the reservation ID to be used for identification in conducting the dedicated line connection or Internet connection with the streaming server 8, described later, the telephone number and the connection port for establishing the communication connection with the streaming server 8.

This reservation setting information file 184 is transmitted from the live casting server 150 to the user PC 4 via the Internet 2, this reservation information file 184 including command information to automatically store this reservation setting information file 184 in a prescribed storage area of the hard disk 13 of the user PC 4, and command information for displaying a message informing that this automatic storage has been successively completed or failed.

In order to automatically store this reservation setting information file 184 transmitted from the live casting server 150 in the user PC 4, the "ActiveX" program (trademark of Microsoft corporation) may be used. In this connection, in the case of using this "ActiveX" program, the user PC 4 should use "Internet Explorer" (Microsoft) capable of using "ActiveX" as browser software.

When the live casting server 150 creates the aforementioned reservation setting information file 184, it transmits to the user PC 4 a Web page for formally allowing the connection setting with the streaming server 8.

The CPU 10 of the user PC 4 displays a connection setting screen 407 as shown in FIG. 41 based on the Web page for allowing the connection setting, received from the live casting server 150, for selecting "automatic setting" or "download reservation file".

When a click on "automatic setting" is made on this connection setting screen 407, the CPU 10 of the user PC 4 transmits a request to automatically obtain the reservation setting information file 184 based on the reservation data, to the live casting server 150.

In this connection, a "download reservation file" link button on the connection setting screen 407 is provided for downloading the reservation setting information file 184 in a text file format, from the live casting server 150 in the case where the reservation setting information file 184 is not automatically downloaded.

At step SP26, the live casting server 150 encrypts the reservation setting information file 184 in a cipher system such as Data Encryption Standard (DES), and transmits the coded file and the Web page for the reconfirmation completion screen to the user PC 4 via the Internet 2, and moves to next step SP27.

At step SP27, the user PC 4 receives the coded file and the Web page for the reconfirmation completion screen, transmitted from the live casting server 150, and deciphers the coded file into the original reservation setting information file 184 using the "ActiveX" program, and automatically stores the reservation setting information file 184 in a prescribed storage area of the hard disk 13 based on the command included in that file, and then moves to next step SP28.

At step SP28, the user PC 4 displays a reconfirmation completion screen 185 as shown in FIG. 42 in a browser display screen 90 of the live reservation/confirmation mode screen 53 based on the Web page for the reconfirmation completion screen received from the live casting server 150, and moves to next step SP29.

As described above, the user PC 4 deciphers the coded file based on the "ActiveX" program which is to decipher aforementioned encryption, and in the case of storing the resultant reservation setting information file 184 in a prescribed storage area of the hard disk 13, encrypts again and automatically stores the reservation setting information file 184 with a program which is for encryption in a prescribed encryption system (DES or the like) and storage, thereby preventing the contents of the reservation setting information file 184 from being referenced by the content provider.

Thereby, the user PC 4 prevents many people from unnecessarily knowing the access port number of the dedicated server connection network 6, and a person from falsifying the distribution band, the number of multistreams, and the set values of recommended bands, thus it can be previously avoided that illegal accesses to the access port of the dedicated server connection network 6 are performed to obstruct the personal casting service and thereby the multi-stream distribution can not be carried.

By the way, the reconfirmation completion screen 185 displays the present time of the service provider side and the present time of user PC 4.

This present time of the service provider side is based on the time information which is obtained from the NTP server 153 when the live casting server 150 transmits the reconfirmation completion screen 185. The present time of the user PC 4, on the other hand, is based on the time information obtained by the clock of the user PC 4.

The CPU 10 of the user PC 4 calculates the difference in the present time (on a minute basis) between the service provider side and the user PC 4, and if the time difference exists, it displays a message informing of this time difference.

Note that, the user PC 4 can not only notify the content provider of this time difference from the service provider side in this way, but also automatically correct time thereof based on the time information of the service provider side transmitted from the service provider.

In this case, the user PC 4 stores a time correction program in the hard disk 13, and corrects the present time thereof to be the present time of the service provider side in accordance with the time correction program when receiving the Web page for the reconfirmation completion screen 185 from the live casting server 150, thus making it possible to smoothly use service such as live distribution which requires exactness of time.

In addition, the reconfirmation completion screen 185 describes the special regulations for the dedicated line connection with the dedicated service connection network 6 using a dial-up router. In the case of performing communication connection processing with the streaming server by the dedicated line connection for live distribution, the user PC 4 has setting to automatically call the telephone number of the access port of the dedicated server connection network 6 included in the reservation setting information file 184 (FIG. 39).

As described above, the CPU 10 of the user PC 4 executes the application program for automatically making a call, thus automatically performing the communication connection processing by the dedicated line connection, even the content provider does not perform a bothering work such as entering the telephone number.

In this case where the user PC 4 connects with the network via the dial-up router, however, the content provider should manually set the telephone number of the access port and the like, because information for connecting with the dedicated server connection network 6 via the dial-up router should be set in advance.

The special regulation is displayed on the reconfirmation completion screen 185 because the manual setting may be needed for using the dial-up router, and in this case, an access port number, login ID (in this case, reservation ID) and password are displayed so that the content provider can manually set them.

Note that, the reconfirmation completion screen 15 shows that the dedicated line connection using the dial-up router is allowed only via the integrated service digital network (ISDN), as an example, but it is not limited.

When content provider clicks on "OK" button 291 after confirming the reconfirmation completion screen 185, the CPU 10 of the user PC 4 transmits information indicating that a click on the "OK" button 291 has been made, to the live casting server 150 via the Internet 2 at step SP29, thereby completing processing for reconfirmation by the user PC 4, and then the process moves to step SP30.

When the live casting server 150 receives the notification indicating that the reconfirmation has been made, from the user PC 4, it transmits an e-mail indicating that the live distribution is performed, to the e-mail addresses registered in "friend list" in the live reservation by referencing the reservation database 151 at step SP30, thereby completing processing for reconfirmation by the live casting server 150.

Then, the client PCs 7A, 7B and 7C which have received the e-mail from the live casting server 150, displays an e-mail screen 186 showing the contents of the e-mail as shown in FIG. 43.

This e-mail screen 186 displays "distribution date and time", "title", "address for distribution request" (refer to "address information for distribution request" of the reservation setting information file 184), "password" (refer to "password for distribution request" of the reservation setting information file 184) which is used for a distribution request when the public level is "password" level or "secret" level, and the like, so as to inform the client users of the client PCs 7A, 7B and 7C of information of the live content in the live reservation.

If the content provider of the user PC 4 registers the e-mail addresses of friends and so on who the content provider wants to see the live distribution, in the reservation setting information file 184 in the live reservation, that friends can automatically receive information for receiving the live distribution, thus omitting bothering works such as telling information for receiving the live distribution on the phone and creating an e-mail including that information.

Note that, in the present embodiment, an e-mail is transmitted to the e-mail addresses registered in "friend list" after the reconfirmation is made. The e-mail, however, can be transmitted from the live casting server 150 when the content provider finishes the reservation registration processing (step SP18 of FIG. 26) in the reservation database 151 based on the reservation demand file.

If the e-mail is transmitted when the reservation registration processing is completed in this way, the people having the e-mail addresses can know about the live distribution earlier. In addition, the same e-mail can be transmitted again when the reconfirmation is completed.

When the transmission of the e-mail and the reconfirmation is completed, the live casting server 150 concludes the live reservation and rewrites the charging flag information of the reservation database 151 about this live reservation to "Yes", and performs charging processing for the live reservation.

The charging fee is calculated based on the fee preset for each channel as described above. For example, in the case of concluding the live reservation using a channel having a fee ¥100 per 1 frame (10 minutes), for 6 frames, charging is made for ¥600 for the live reservation. The actual charging processing, however, is performed after confirming whether the streaming server 102 works properly on the live distribution date.

Until now, a flow of reservation processing from a request for live distribution till the conclusion of live reservation by reconfirmation has been described. Information such as genre and outline, however, can be changed after reconfirmation is completed, and in addition, the live reservation can be canceled after the reconfirmation is completed (in this case, since the charging flag information shows "Yes", the charging processing is performed).

(2-5) Changing and Canceling of Live Reservation

Next, processing operations for changing and canceling a live reservation will be described. In the case of changing the live reservation which has been reconfirmed, the content provider clicks on "my channel" on the personal casting service top page screen 160 (FIG. 16), similar to the reconfirmation processing described above.

Thereby, the CPU 10 of the user PC 4 performs the connection processing with the Internet 2 to make a request for the Web page for "my channel" of the content provider to the live casting server 150.

When the user PC 4 makes a request for the Web page for "my channel" to the live casting server 150, the live casting server 150 transmits the Web page of the my channel screen to the user PC 4 via the Internet 2, and thereby the user PC 4 displays a reconfirmed my channel screen 187, on the basis of the Web page in the browser display screen 90 of the live mode screen 53 as shown in FIG. 44.

The difference between the reconfirmed my channel screen 187 and the not-reconfirmed my channel screen 182 (FIG. 34) is that the reconfirmed my channel screen 187 displays "reconfirmed" in the status item of the reservation list 350 and a "change" link button 310.

In order to change the contents of live reservation on the reconfirmed my channel screen 187, the content provider clicks on the "change" link button 310.

When a click on the "change" link button 310 is made, the CPU 10 of the user PC 4 transmits this information to the live casting server 150 via the Internet 2. Thereby the live casting server 150 transmits a reservation setting information changing Web page to the user PC 4 via the Internet 2.

The CPU 10 of the user PC 4 displays a reservation setting information changing screen 187A as shown in FIG. 45 in the browser display screen 90 of the live reservation/confirmation mode screen 53 based on the reservation setting information changing Web page received from the live casting server 150.

This reservation setting information changing screen 187A displays the contents of the live reservation currently set, and out of this contents being displayed, items such as "genre", "e-mail publication", "web publication", "password", "outline", "details" are changeable and these changeable items and the unchangeable items such as reserved date and time are displayed in different colors.

The content provider rewrites the reservation contents currently displayed to the changed reservation contents, and then clicks on an update button 321. Note that, if the content provider wants to stop the changing, just click on a return button 322.

When a click on the update button 321 is made, the CPU 10 of the user PC 4 creates a new reservation demand information file for the changed reservation contents and transmits it to the live casting server 150 via the Internet 2.

Thereby, the live casting server 150 updates the contents registered in the reservation database 151 based on the changed reservation demand information file, and also transmits a Web page informing of the completion of this change to the user PC 4 via the Internet 2.

The CPU 10 of the user PC 4 displays a change completion screen 188 as shown in FIG. 46 in the browser display screen 90 of the live reservation/confirmation mode screen 53 based on the Web page received from the live casting server 150.

In addition to the message informing that the changed reservation contents have been accepted, the change completion screen 188 displays the present time of the service provider and the present time of user PC 4, a message informing of the time difference, and a special regulation for using the dial-up router, similar to the aforementioned reconfirmation completion screen 185 (FIG. 42).

When the content provider clicks on "OK" button 331, the CPU 10 of the user PC 4 finishes changing the live reservation and returns to the reconfirmed my channel 187 (FIG. 44).

When the live reservation is changed, the live casting server 150 transmits an e-mail indicating the change of live reservation and the changed contents to the e-mail addresses registered in the aforementioned friend list.

Thus, the content provider of the user PC 4 can automatically inform the people having the e-mail addresses of the friend list of the changed contents of the live reservation, without telling that the contents of the live reservation for live distribution has been changed on the phone or creating an e-mail including a message for this change.

Next, processing operations for canceling a live reservation will be described. In this case of canceling the live reservation reconfirmed, the content provider clicks on "my channel" on the personal casting service top page screen 160 (FIG. 16), similar to the aforementioned reconfirmation, as is the case of the aforementioned change of live reservation.

Thereby, the CPU 10 of the user PC 4 performs the connection processing with the Internet 2 to make a request for a Web page of "my channel" of the content provider to the live casting server 150.

When the user PC 4 make a request for the Web page of "my channel" to the live casting server 150. The live casting server 150 transmits the Web page of my channel screen to the user PC 4 via the Internet 2, and the user PC 4 displays the my reconfirmed channel screen 187 (FIG. 44), in the browser display screen 90 of the live mode screen 53 based on the Web page.

When the content provider wants to cancel the live reservation on this reconfirmed my channel screen 187, just click on "cancel" link button 311.

When a click on the "cancel" link button 311" is made, the CPU 10 of the user PC 4 transmits this information indicating that a click on the "cancel" button 311 has been made, to the live casting server 150 via the Internet 2. Thereby, the live casting server 150 transmits a Web page for canceling the live reservation to the user PC 4 via the Internet 2.

The CPU 10 of the user PC 4 displays a reservation canceling screen 189 regarding the live reservation as shown in FIG. 47 in the browser display screen 90 of the live reservation/confirmation mode screen 53 based on the canceling Web page received from the live casting server 150.

This reservation canceling screen 189 displays the contents of the currently set live reservation, "cancel" button 341 and "return" button 342. When the content provider wants to cancel the live reservation, just click on "cancel" button 341, or "return" button 342 otherwise.

When the content provider clicks on "cancel" button 341, the CPU 10 of the user PC 4 transmits this information indicating that the live reservation has been canceled, to the live casting server 150 via the Internet 2.

Thus the live casting server 150 deletes the contents registered in the reservation database 151 about this live reservation, and transmits a Web page for a cancel completion screen to the user PC 4 via the Internet 2.

The CPU 10 of the user PC 4 displays a cancel notification screen 190 as shown in FIG. 48, in the browser display screen 90 of the live reservation/confirmation mode screen 53 based on the Web page for the cancel completion screen received from the live casting server 150.

This cancel notification screen 190 displays a message informing that the live reservation has been canceled, and when the content provider clicks on "OK" button 343, the CPU 10 of the user PC 4 recognizes that the content provider has confirmed the cancel of the live reservation and then returns to the reconfirmed my channel screen 187 (FIG. 44).

When the live casting server 150 cancels the live reservation in response to a request from the content provider, it creates an e-mail including a message informing that the live reservation has been canceled and the live distribution is not held, and transmits it to the e-mail addresses registered in the aforementioned friend list.

Thus, the content provider can automatically inform the people having the e-mail addresses of the friend list, that the live distribution has been canceled, without telling the cancel of the live distribution on the phone or the like.

When the content provider wants to confirm the reservation contents after conducting reconfirmation, on the other hand, just click on "reconfirmed" link button on the my channel screen 187 (FIG. 44).

When a click on "reconfirmed" link button is made, the CPU 10 of the user PC 4 transmits this information to the live casting server 150 via the Internet 2. Thereby the live casting server 150 transmits a Web page for confirming the contents of the reconfirmed live reservation, to the user PC 4 via the Internet 2.

The CPU 10 of the user PC 4 displays a reservation confirmation screen 191 as shown in FIG. 49 in the browser display screen 90 of the live reservation/confirmation mode screen 53 based on the Web page for confirming reservation received from the live casting server 150.

This reservation confirmation screen 191 displays the contents of the currently set live reservation, a special regulation for using the dial-up router, a "reregister PC connection setting" button 361 and a "return" button 362 for returning to the reconfirmed my channel screen 187 (FIG. 44).

When the content provider clicks on the "reregister PC connection setting" button 361, the CPU 10 of the user PC 4 transmits this information to the live casting server 150 via the Internet 2.

Thereby, the live casting server 150 automatically accesses the reservation setting information file 184 (FIG. 38) from the user PC 4 via the Internet 2 again. The retransmission of the reservation setting information file 184 is effective for changing the user PC 4 used for reconfirmation to a PC which is to be used for live distribution.

(2-6) Live Distribution

When the live distribution start time in the live reservation comes after the live reservation including reconfirmation is completed, the user PC 4 connects to the streaming server 8 by the dedicated line connection via the dedicated server connection network 6 or by the Internet connection via the cable television network 3B or ADSL network 3C, so as to perform the stream distribution of the live content to the client PCs 7A, 7B and 7C.

(2-6-1) Content transmission From User PC to Streaming Server

Hereinafter, in order to perform the live distribution, a sequence of content transmission processing among the user PC 4, streaming server 8 and database server 155 when the user PC 4 transmits the live content to the streaming server 8 will be described.

When the live distribution is performed, the user PC 4 is allowed to connect to the steaming server 8 by the dedicated line connection or the Internet connection from 5 minutes before the live distribution start time, so processing for establishing the communication connection between the user PC 4 and the streaming server 8 starts after 5 minutes before that start time.

Therefore, the content provider should finish preparing for the live distribution of the live content by 5 minutes before the live distribution start time.

The preparation for the distribution of live content includes the setting of the digital video camera 19 (FIG. 2) of the user PC 4 and the setting processing of effect items of which the special effects should be applied based on the outline of the live content (FIG. 12, FIG. 13 and FIG. 14).

In addition, the user PC 4 of this embodiment stores a notification program regarding the live distribution in the hard disk 13, so as to display a message indicating that "the live distribution start time comes soon" to inform the content provider a prescribed time (10 minutes) before the live distribution start time in accordance with the notification program.

That is, the user PC 4 executes the notification program a prescribed time before the live distribution start time, to display a message "live distribution start time comes soon" at step SP51, so that the content provider notices it, and the process proceeds to next step SP52.

At this time, when the content provider does not set a live distribution mode, the CPU 10 of the user PC 4 automatically sets to be in a live distribution mode in accordance with the application program and displays a live distribution mode screen 54 (FIG. 10) on the display part 14.

At the connection start allowable time (5 minutes before the live distribution start time) with the streaming server 8, the CPU 10 of the user PC 4 executes a prescribed connection processing program to automatically start the communication connection processing by the dedicated line connection or the Internet connection with the streaming server 8.

Figure 51:
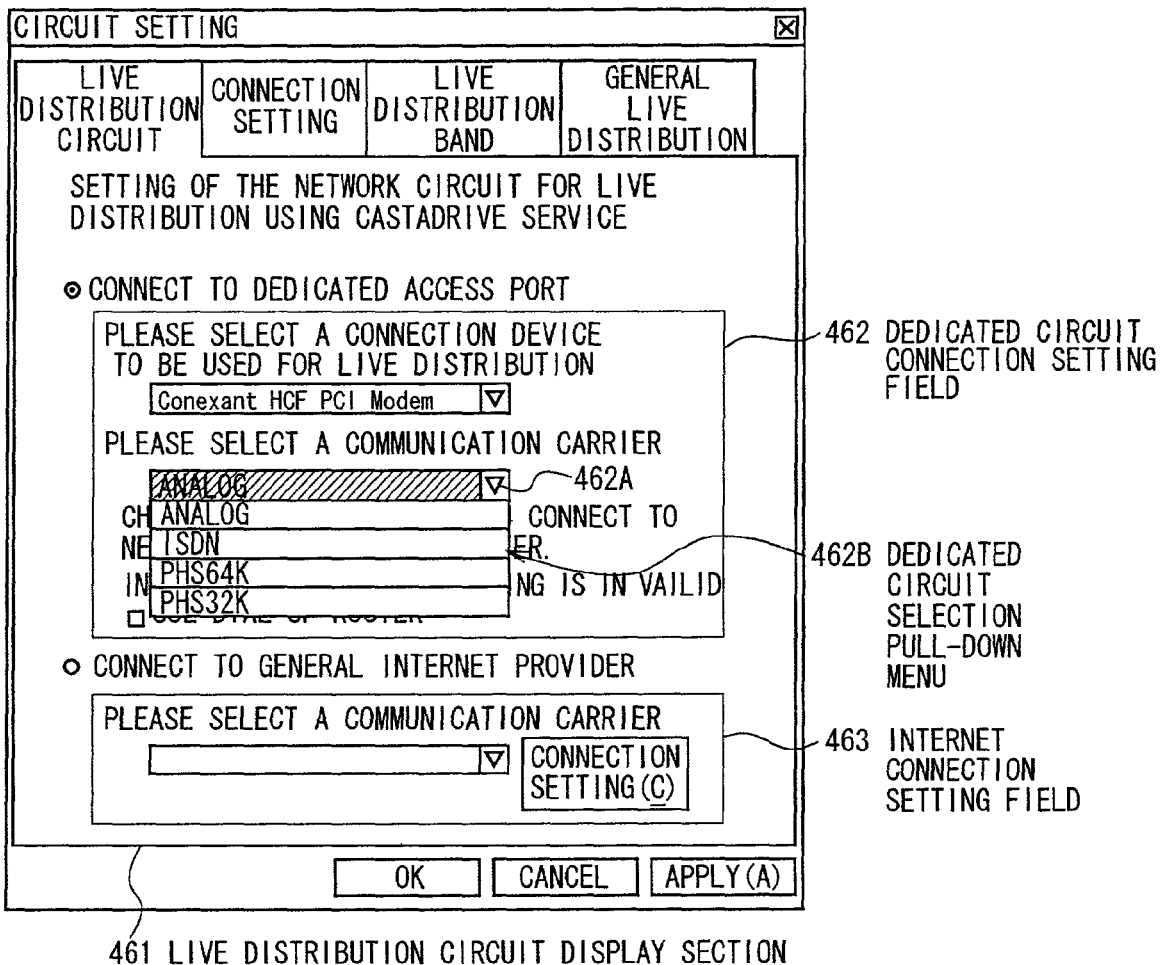
FIG. 51 is a schematic diagram showing a circuit setting screen for dedicated line connection.

At step SP52, the CPU 10 of the user PC 4 displays a circuit setting screen 410 as shown in FIG. 51, based on the Web page transmitted via the reservation setting information file 184 from the live casting server 150.

This circuit setting screen 410 has a live distribution circuit display part 461 for selecting a circuit for live distribution, and the live distribution circuit display part 461 has a dedicated line connection setting field 462 describing "connect to dedicated access port" for selecting the dedicated line connection via the dedicated server connection network 6, and an Internet connection setting field 463 describing "connect to general Internet provider" for selecting the Internet connection via the telephone line network 3A, cable television network 3B or ADSL network 3C.

When the content provider checks the dedicated line connection setting field 462, the CPU 10 of the user PC 4 makes the dedicated line connection setting field 462 active and the Internet connection setting field 463 inactive.

In the case where only the dedicated line connection is set to be allowed at the time of setting reservation (that is, line 6 of the reservation data in the reservation setting information file 184 describes "InternetConnection=No"), the CPU 10 of the user PC 4 also makes the dedicated line setting filed 462 active and the Internet connection setting field 463 inactive.

That is, the CPU 10 of the user PC 4 dynamically controls the display of the circuit setting screen 410 based on the reservation setting information file transmitted from the live casting server 150, so that the user PC 4 can limit the selectable items by making only selectable item active.

This active dedicated line connection setting field allows the selection of a connection device which the user PC 4 uses for the dedicated line connection at the time of the live distribution and also allows the selection of a communication carrier to be used for the live distribution, out of the dedicated line selection pull-down menu 462 opened by clicking on the radio button 462A.

That is, the content provider selects any of "analog", "ISDN", "PHS64K", "PHS32K" to be used, in the dedicated line selection pull-down menu 462B in correspondence with the type of telephone line network 3A connecting to the user PC 4.

Thereby, the CPU 10 of the user PC 4 reads the reservation setting information file 184 (FIG. 38) encrypted and stored in a prescribed registry, in accordance with the prescribed communication connection processing program, performs the communication connection processing based on the information of "reservation ID", "server connectable time", "telephone number for connection", and "information of connection destination" of the reservation setting information file 184, so as to establish a transmission line with the streaming server 8 by the dedicated line connection after performing the identification processing with the database server 155.

Figure 52:
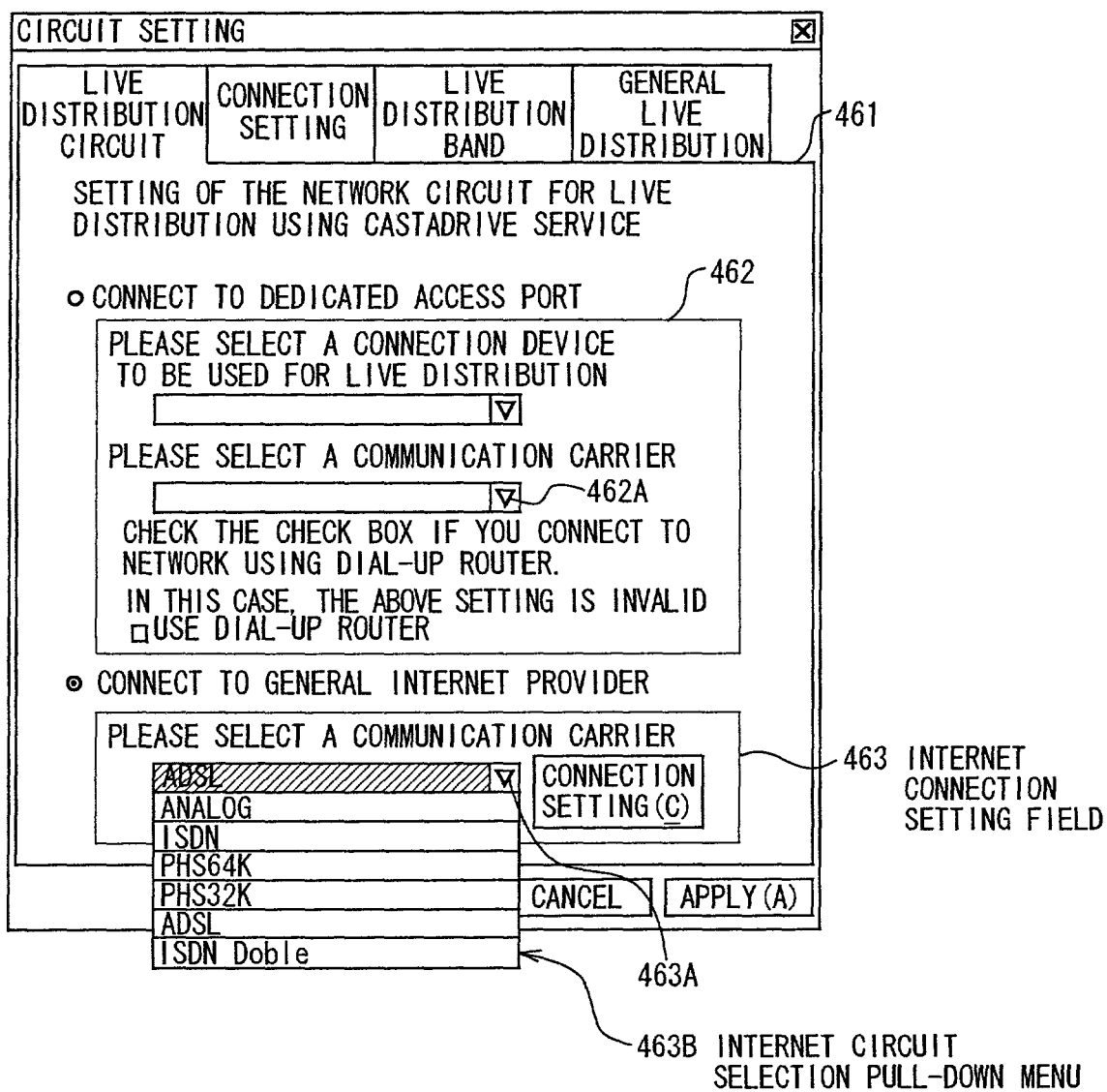
FIG. 52 is a schematic diagram showing a circuit setting screen in Internet connection.

On the other hand, when the content provider checks the Internet connection setting field 463 as shown in FIG. 52, the CPU 10 of the user PC 4 makes the Internet connection setting field 463 active and makes the dedicated line connection setting field 462 inactive.

When only the Internet connection is set to be usable at the time of setting the reservation (that is, line 6 of the reservation data of the reservation setting information file 184 describes "InternetConnection=Must"), the CPU 10 of the user PC 4 also makes the dedicated line connection setting field 462 inactive and the Internet circuit connection setting field 463 active.

In this active Internet connection setting field 463, a communication carrier which the user PC 4 uses in the Internet connection at the time of the live distribution is arbitrarily selected out of an Internet circuit selection pull-down menu 463B opened by clicking on a radio button 463A.

At this time, when the content provider wants the broadband Internet connection, just select "ADSL" or "ISDN Double". When he wants the Internet connection at a normal rate, on the other hand, just select any of "analog", "ISDN", "PHS64K" and "PHS32K" depending on the type of the telephone line network 3A connecting to the user PC 4.

As described above, the CPU 10 of the user PC 4 displays the circuit setting screen 410 based on the reservation setting information file 184 which has been created by the live casting server 150 based on the contents of live reservation conducted by the content provider, to guide the content provider on the circuit setting screen 410, thus the content provider can perform the circuit selection operation matching the distribution environment of the user PC 4 without mistakes.

That is, the live casting server 150 creates the reservation setting information file 184 based on the contents of live reservation conducted by the content provider, and then transmits it to the user PC 4, to guide the content provider on the circuit setting screen 41 displayed based on the reservation setting information file 184, thus making it possible to control the circuit selection operation using the user PC 4 at the time of the live distribution, from the outside.

Figure 53:
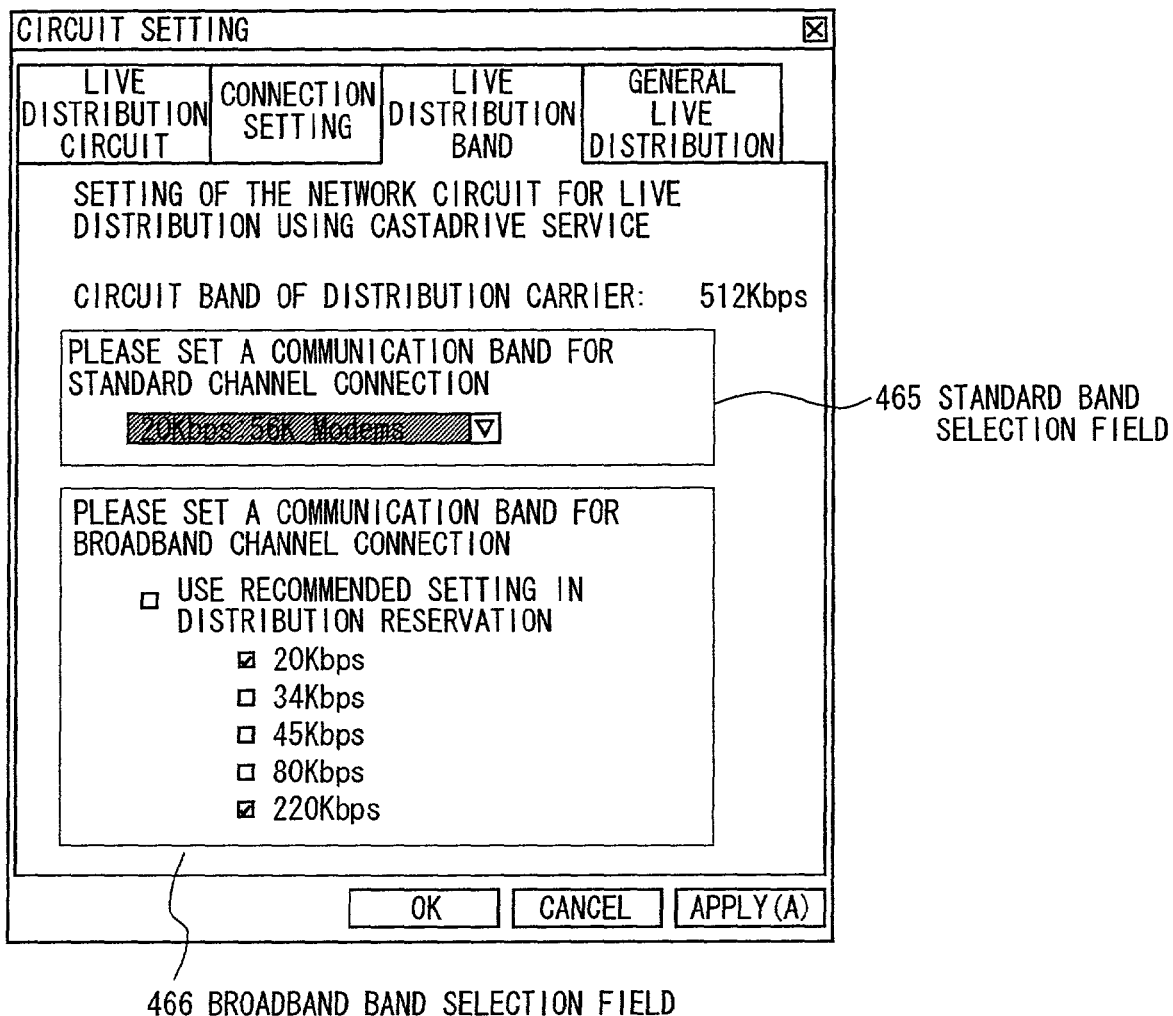
FIG. 53 is a schematic diagram showing a band setting screen.

In addition, when a click on "live distribution band" is made on the circuit setting screen 410, the CPU 10 of the user PC 4 displays a band setting screen 411 as shown in FIG. 53.

The band setting screen 411 has a standard band selection filed 465 displaying "Please set a communication band for standard channel connection", for the dedicated line connection or the standard Internet connection, and a broadband band selection field 466 displaying "Please set a communication band for broadband channel connection" for the broadband Internet connection at a high rate.

In addition, when the dedicated line connection via the dedicated server connection network 6 is selected on the circuit setting screen 410 (FIG. 51), the standard band selection field 465 is active and the broadband band selection field 466 is inactive on the band setting screen 411.

In the standard band selection field 465, a band exceeding the maximum transmission band in distribution by the dedicated line connection or the standard Internet connection can not be selected, and plural bands can not be selected as well.

On the other hand, when the live content can be stream-distributed at three transmission rates via the streaming server 8 (when line 39 of the reservation data of the reservation setting information file 184 describes "LiveRealServerMultiStreamTypeMax=3"), 20 kbps, 34 kbps, 45 kbps, 80 kbps and 220 kbps check boxes are active and any three of them can be selected on the broadband band selection field 466.

It should be noted that the total transmission rate of the three bands must be within the transmission rate in the high-rate Internet connection via the cable television network 3B or ADSL network 3C.

In this case also, when a transmission rate required for the multistream distribution is designated by the reservation data of the reservation setting information file 184 as a regulation by the live casting server 150 (when line 41 of the reservation data describes "LiveRealServerMultiStreamTypeMaskMust=0x0001"), the 20 kbps check box has been checked on the broadband band selection field 466 and this check can not be canceled.

This is because the lowest transmission rate is necessary so that client users who can not perform the high-rate communication can receive the live distribution.

Figure 54:
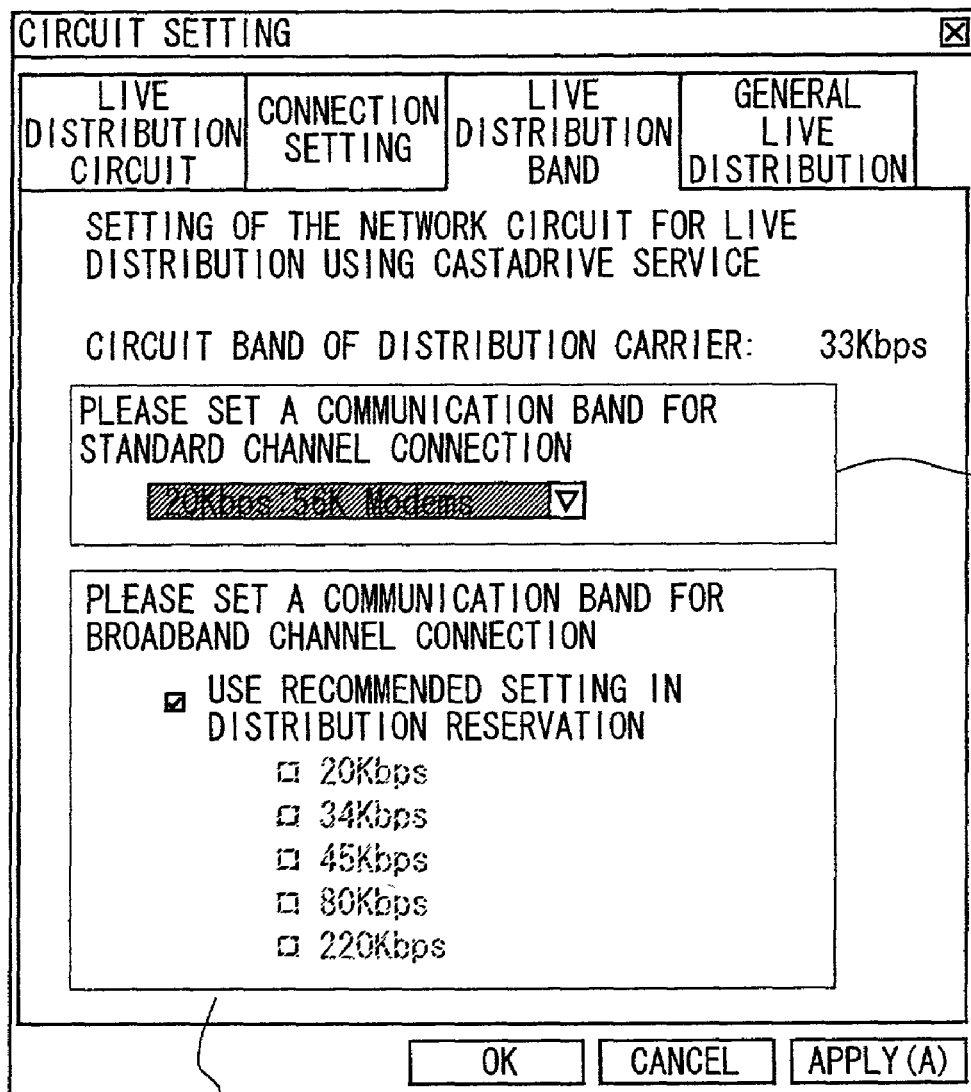
FIG. 54 is a schematic diagram showing a band setting screen for using recommended setting.

When the content provider checks the "use recommended setting in distribution reservation", on the other hand, the 20 kbps, 34 kbps, 45 kbps, 80 kbps, and 220 kbps check boxes are all inactive on the broadband band selection field 466 as shown in FIG. 54, and the 20 kbps and 45 kbps are automatically set as default bands, corresponding to the combination of the transmission rate item "0x0001:20 kbps" and the transmission rate item "0x0004:45 kbps", based on "LiveRealServerMultiStreamTypeMaskDefault=0x0005" described in line 43 of the reservation data of the reservation setting information file 184.

Figure 55:
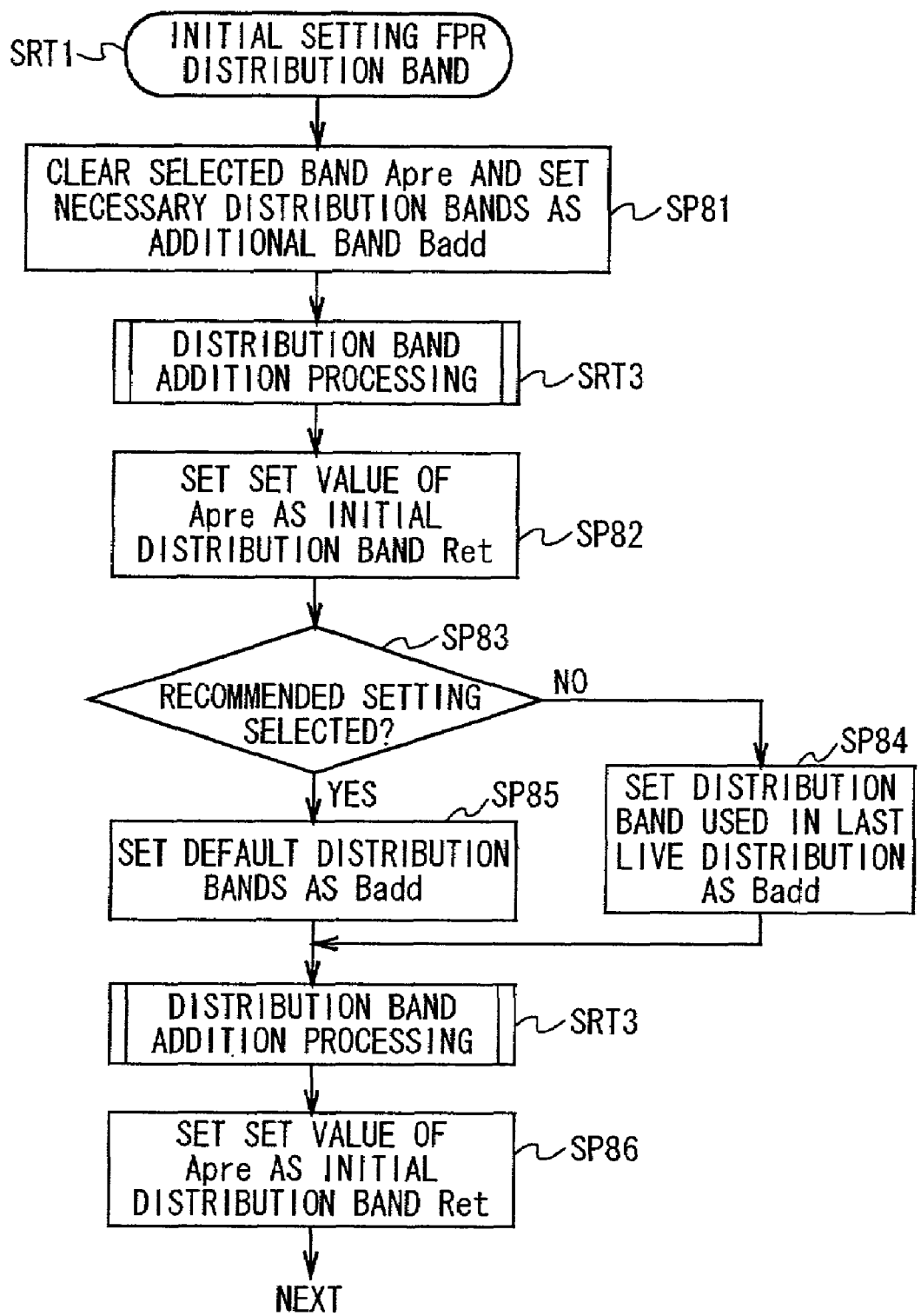
FIG. 55 is a flowchart showing an initial setting processing procedure for a distribution band.

Next, initial setting processing of a distribution band of the broadband band selection field 466 on the band setting screen 411 when the content provider multistream-distributes the live content via the streaming server 8 by the broadband Internet connection will be described with reference to next subroutine SRT1 (FIG. 55).

As shown in FIG. 55, in the subroutine SRT1, the CPU 10 of the user PC 4 moves to next step SP81 to perform initial setting of the band setting screen 411.

Note that, after this subroutine SRT1, if any distribution band is previously selected (checked) in the broadband band selection field 466, the CPU 10 of the user PC 4 sets this band to the RAM 11 as a selected band Apre, sets a distribution band additionally selected as an additional band Badd, and sets the distribution band as an initial value calculated in accordance with a prescribed algorithm, as an initial distribution band Ret, and then following initial setting is performed. Note that, following explanation is made, considering that the selected band Apre, additional band Badd, and initial distribution band Ret are variables capable of having plural set values.

At step SP81, the CPU 10 of the user PC 4 clears all past set values of the selected band Apre which has been set (checked) in the broadband band selection field 466, once, and sets the distribution band ("0x0001:20 kbps") necessary for multistream live distribution, specified by "LiveRealServerMultiStreamTypeMaskMust=0x0001" of the reservation data of the reservation setting information file 184, as the additional band Badd, and moves to next subroutine SRT3 for a distribution band addition processing procedure.

Figure 56:
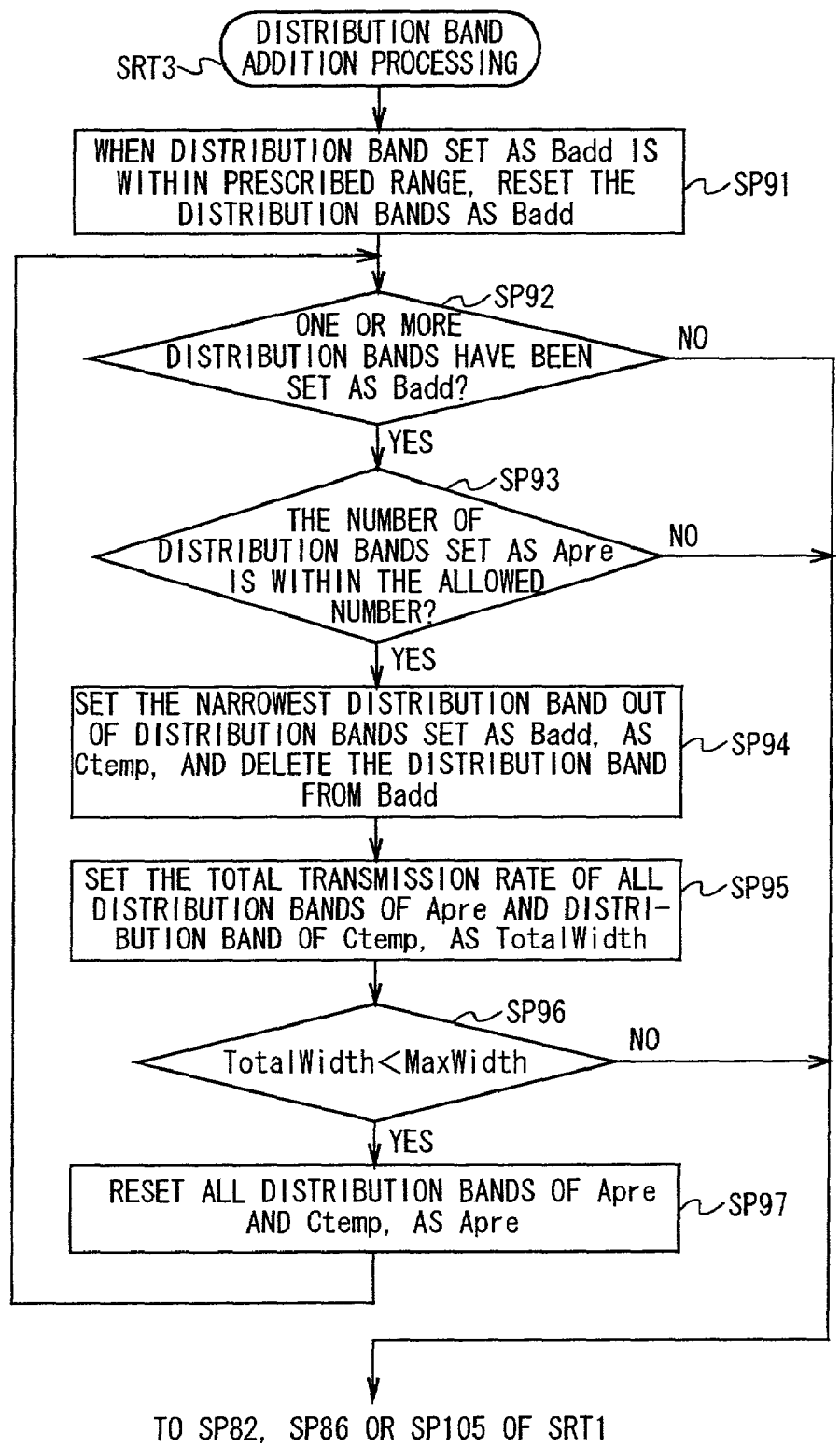
FIG. 56 is a flowchart showing a distribution band addition processing procedure.

As shown in FIG. 56, in the distribution band addition processing procedure of the subroutine SRT3, at step 91, only when the necessary distribution band set as the additional band Badd is any of 20 kbps, 34 kbps, 45 kbps, 80 kbps, and 220 kbps corresponding to "0x0001:20 kbps", "0x0002;34 kbps", "0x0004:45 kbps, "0x0008:80 kbps" and "0x0010:220 kbps" specified by "LiveRealServerMultiStreamTypeMask=0x001f" as the reservation data in the reservation setting information file 184, the CPU 10 of the user PC 4 resets the necessary distribution band as the additional band Badd, and then moves to next step SP92.

As described above, the CPU 10 of the user PC 4 previously omits distribution bands which are not specified by the reservation data in the reservation setting information file 184, thereby preventing the erroneous addition of distribution bands.

At step SP92, the CPU 10 of the user PC 4 determines whether the number of distribution bands reset as the additional band Badd is "one" or more. When a negative result is obtained here, this means that no distribution band is set as the additional band Badd and in this case, the CPU 10 of the user PC 4 returns to step SP82 of the SRT1.

When an affirmative result is obtained at step SP92, on the contrary, this means that the distribution band (necessary distribution band, in this case) is reset as the additional band Badd and in this case, the CPU 10 of the user PC 4 moves to next step SP93.

At step SP93, the CPU 10 of the user PC 4 determines whether the number of distribution bands currently set as the selected band Apre is three or less which is designated by "LiveRealServerMultiStreamTypeMax=3" described in the reservation data in the reservation setting information file 184 (no distribution band is set in this case because all distribution bands of the selected band Apre have been cleared at step SP81 of the subroutine SRT1).

When a negative result is obtained here, which means that the number of distribution bands set as the selected band Apre exceeds three, and then the CPU 10 of the user PC 4 returns to step SP82 of the subroutine SRT1.

When an affirmative result is obtained at step SP93, on the contrary, which means that the number of distribution bands set as the selected band Apre is three or less (set values of the selected band Apre are all cleared at step SP81 of the subroutine SRT1 in this case, so the number is surely three or less), and then the CPU 10 of the user PC 4 moves to step SP94.

At step SP94, the CPU 10 of the user PC 4 temporarily shifts to Ctemp the narrowest distribution band (20 kbps, which is necessary, in this case) out of the distribution bands set as the additional band Badd, to delete the narrowest distribution band from the additional band Badd, and then moves to next step SP95. Note that, Ctemp is variable to be used for performing distribution band addition processing.

At step SP95, the CPU 10 of the user PC 4 sets the total transmission rate of all distribution bands set as the selected band Apre (no distribution band in this case), and the narrowest distribution band set in Ctemp, as TotalWidth, and then moves to next step SP96. Note that TotalWidth is also variable to be used for the distribution band addition processing.

At step SP96, the CPU 10 of the user PC 4 sets a lower transmission rate out of the maximum transmission rate of 250000 kbps for a transmission line from the Internet 2 to the streaming server 8 based on the "LiveServerMaxBandWidth1=250000" described in the reservation data of the reservation setting information file 184, and the maximum transmission rate for a transmission line from the Internet 2 to the user PC 4, as the maximum transmittable rate MaxWidth, and compares the maximum transmittable rate MaxWidth and the total transmission rate TotalWidth, to determine whether the total transmission rate TotalWidth is lower than the maximum transmittable rate MaxWidth.

In this case, the maximum transmittable rate depends on the lower transmission rate out of the transmission rates for the transmission line from the Internet 2 to the user PC 4 and for the transmission line from the Internet 2 to the user PC 4, this means that the CPU 10 of the user PC 4 sets the maximum transmittable rate MaxWidth considering this point, thus making it possible to reliably perform the parallel transmission of the live content at plural transmission rates to the streaming server 8.

When a negative result is obtained, which means that the total transmission rate TotalWidth exceeds the maximum transmittable rate MaxWidth by the high-rate Internet connection, and thereby this total transmission rate MaxWidth makes it difficult to perform the parallel transmission of the live content at plural transmission rates even by the broadband Internet connection. In this case, the CPU 10 of the user PC 4 deletes the distribution band in Ctemp without setting it and then returns to step SP82 of the subroutine SRT1.

When an affirmative result is obtained at step SP96, which means that the total transmission rate TotalWidth is less than the maximum transmission rate MaxWidth and thereby the live content at plural transmission rates can be paralleltransmitted and so setting the distribution band in Ctemp has no problem. In this case, the CPU 10 of the user PC 4 moves to next step SP97.

At step SP97, the CPU 10 of the user PC 4 resets the distribution band set as the selected band Apre and the distribution band in Ctemp, as the selected band Apre, and then returns to step SP92 again.

Thereby, the CPU 10 of the user PC 4 determines that the distribution band shifted from the additional band Badd to Ctemp is settable, and then displays the broadband band selection field 466 with the check box of that distribution band checked as initial setting.

Then, a negative result is obtained at step SP92 because the necessary distribution band of the additional band Badd has been shifted to Ctemp at aforementioned step SP94 and does not remain, and then the CPU 10 of the user PC 4 returns to step SP82 of the subroutine SRT1.

At step SP82 of the subroutine SRT1, the CPU 10 of the user PC 4 sets the distribution bands reset as the selected band Apre at step SP97 of the subroutine SRT3, and moves to next step SP83.

At step SP83, the CPU 10 of the user PC 4 determines whether the check box of "use recommended setting in distribution reservation" in the broadband band selection field 466 is checked. When a negative result is obtained, the recommended setting has not been selected, and then the CPU 10 of the user PC 4 moves to next step SP84.

The CPU 10 of the user PC 4 sets the distribution band used in the last live distribution, as the additional band Badd at step SP84, and executes the distribution band addition processing similar to the aforementioned processing in next subroutine SRT3. In this case, however, the CPU 10 of the user PC 4 does not select the recommended setting nor the last live distribution is not performed, so the distribution band to be newly set as the additional band Badd does not exist, the CPU 10 executes the addition processing using the same parameters as those of the aforementioned distribution band addition processing, and the same result is obtained.

When an affirmative result is obtained at step SP83, on the other hand, this means that the recommended setting is selected by checking the check box of "use recommended setting in distribution reservation", and then the CPU 10 of the user PC 4 moves to next step SP85.

At step SP85, the CPU 10 of the user PC 4 newly sets as the additional band Badd the default distribution bands of the transmission rate item "0x0001:20 kbps" and the transmission rate item "0x0004:45 kbps" which are a combination specified by "LiveRealServerMultiStreamTypeMaskDefault=0x0005" in the reservation data of the reservation setting information file 184, and then moves to next subroutine SRT3.

In this case, as shown in FIG. 56, the CPU 10 of the user PC 4 resets the default distribution bands as the additional band Badd at step SP91 of the subroutine SRT3, obtains affirmative results at step SP92 and step SP93, sets the total transmission rate TotalWidth of the all distribution bands of the selected band Apre and the default distribution bands shifted from the additional band Badd to Ctemp, at step SP94 and step SP95, and then moves to next step SP96.

The CPU 10 of the user PC 4 compares the maximum transmission rate MaxWidth with the total transmission rate TotalWidth at step SP96, and when an affirmative result in which the total transmission rate TotalWidth is lower than the maximum transmission rate MaxWidth is obtained, the CPU 10 newly resets all distribution bands including the distribution band set as the selected band Apre and the default bands, as the selected band Apre at step SP97, similarly executes the default distribution band addition processing after step SP92, and then returns to step SP86 of the subroutine SRT1.

Figure 50:
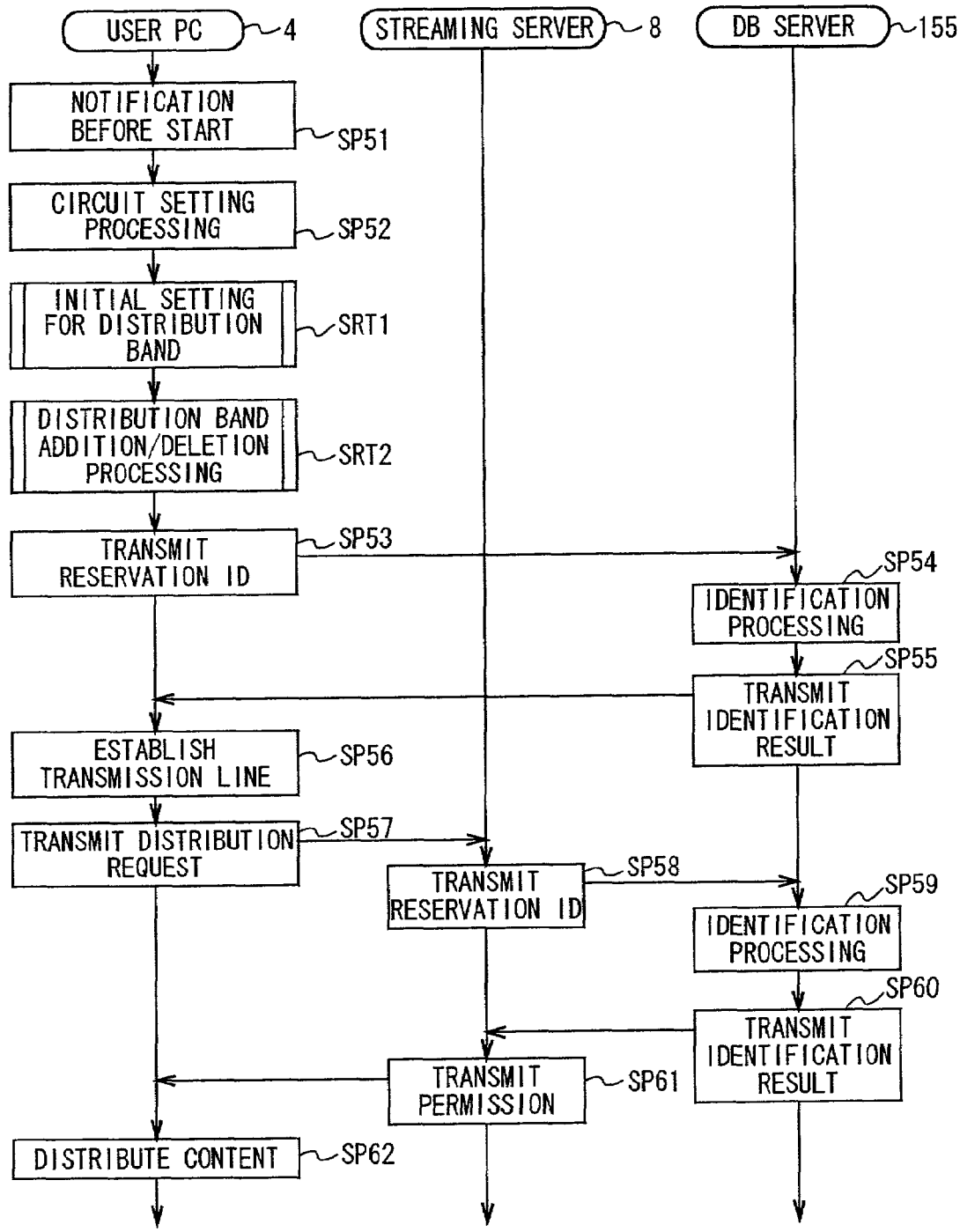
FIG. 50 is a flowchart showing a sequence of content transmission processing in live distribution.

The CPU 10 of the user PC 4 sets as initial distribution bands Ret the set values, including the default distribution bands, reset as the selected band Apre, and then finishes the distribution band initial setting and moves to next subroutine SRT2 (FIG. 50).

Next, distribution band addition/deletion setting processing in the broadband band selection field 466 of the band setting screen 411 (FIG. 53) will be described with reference to the subroutine SRT2.

Figure 57:
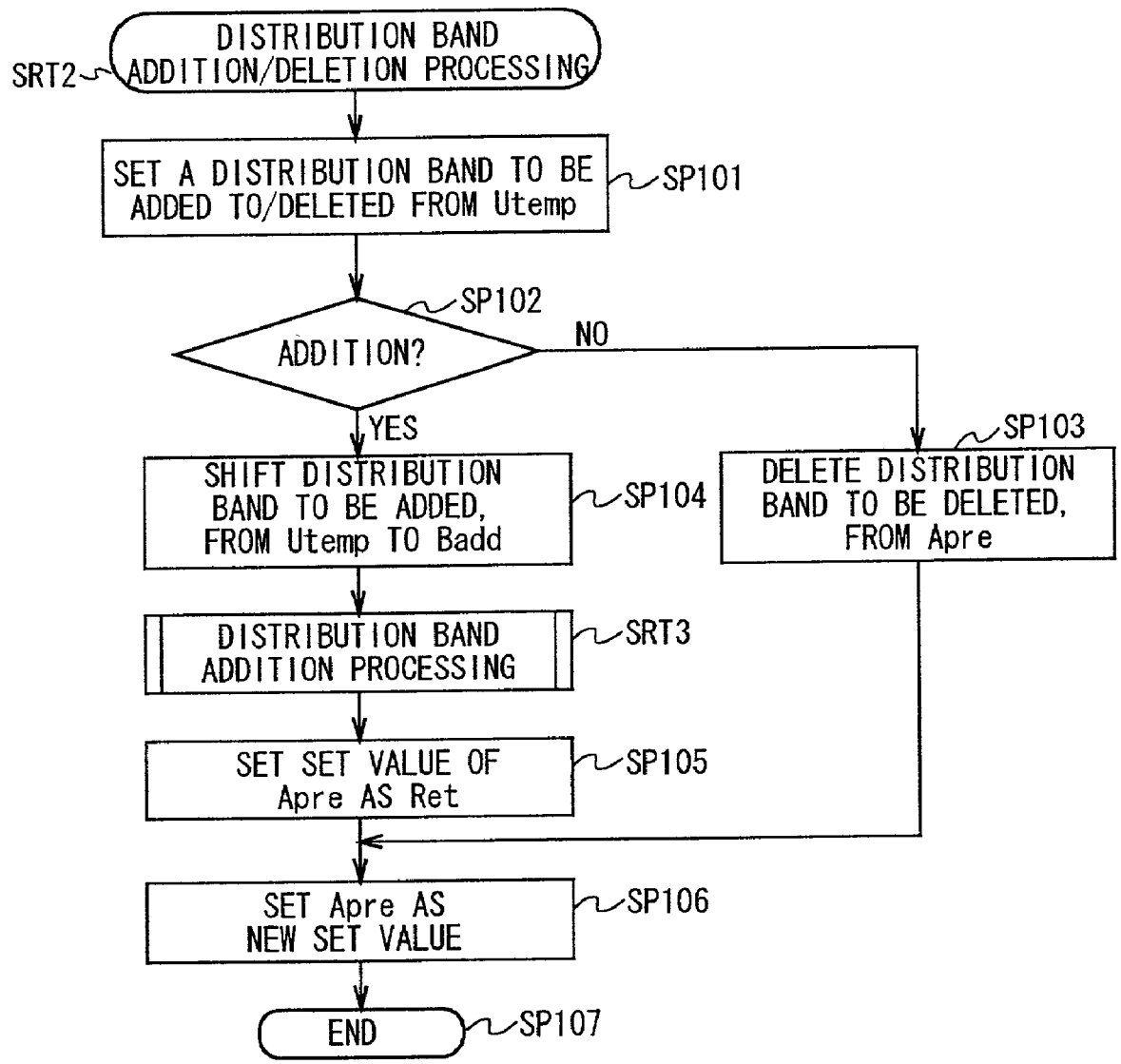
FIG. 57 is a flowchart showing a distribution band addition/cancel setting processing procedure.

As shown in FIG. 57, at step SP101 of the subroutine SRT2, the CPU 10 of the user PC 4 sets a distribution band corresponding to the check box checked or a distribution band corresponding to the check box unchecked, by the content provider in the broadband band selection field 466, in Utemp once, and moves to next step SP102.

At step SP102, the CPU 10 of the user PC 4 determines whether the distribution band set in Utemp once is a newly checked distribution band to be added or is an unchecked distribution bands to be deleted. When a negative result is obtained, which means that the distribution bands should be deleted, and then the CPU 10 of the user PC 4 moves to next step SP103.

At step SP103, the CPU 10 of the user PC 4 deletes the distribution band which should be deleted, from the currently set selected band Apre, and then moves to next step SP106.

The CPU 10 of the user PC 4 newly sets the set values of the selected band Apre, subjected to the deletion of the distribution band, as the initial distribution band Ret, and then finishes the distribution band deletion setting processing at next step SP107.

When an affirmative result is obtained at step SP102, on the contrary, which means that the distribution band set once are distribution bands which should be newly added, and in this case, the CPU 10 of the user PC 4 moves to next step SP104.

At step SP104, the CPU 10 of the user PC 4 shifts the distribution band to be added, from Utemp to the additional band Badd, and moves to next subroutine SRT3.

In this case, when the distribution band to be added, set as the additional band Badd at step SP104 is within a prescribed range, the CPU 10 of the user PC 4 resets this distribution band as the additional band Badd at step SP91 of the subroutine SRT3 shown in FIG. 56, obtains an affirmative result at step SP92 and step SP93, sets the total transmission rate TotalWidth of all distribution bands of the selected band Apre and the distribution band shifted from the additional band Badd to Ctemp at step SP94 and step SP95, and then moves to step SP96.

At step SP96, the CPU 10 of the user PC 4 compares the maximum transmission rate MaxWidth with the total transmission rate TotalWidth, and when an affirmative result in which the total transmission rate TotalWidth is lower than the maximum transmission rate MaxWidth is obtained, the CPU 10 newly resets all distribution bands including the distribution bands set as the selected band Apre and the distribution band to be added, as the selected band Apre at step SP97, and then returns to step SP105 of the subroutine SRT2.

At step SP105, the CPU 10 of the user PC 4 sets the distribution bands, including the distribution band to be added, newly set as the selected band Apre, as the initial distribution band Ret, and then completes the distribution band addition setting processing at next step SP108.

The CPU 10 of the user PC 4 performs the distribution band addition setting processing on a distribution band selected by the content provider, based on the limitations of the reservation setting information file 184 as described above, thus making it possible to execute the addition setting so that the multistream distribution can be performed.

In actual, when a band is selected, added, or deleted for performing the multistream distribution on the band setting screen 411, the CPU 10 of the user PC 4 makes the content provider start the live distribution.

After performing the aforementioned distribution band setting processing SRT1, SRT2, the CPU 10 of the user PC 4 executes the communication connection processing by the Internet connection, described below, based on the information described by "reservation ID", "server connectable time" and "information of connection destination" of the reservation setting information file 184.

At step SP53, the user PC 4 automatically starts the communication connection processing by the Internet connection at the connectable start time shown by "server connectable start time", and makes a request for identification for the communication connection by transmitting the reservation ID to the database server 155 by the Internet connection circuit preset by the content provider.

Since the CPU 10 of the user PC 4 automatically makes a call, the content provider does not need to enter the telephone number or the like. Especially, in the case of the live distribution, if the user PC 4 is used in a style as shown in FIG. 4A or 4B, the content provider finds that the input operations with the keyboard 16A are very difficult. Therefore, automatically making a call without entering the telephone number or the like means that the user PC 4 can offer a more useful live content creation environment to the content provider.

At step SP54, the database server 155 performs identification processing to confirm whether the reservation ID received from the user PC 4 has been registered in the reservation database 151 for the reserved time zone for starting the live distribution very soon.

When the reservation ID received from the user PC 4 has been registered in the reservation database 151, the database server 155 determines that the user PC 4 which has sent this reservation ID is used by a content provider having the rightful reservation, and when the reservation ID received has not been registered for the reserved time zone, on the contrary, the database server 155 determines that the user PC 4 which has sent this reservation ID is not used by a content provider having a rightful reservation.

In this case, the database server 155 performs the identification processing only using the reservation ID, which obtains the following effects. For example, in the case where the database server 155 performs the identification of the live reservation using the user ID and password had by a registered member in the personal casting service, when the user ID and password are right, the person who has got access can be considered as a rightful registered member, but it can not be determined that the registered member has the live reservation for the reserved time zone.

In this case, it is necessary that the database server 155 confirms the registered member, confirms the contents of the registered live reservation, and then determines whether the registered member specified by the user ID has reserved the reserved time zone, which causes bothering identification processing.

If the database server 155 uses the reservation ID which is used only for the identification processing in the live reservation as described above, on the other hand, this reservation ID is information which is known only by a registered member, so that the identification processing of the user ID is not necessary. Therefore, there is an advantage in that it is determined whether a user has a rightful reservation, by a simple identification processing to confirm whether the reservation ID has been registered in the live reservation for the reserved time zone immediately after the access.

The database server 155 returns the identification result about the live reservation to the user PC 4 at step SP55 and then moves to next step SP56.

The CPU 10 of the user PC 4 completes the identification processing without fail at step SP56, so it establishes a transmission line between the user PC 4 and the streaming server 8 and then moves to next step SP57.

When the identification result from the database server 155 shows the person does not have a rightful reservation at step SP56, on the other hand, the CPU 10 of the user PC 4 does not connect the user PC 4 and the streaming server 8.

When the CPU 10 of the user PC 4 performs the Internet connection with the streaming server 8, it makes a distribution request for live distribution by transmitting the reservation ID also to the streaming server 8 at step SP57, similar to the case of transmitting the reservation ID to the database server 155, and then moves to next step SP58.

When the streaming server 8 receives the distribution request for the live distribution from the user PC 4, it transmits the received reservation ID to the database server 155 of the server reservation control center 5 to perform the identification to determine whether the user PC 4 is used by a content provider having a rightful reservation, and then moves to next step SP59.

At step SP59, the database server 155 performs the identification processing by confirming whether the reservation ID received from the streaming server 8 has been registered in the reservation database 151 for the time zone which comes very soon, and moves to next step SP60. This identification processing is the same as the case of firstly receiving the reservation ID from the user PC 4.

After performing the identification processing on the reservation ID, the database server 155 returns the identification result to the streaming server 8 at step SP60 and moves to next step SP61.

When the identification result from the database server 155 shows that the request has been made from a person having a rightful reservation, then the streaming server 8 allows the live distribution using the user PC 4 and transmits this information to the user PC 4 and obtains information on the live reservation (reserved time zone and distribution channel and so on) from the reservation database 151 at step SP61, so as to control the live distribution based on the information.

Sequentially, at step SP62, the content provider operates the jog dial 16B and the operating buttons 16C and thereby the CPU 10 of the user PC 4 starts the live distribution with applying the previously set effects to the motion picture data captured with the digital video camera 19 in real time, thus performing the parallel transmission of the live content at plural transmission rates via the Internet 2 to the streaming server 8.

When the "public level" (refer to FIG. 31 and the like) of the live distribution is "Public" level, the streaming server 8 performs the multistream distribution of the live content to the client PCs 7A, 7B and 7C with no restrictions, as long as the number of the client PCs is within the capacity of the channel for the live distribution.

When "public level" is "password" level or "secret" level, however, the streaming server 8 makes the client users enter the password in the client PCs 7A, 7B and 7C, and performs the multistream distribution to only the client PCs 7A, 7B and 7C which has entered a correct password. Note that, the processing operations for the distribution request and stream distribution between the streaming server 8 and the client PCs 7A, 7B and 7C will be described later.

Then, the CPU 10 of the user PC 4 stops the transmission of the live content to streaming server 8 at the live reservation end time.

When the live distribution starts as described above, the streaming server 8 transmits the time information of the service provider obtained from the NTP server 153, and information of the number of viewers indicating the number of client PCs 7A, 7B and 7C which are receiving the live distribution.

In addition to the time information of the service provider side and the information of the number of viewers, received from the streaming server 8, the CPU 10 of the user PC 4 displays various information such as information indicating that the live is now distributed, the passage time information, the time information of the service provider side, the time information of the user PC 4 side, the reservation start time information, the reservation end time information, the remaining time for live distribution, the picture size information and the transmission rate information, in the status window 103 (FIG. 10) on the live distribution mode screen 54.

The content provider can know the various information relating to the currently distributed live, on this status window 103. Especially, the content provider can exactly know audience rating information, so this information can be used for selecting a channel-(capacity) for the next live distribution.

Since the user PC 4 stops the transmission of the content at the live reservation end time, the streaming server 8 stops the stream distribution to the client PCs 7A, 7B and 7C and compulsory disconnects the communication connection with the user PC 4 at the server connection end time shown by the "server connectable time" of the reservation setting information file 184 (FIG. 38).

In addition, when the content provider operates the jog dial 16B (FIG. 3 and FIG. 4) or the like before the live reservation end time to select and confirm "start/end distribution" with the focus F in the GUI 102 on the live distribution mode screen 54, the CPU 10 of the user PC 4 stops the transmission of the content and disconnects the communication with the streaming server 8, thereby compulsory ending the live distribution before the live reservation end time.

(2-7) Stream Distribution Processing From Streaming Server to Client PC

The streaming server 8 receives the content transmitted from the user PC 4, and then performs the multistream distribution processing on the live content to the requesting client PCs 7A, 7B and 7C. Next, this stream distribution processing will be described with reference to the display screen and so on of a client PC 7A, 7B, 7C.

Note that, in the following description, it is assumed that the "public level" of the content distribution is "Password" level or "Secret" level, and the client user of the client PC 7A, 7B, 7C knows a password for receiving the stream distribution.

When a request for content distribution is made, the client user turns the power ON and thereby the client PC 7A, 7B, 7C starts browser software. Then when the client user enters the URL of the personal casting service top page screen 160 (FIG. 16), the client PC 7A, 7B, 7C makes a request for the personal casting service top page screen 160 to the live casting server 150 via the Internet 2.

Then, the client PC 7A, 7B, 7C displays the personal casting service top page screen 160, received from the live casting server 150 via the Internet 2, on the display screen.

Then, the client user clicks on the "today's live" or "program guide" link button on the personal casting service top page screen 160.

When the client user clicks on the "program guide", for example, the client user PC 7A, 7B, 7C displays the program guide list screen 165 (FIG. 20) and displays the contents which are live-distributed on the date on which a click has been made on the monthly calendar on the program guide list screen 165.

When a click is made on the title of the content which is live-distributed, being displayed on the program guide list screen 165, the client PC 7A, 7B, 7C makes a request for the Web page for showing the detailed information about the content of clicked "title" to the live casting server 150 via the Internet 2.

Thereby, the live casting server 150 transmits the Web page of the live content detailed information screen 163 (FIG. 19) showing the detailed information of the requested content, to the client PC 7A, 7B, 7C via the Internet 2, and the client PC 7A, 7B, 7C thereby displays the live content detailed information screen 163 on the display screen.

When the client user of the client PC 7A, 7B, 7C makes a request for live distribution of the live content displayed on the live content detailed information screen 163, just enter the password for receiving the live distribution and click on the "reproduction" button 175.

If the client PC 7A, 7B, 7C does not store the real time reproduction software therein, the client user previously downloads the reproduction software by clicking on the "reproduction software" button 176 before clicking on the "reproduction" button 175.

When the client user enters the password and clicks on the "reproduction" button 175, the client PC 7A, 7B, 7C transmits the password to the streaming server 8 via the Internet 2 to make a request for the live distribution.

The streaming server 8 transmits the password received from the client PC 7A, 7B, 7C, to the database server 155 of the server reservation control center 5.

The database server 155 identifies the password received from the streaming server 8, by referencing the reservation database 151, and transmits the identification result to the streaming server 8.

The streaming server 8 determines that the identification result received from the database server 155 shows that the password is correct, it determines whether the live distribution is performed to the client PC 7A, 7B, 7C based on the capacity preset for the channel of the live distribution.

In actual, the streaming server 8 compares the number of client PCs which are currently receiving the live distribution, with the capacity set for the channel, and when the number of client PCs reaches the capacity, the live distribution can not be performed for any other client PCs.

On the other hand, the streaming server 8 decides to perform the live distribution when the number of client PCs does not reach the capacity set for the channel at the time when the client PC 7A, 7B, 7C makes a request for the distribution, allows the client PC 7A, 7B, 7C to receive the live distribution, and then executes the multistream distribution processing.

Since the streaming server 8 can receive the parallel transmission of the live content from the user at preset plural transmission rates (20 kbps, 45 kbps, and 80 kbps), the streaming server 8 is arranged to store them once and then perform the multistream distribution to the client PC 7A, 7B, 7C in parallel.

Therefore, the client PC 7A, 7B, 7C can receive the live content at a transmission rate suitable for its communication environment, even its communication environment can not receive the transmission at the transmission rates, 20 kbps, 45 kbps, and 80 kbps.

Figure 58:
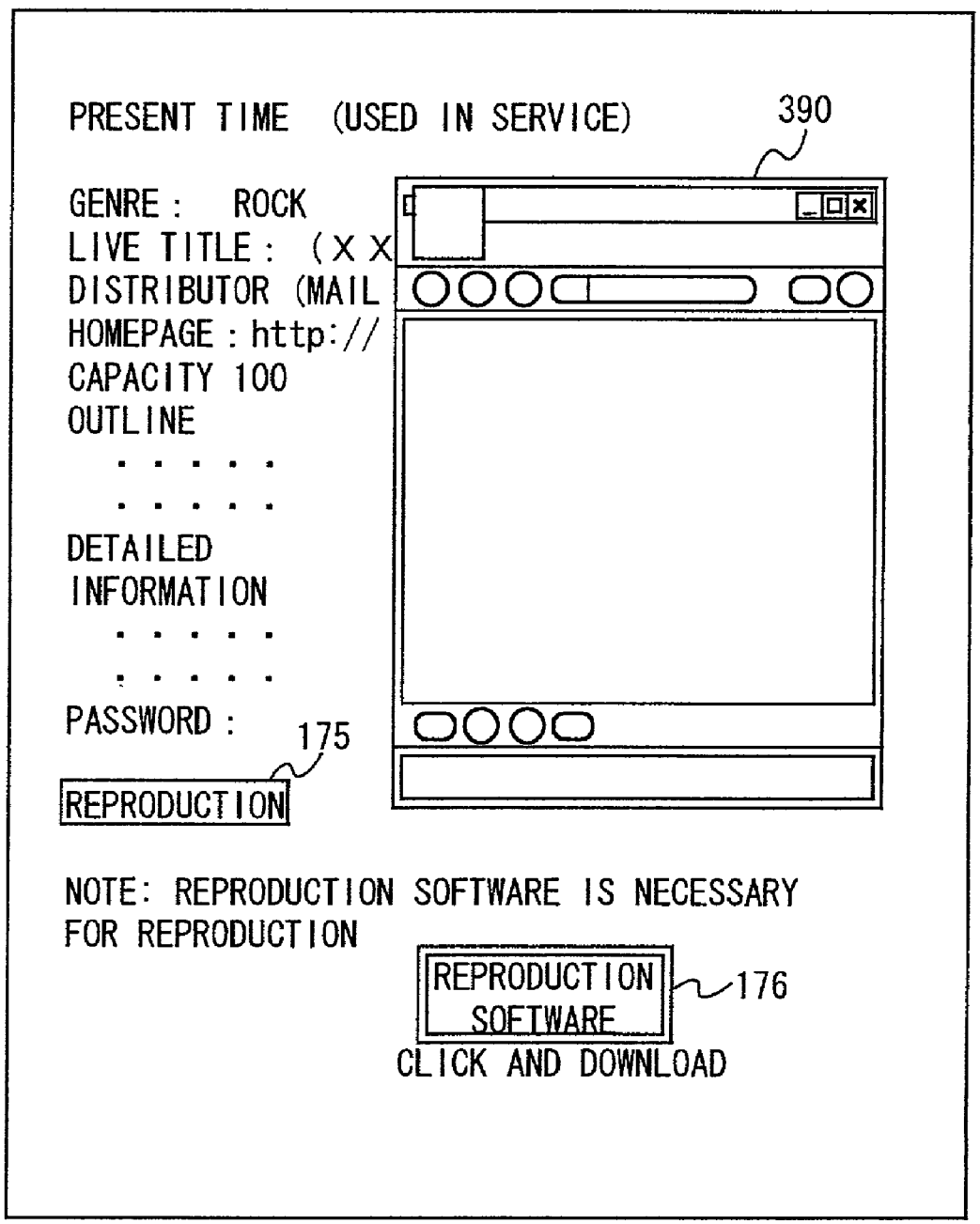
FIG. 58 is a schematic diagram showing a reproduction display screen of a client PC.

When the streaming server 8 starts the multistream distribution processing, the client PC 7A, 7B, 7C overlays a reproduction display screen 195 in accordance with the reproduction software as shown in FIG. 58, on the live content detailed information screen 163, to display the stream-distributed live content in real time, thus the client user can watch the live-distributed live content in real time.

By the way, the streaming server 8 counts the number of client PCs which are actually receiving the live distribution, and periodically transmits the result of counts, that is, information of the number of viewer, to the user PC 4 of the content provider.

Note that, in the aforementioned explanation, the client PCs 7A, 7B, and 7C make a request for distribution to the streaming server 8 via the personal casting service top page screen 160, which was requested to the live casting server 150. However, the client PCs 7A, 7B, and 7C can make a request for distribution to the streaming server 8 via the personal casting service top page screen 160 by clicking on the URL displayed as "distribution request address" of the e-mail screen 186 (FIG. 43) received from the live casting server 150 to access the personal casting service top page screen 160.

(3) Operations and Effects

In the aforementioned arrangement, the user PC 4 of the content distribution system 1 transmits a type of connectable circuit selected from the distribution environment setting pull-down menu 442 on the distribution environment setting screen 400, as the reservation demand information file to the live casting server 150.

The live casting server 150 recognizes the type of connectable circuit between the user PC 4 and the Internet 2, based on the reservation demand information file, and creates the reservation setting information file 184 for selecting the dedicated line connection or the Internet connection and transmits the reservation setting information file 184 to the user PC 4.

The user PC 4 displays the circuit setting screen 410 based on the reservation setting information file 184 received from the live casting server 150 to allow the content provider to arbitrarily select one of the dedicated circuit connection and Internet connection.

That is, the live casting server 150 provides a connection method according to the type of circuit which can connect the user PC 4 and the Internet 2, via the circuit setting screen 410, thus making it possible to select the dedicated line connection or Internet connection according to the distribution environment of the user PC 4.

Thus the live casting server 150 can allow the content provider to arbitrarily select one of the dedicated line connection and the Internet connection according to his purpose, for example, whether he wants the multistream distribution of the live content, on the circuit setting screen 410, thus making it possible to improve the usability for the content provider.

In addition, the live casting server 150 limits the number of streams with which the multistream distribution can be executed, with the reservation setting information file 184, and allows the content provider to select a connectable circuit, (communication carrier) of the user PC 4 from the Internet circuit selection pull-down menu 463B on the circuit setting screen 410 displayed on the user PC 4 and then to select a settable transmission rate in the broadband band selection field 466 on the band setting screen 411.

The user PC 4 automatically detects in accordance with the distribution band addition processing procedure shown in FIG. 56, whether the parallel transmission of the live content can be actually performed at plural transmission rates selected in the broadband band selection field 466 on the band setting field 411 in accordance with the type of circuit selected from the Internet circuit selection pull-down menu 463B on the circuit setting screen 410, and only when the transmission is possible, the band setting is completed by checking the check box of the transmission rates selected in the broadband band selection field 466.

As a result, in actual, the user PC 4 can perform such setting that the parallel transmission of the live content can be actually performed at plural transmission rates selected in the broadband band selection field 466 using the circuit selected from the Internet circuit selection pull-down menu 463B, so as to surely transmit the live content for multi-stream distribution at plural transmission rates to the streaming server 8.

Thus, even the content provider erroneously selects a transmission rate for multistream distribution, the content distribution system can realize the user interface which can prevent such mistakes in advance with the user PC 4.

In the aforementioned arrangement, the content distribution system 1 can provide a connection method with the Internet 2 in accordance with the type of circuit which can connect the user PC 4 and the Internet 2, on the circuit setting screen 410, so that the live casting server 150 can set the connection method in accordance with the distribution environment of the user PC 4.

In addition, in the content distribution system 1 the live casting server 150 limits the number of streams by which the multistream distribution is executable, based on the reservation setting information file 184, and the user PC 4 allows the content provider to select a circuit by displaying only connectable circuits (communication carriers) in the Internet circuit selection pull-down menu 463B on the circuit setting screen 410, and then to select a settable transmission rate in the broadband band selection field 466 of the band setting screen 411.

Therefore, the content distribution system 1 can guide the content provider to select a connectable circuit and to select a transmission rate at which the distribution can be performed only at this stage.

Furthermore, in the content distribution system 1, it is determined whether the parallel transmission of the live content can be actually performed at plural transmission rates selected in the broadband band selection field 466, on the basis of the lower transmission rate out of the maximum transmission rate from the user PC 4 to the Internet 2 and the maximum transmission rate from the Internet 2 to the streaming server 8, so that only transmission rates at which the transmission can be executed are automatically made selectable, thus making it possible to reliably execute the multistream distribution by the streaming server 8, with previously preventing the erroneous selection of transmission rates.

(4) Other Embodiments

Note that, the aforementioned embodiment has described the case of selecting a circuit corresponding to "ADSL" or "ISDN Double" out of the plural circuits displayed in the Internet circuit selection pull-down menu 463B on the circuit setting screen 410. This invention, however, is not limited to this and other various high-rate digital circuits can be selected.

Further, the aforementioned embodiment has described the case of displaying 20 kbps, 30 kbps, 45 kbps, 80 kbps, and 220 bps in the broadband band selection field 466 of the band setting screen 411 as selectable transmission rates. This invention, however, is not limited to this and the number of selectable transmission rates can increase or decrease in accordance with the type of circuit selected by the user PC 4.

Furthermore, the aforementioned embodiment has described the case of transmitting live content captured with the digital video camera 19 of the user PC 4 to the streaming server 8 via the dedicated line connection or the Internet connection, and multistream-distributing the live content to the client PCs 7A, 7B and 7C with the stream distribution function of the streaming server 8. This invention, however, is not limited to this and the TV program data of digital satellite broadcasting received via an antenna 20A and TV tuner 21 (FIG. 1) or TV program data composed of video signals in NTSC system can be transmitted to the streaming server 8 via the dedicated server connection network 6, telephone line network 3A, cable television network 3B or ADSL network, and then the TV program can be multi-stream-distributed via the streaming server 8.

Furthermore, the aforementioned embodiment has described the case where the streaming server 8 live-distributes live content received from the user PC 4, to the requesting client PCs 7A, 7B and 7C by the multistream distribution. This invention, however, is not limited to this and the live content received from the user PC 4 can be stored in a storage medium such as a hard disk while being stream-distributed, and then the live content can be distributed in response to a request, like an on-demand system, that is, a rebroadcasting service can be performed at the same time. In this case, the live content in the rebroadcasting service can be advertised on the program guide list screen 165 and can be distributed on demand.

Furthermore, the aforementioned embodiment has described the case of transmitting the motion picture data of live content captured with the digital video camera 19, to the streaming server 8 in real time, and multistream-distributing the live content via the streaming server-8 in real time. This invention, however, is not limited to this and content created by the user PC 4 is previously stored in the hard disk 13, and can be multistream-distributed via the streaming server 8 within the time zone reserved for live for rebroadcasting. In this case, the content provider can distribute the live content in the rebroadcasting service, even not in real time.

Furthermore, the aforementioned embodiment has described the case of performing live distribution from the user PC 4 via the streaming server 8 within a time zone reserved for the live. This invention, however, is not limited to this and the streaming server 8 confirms the reservation status of the time after the reservation end time of the currently used distribution channel by referencing the reservation database 151 while performing the live distribution based on the live reservation, and if there is no reservation, the streaming server 8 can transmit a message such as "extension is possible until ◯◯:00" to the user PC 4 prescribed time (10 minutes for example) before the reservation end time.

In this case, the user PC 4 displays this message in the status window 103 (FIG. 10B) and also displays an extension button in this status window 103, and when a click on the extension button is made, the user PC 4 transmits this information to the streaming server 8 so that the streaming server 8 accepts this extension.

By offering such extension service, the content distribution system 1 can accept a demand of extension from the content provider of the user PC 4 and can also effectively use the distribution channels of the streaming server 8.

Furthermore, the aforementioned embodiment, a reconfirmation should be made after registering a reservation. This invention, however, is not limited to this and the reconfirmation can be made at the time of completion of the reservation registration.

Furthermore, the aforementioned embodiment has described the case of previously storing the program to execute a live reservation, a program to limit various selection operations of the user PC 4 by automatically creating and transmitting the reservation setting information file 184 to the user PC 4, in the hard disk of the live casing server 150, and of previously storing various programs to execute various processing for live reservation and various processing for live distribution, in the hard disk 13 of the user PC 4. This invention, however, is not limited to this and various application programs can be installed by reproducing a program storage medium composed of a package medium such as a compact disc read only memory (CD-ROM) or digital versatile disc read only memory (DVD-ROM), which stores the various application programs, or the various application programs can be installed by reproducing a program storage medium such as a semiconductor memory or a magneto-optical disc which temporarily or permanently store the application programs.

A wired or radio communication medium such as a local area network and digital satellite broadcasting can be used as a means for storing various application programs in such a program storage medium and storage can be executed via various communication interface such as a router or modem.

Furthermore, the aforementioned embodiment has described the case of using the Internet 2 as a network for performing the live reservation between the user PC 4 and live casting server 150. This invention is not limited to this and another kind of wired or radio network can be used.

Furthermore, the aforementioned embodiment has described the case of using the user PC 4 having the built-in digital video camera 19 as a terminal of a broadcasting side who performs the live distribution. However, a typical PC to which a digital video camera is connected by a cable connection via the institute of electrical and electronics engineers (IEEE)1394 interface and the like or by a radio connection, can be used as well. In addition, a portable telephone to which a digital camera is connected with a cable or a portable telephone having a built-in digital camera can be used instead of the user PC 4.

Hereinafter, the case in which a portable telephone having a built-in digital camera is used instead of the user PC 4 will be explained.

Figure 59:
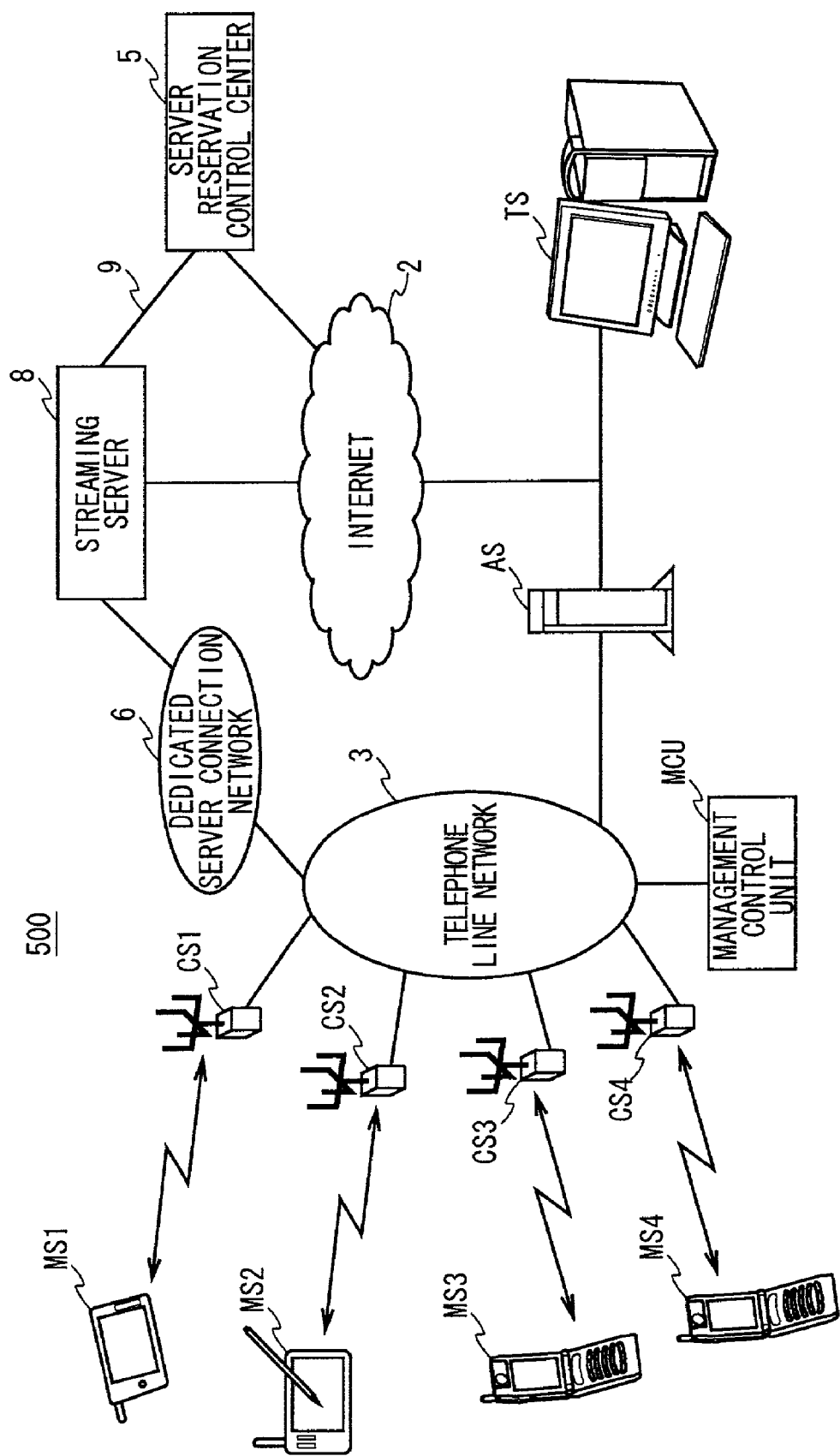
FIG. 59 is a schematic diagram showing a content distribution system of another embodiment.

As shown in FIG. 59, reference numeral 500 shows a content distribution system to which a portable telephone MS3, to which this invention is applied, is connected, and base stations CS1-CS4 as fixed radio stations are set in respective cells obtained by dividing a communication service offering area into a desired size.

Portable information terminals MS1 and MS2 and camera-integrated digital portable telephones MS3 and MS4 as movable radio stations are connected to these base stations CS1 to CS4, respectively, by radio by a code division multiple access scheme called, for example, the wideband-code division multiple access (W-CDMA), which can perform high-rate data communication of large amount of data at a data transmission rate of 2 Mbps at maximum, with a frequency band of 2 GHz.

As described above, the portable information terminals MS1 and MS2 and the camera-integrated portable telephones MS3 and MS4 can perform the high-rate data communication of the large amount of data by the W-CDMA scheme, thereby data communication can be executed for not only voice communication but also various purposes such as the transmission/reception of e-mails, the viewing of simple homepages, and the transmission/reception of pictures.

In addition, the base stations CS1 to CS4 are connected to the telephone line network 3 via a wired circuit, and the telephone line network 3 is connected to the Internet, many subscribers' wired terminals, computer networks, and intra-networks, not shown.

In addition, the telephone line network 3 is connected to an access server AS of an internet service provider and the access server AS is connected to a content server TS owned by the internet service provider.

This content server TS is arranged to provide content such as simple homepages as a compact Hyper Text Markup Language (HTML) format file in response to a request from a subscriber's wired terminal, portable information terminal MS1, MS2, or camera-integrated digital portable telephone MS3, MS4.

This compact HTML is a subset of HTML, that is, only tags reflectable in the display of a limited size are remained and other parts are deleted. For example, iMode (Trademark) which is a service offered by the NTT docomo Inc. adopts the HTML for iMode which uses 30 kinds of tags for functions necessary for the portable telephone and which has regulations in which letter attributes and colors of text can not be designated and GIF file having 2 step adjustment is recommended for pictures.

By using the Handheld Device Markup Language (HDML), Wireless Markup Language (WML) or the like which is a description language to be used in the compact HTML or Wireless Application Protocol (WAP) of a moving communication protocol, the file of a simple homepage which is viewed on a portable telephone or the like with a limited display area and display performance can be created.

In this content distribution system 500, the Internet 2, server reservation control center 5 and the streaming server 8 are connected, similar to the present invention, so that the subscriber's wired terminal and portable information terminal MS1, MS2 and camera-integrated digital telephone camera MS3, MS4 can get access to the server reservation center 5 or the streaming server 8.

Note that, when the streaming distribution is performed via the streaming server 8 in the content distribution system 500, the camera-integrated portable telephone MS3, MS4 transmits content to the streaming server 8 via the dedicated server connection network 6, but also the transmission of the content can be performed via the Internet 2.

In this connection, the portable information terminals MS1, MS2 and the camera-integrated portable telephones MS3, MS4 communicate with the base stations CS1 to CS4 in a simple transport protocol, and the communication is established in the TSP/IP protocol from each base station CS1-CS4 to the streaming server 8 via the Internet 2.

Note that, a management control unit MCU is connected to the subscriber's wired terminal and the portable information terminals MS1, MS2 and the camera-integrated portable telephones MS3, MS4 via the telephone line network 3, so as to perform identification processing and charging processing for the portable information terminals MS1, MS2 and the camera-integrated digital portable telephones MS3, MS4.

Figure 60:
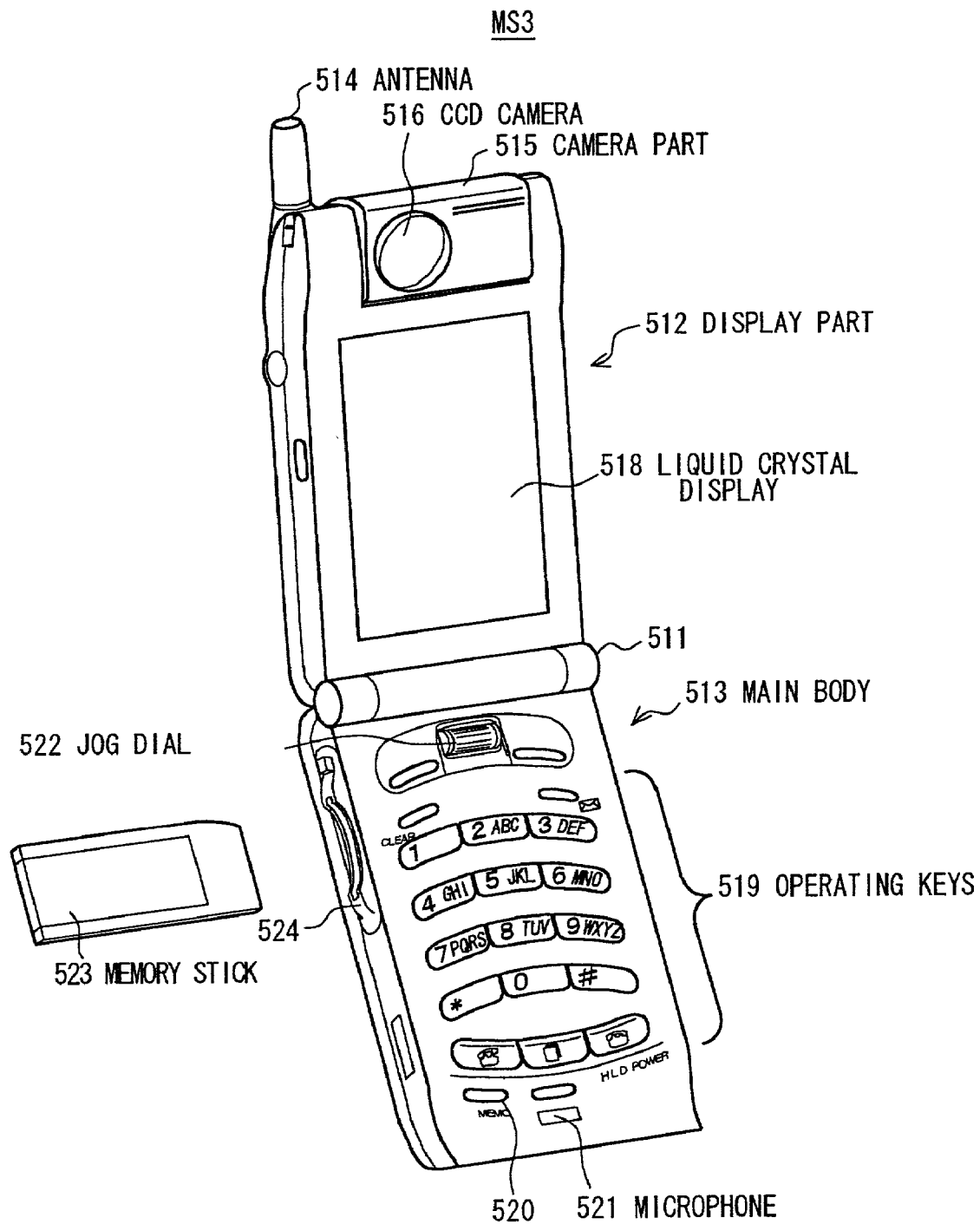
FIG. 60 is a schematic perspective view of the external arrangement of the camera-integrated digital portable telephone.

Next, an external arrangement of the camera-integrated portable telephone MS3 which can replace the user PC 4 (FIG. 4) will be described. As shown in FIG. 60, the camera-integrated digital portable telephone MS3 can be divided into a display part 512 and a main body 513 at a border of the central hinge 511, and can be foldable at the hinge 511.

A telescopic antenna 514 for transmission/reception is attached at the left side on the top of the display part 512, and the communication of radio waves can be performed with the base station CS3 via the antenna 514.

In addition, a camera part 515 is arranged so as to be rotated by approximately 180°, at the center-top part of the display part 512, so as to capture a desired subject with the CCD camera 516 of the camera part 515.

Figure 61:
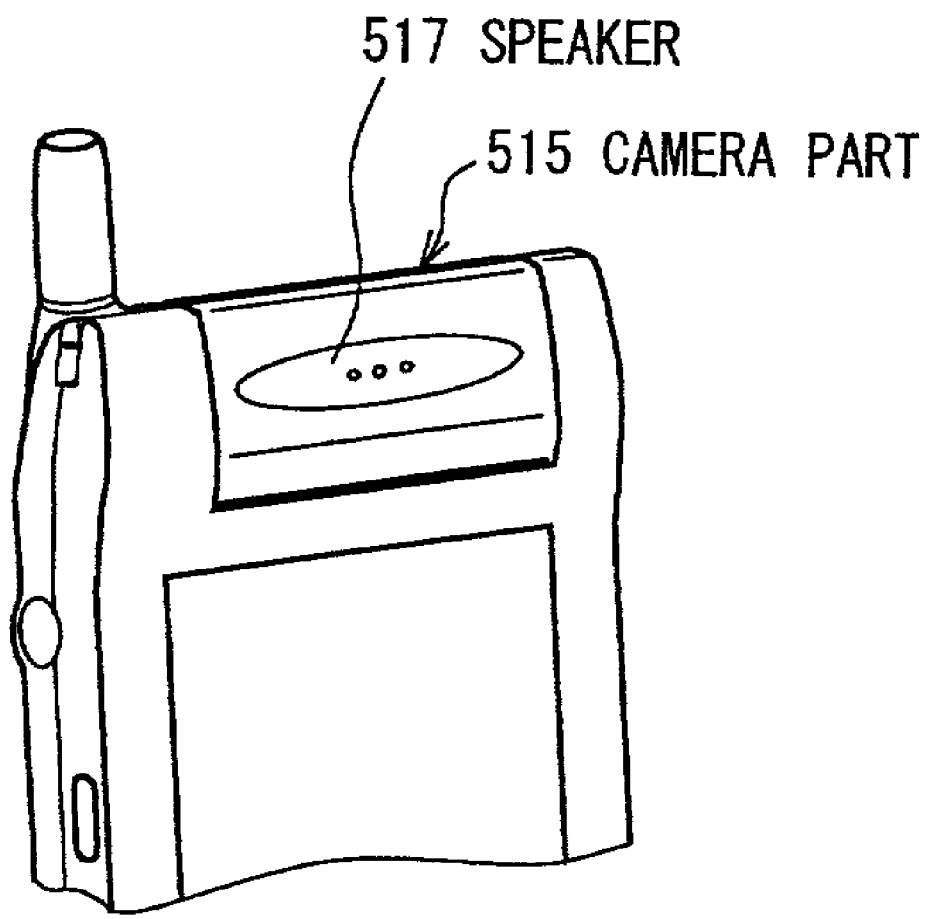
FIG. 61 is a schematic perspective view showing a display part of the camera-integrated digital portable telephone with a camera part rotated.

As to the display part 512, when the content provider rotates the camera part 515 by approximately 180°, a speaker 517 which is arranged in the center on the back surface of the camera part 515 is placed on the front as shown in FIG. 61, thereby switching to a normal voice communication mode.

In addition, the display part 512 has a liquid crystal display 518 so as to display the contents of an e-mail, simple homepages, pictures captured with the CCD camera 516 of the camera part 515, and the pictures of a TV program received via the built-in antenna not shown, in addition to the reception quality of radio waves, battery level, names and telephones registered in a directory, and a call history.

On the other hand, the main body 513 has operating keys 519 including numeral keys of "0"-"9", a call key, a redial key, an end/power key, a clear key, and an e-mail key, on its front surface, so as to enter various commands with the operating keys 519.

In addition, the main body 513 has a memo button 520 and a microphone 521 under the operating keys 519, so as to record voice during conversation with the memo button 520 and to collect user's voice during conversation with the microphone 521.

Furthermore, the main body 513 has a jog dial 522, which can be rotated, turned, pressed, above the operating keys 519 so as to slightly project from the front surface of the main body 513, and by rotating the jog dial 522, various operations can be performed, such as scrolling a directory list or an e-mail, moving a simple homepage and forwarding pictures, which are displayed on the liquid crystal display 518.

For example, when a content provider selects a desired telephone number out of plural telephone numbers of the directory being displayed on the liquid crystal display 518 by rotating the jog dial 522, and presses the jog dial 522 in the inside direction of the main body 513, the selected telephone number is confirmed, resulting in automatically making a call to the telephone number.

Note that, a battery pack not shown is inserted on the back surface side of the main body 513, and when the end/power key is ON, the power is supplied from the battery pack to each circuit to start it.

By the way, the main body 513 has a memory stick slot for accepting a removable memory stick (trademark by Sony Corporation) at the upper part on the left side of the main body 513, so that communicating party's voice, picture data of TV program being received can be recorded in the memory stick 523 by pressing the memo button, and e-mails, simple homepages, and pictures captured with the CCD camera 216 can be recorded by content provider's operations.

This memory stick 523 is a kind of a flash memory card which was developed by the assignee of this application, Sony corporation. This memory stick 523 is made by containing a flash memory which is a kind of electrically erasable and programmable read only memory (EEPROM) being an electrically rewritable and erasable non-volatile memory, in a small and thin plastic case of H21.5×W50×D8 nm, so as to record and read various data such as pictures, voice and music, via a 10-pin terminal.

In addition, for such a case that a built-in flash memory is changed in its specification so as to have large capacity, the memory stick 523 adapts a special serial protocol which is capable of being used by other devices, realizes a high-rate performance of the maximum recordable rate of 1.5 MB/S and the maximum readable rate of 2.45 MB/S, and offers high reliability with an erroneous deletion preventing switch.

As described above, the camera-integrated portable telephone MS3 is arranged to insert such a removable memory stick 523 therein, so that data can be shared with other electronic devices via the memory stick 523.

Figure 62:
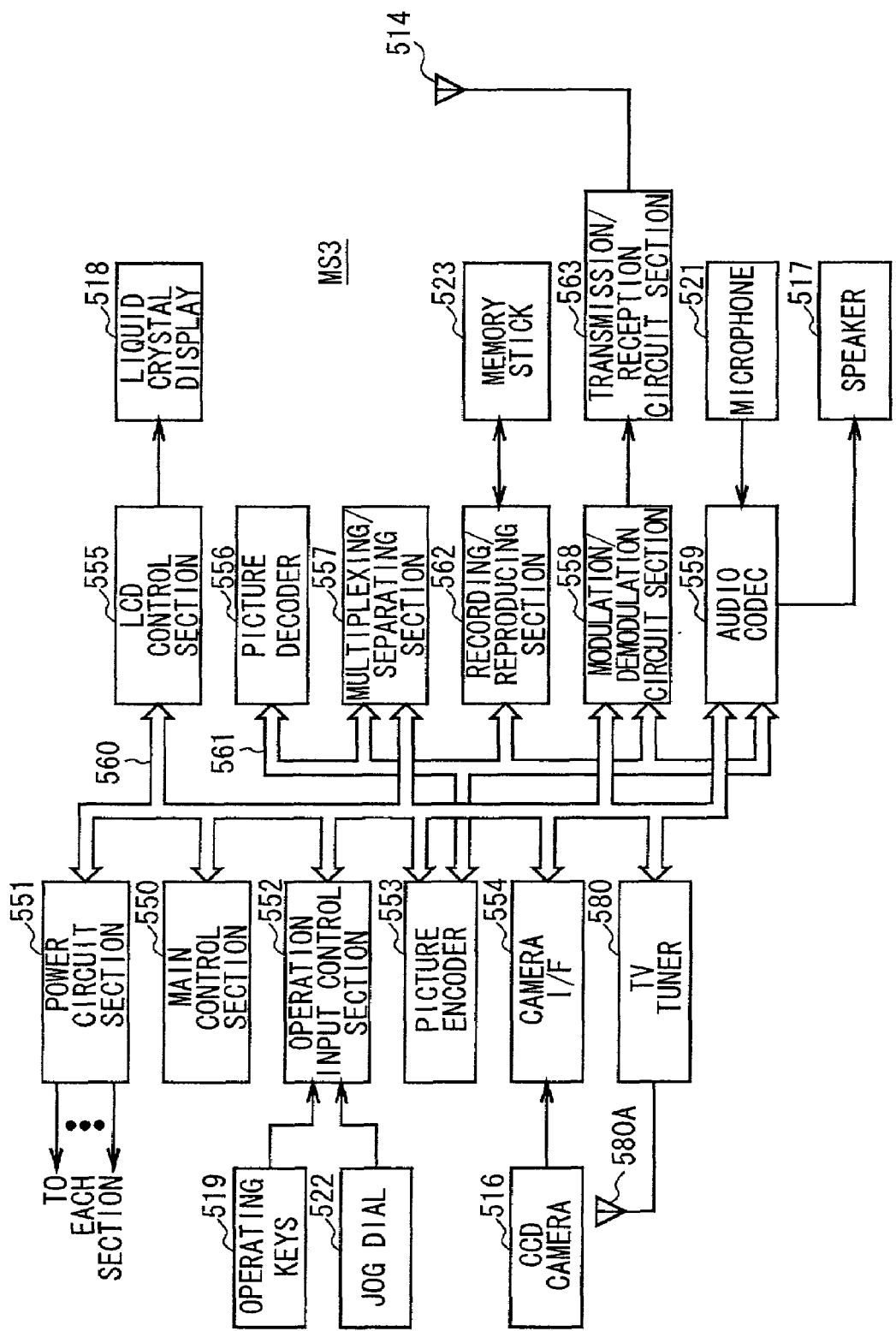
FIG. 62 is a block diagram showing the circuit arrangement of the camera-integrated digital portable telephone.

As shown in FIG. 62, in the camera-integrated digital portable telephone MS3, a power circuit section 511, an operation input control section 552, a picture encoder 553, a camera interface section 554, a liquid crystal display (LCD) control section 555, a picture decoder 556, a multiplexing/separating section 557, a recording/reproducing section 562, a modulation/demodulation circuit section 558, and an audio CODEC 559 are connected to a main control section 550 for generally controlling each section of the display part 512 and main body 513, with a main bus 560, and the picture encoder 553, picture decoder 556, multiplexing/separating section 557, modulation/demodulation circuit section 558 and audio CODEC 559 are connected to each other with a synchronization bus 561.

When the end/power key is turned ON by the content provider, the power circuit section 551 supplies power to each section from the battery pack to active the camera-integrated digital portable telephone MS3.

The camera-integrated digital portable telephone MS3 converts an audio signal collected with the microphone 521 in a voice communication mode, into digital audio data with the audio CODEC 559, under the control of the main control section 550 composed of the CPU, ROM, RAM and so on, performs a spread spectrum processing on the digital audio data with the modulation/demodulation circuit section 558, performs the digital/analog conversion processing and frequency conversion processing with the transmission/reception circuit section 563, and then transmits the resultant via the antenna 514.

In addition, in the camera-integrated digital portable telephone MS3, a reception signal received via the antenna 14 in a voice communication mode is subjected to amplification, the frequency conversion processing and analog/digital conversion processing, the despread spectrum processing at the modulation/demodulation circuit section 558, and the conversion to an analog audio signal at the audio CODEC 559, and then the resultant is output via the speaker 517.

When an e-mail is transmitted in a data communication mode, the camera-integrated digital portable telephone MS3 transmits the text data of the e-mail entered by operating the operating keys 519 and jog dial 522, to the main control section 550 via the operation input control section 552.

The main control section 550 performs on the text data the spread spectrum processing with the modulation/demodulation circuit section 558, the digital/analog conversion processing and frequency conversion processing with the transmission/reception circuit section 563 and then transmits the resultant to the base station CS3 (FIG. 59) via the antenna 514.

When an e-mail is received in a data communication mode, on the other hand, the camera-integrated digital portable telephone MS3 performs the despread spectrum processing on the reception signal received from the base station CS3 via the antenna 514, with the modulation/demodulation circuit section 558 to restore the original text data, and displays the e-mail on the liquid crystal display 518 via the LCD control section 555.

Then the camera-integrated digital portable telephone MS3 can record the e-mail received, in the memory stick 523 via the recording/reproducing section 562 in response to content provider's operations.

When picture data is transmitted in the data communication mode, on the other hand, the camera-integrated digital portable telephone MS3 gives the picture data captured with the CCD camera 516 to the picture encoder 553 via the camera interface section 554.

In this connection, when picture data is not transmitted, the camera-integrated digital portable telephone MS3 can directly display the picture data captured with the CCD camera 516, on the liquid crystal display 518 via the camera interface section 554 and LCD control section 555.

The picture encoder 553 converts the picture data given from the CCD camera 516, to coded picture data through the compression coding by a prescribed coding method such as moving picture experts group (MPEG)2 or MPEG4, for example, and transmits the data to the multiplexing/separating section 557.

At this time, the camera-integrated digital portable telephone MS3 transmits voice collected with the microphone 521 during the capture with the CCD camera, to the multiplexing/separating section 557 via the audio CODEC 559 as digital audio data.

The multiplexing/separating section 557 multiplexes the coded picture data supplied from the picture encoder 553 and the audio data supplied from the audio CODEC 559 by a prescribed method, and performs on the resultant multiplexed data the spread spectrum processing at the modulation/demodulation circuit section 558, performs the digital/analog conversion processing and frequency conversion processing at the transmission/reception circuit section 563 and then transmits the resultant via the antenna 514.

When the data of a motion picture file linked to a simple homepage, for example, is received in the data communication mode, on the other hand, the camera-integrated digital portable telephone MS3 performs the despread spectrum processing on the received signal received from the base station CS3 via the antenna 514, at the modulation/demodulation circuit section 558, and transmits the resultant multiplexed data to the multiplexing/separating section 557.

The multiplexing/separating section 557 separates the multiplexed data into coded picture data and audio data, and gives the coded picture data to the picture decoder 556 and the audio data to the audio CODEC 559, via the synchronization bus 561.

The picture decoder 556 creates reproduction motion picture data by decoding the coded picture data by a decoding method corresponding to the prescribed encoding method such as MPEG2 or MPEG4, and gives it to the liquid crystal display 518 via the LCD control section 555, thereby displaying the motion picture data included in the motion picture file linked to the simple homepage.

At this time, the audio CODEC 559 simultaneously converts the audio data into the analog audio signal and then supplies the signal to the speaker 517, thereby reproducing audio data included in the motion picture file linked to the simple homepage.

In this case, similarly to the case of the e-mail, the camera-integrated digital portable telephone MS3 can record data linked to the received simple homepage, into the memory stick 523 via the recording/reproducing section 562 in response to user's operations.

In addition to the above arrangement, the camera-integrated digital portable telephone MS3 stores various application programs and so on similar to those of the aforementioned embodiment, in the ROM of the main control section 550, and gets an access to the live casting server 150 (FIG. 15) of the server reservation control center 5 based on the application programs, so as to perform the aforementioned member registration, live reservation including reconfirmation, automatic adjustment for allowing only transmittable transmission rates to be selected, parallel transmission of live content at selected plural transmission rates to the streaming server 8, with the live casting server 150.

Therefore, the camera-integrated digital portable telephone MS3 establishes a transmission line with the streaming server 8 by automatically reading the reservation setting information file 184 stored in the live reservation, at the time of live distribution, and then multistream-distributes the live content captured with the CCD camera 516, to the client PCs 7A, 7B and 7C via the streaming server 8 at plural transmission rates.

Furthermore, the aforementioned embodiment has described the case of constructing the server reservation control center 5 as a connection circuit control unit by: a network interface as a circuit-type information receiving means for receiving the type of circuit, the cable television network 3B or the ADSL network 3C, which are typical circuits which can connect the user PC, which is a user terminal, and the Internet 2, as the reservation demand information file from the user PC 4; and a live casting server 150 as a connection circuit control means for recognizing that the user PC 4 can connect to the Internet 2 via the cable television network 3B or the ADSL network 3C, based on the reservation demand information file, informing the user PC 4 of the circuits which can be used by the user PC 4: a dedicated server connection network 6 which is a previously provided dedicated circuit between the user PC 4 and the streaming server 8, and the cable television network 3B, and ADSL network 3C which are general circuits, as the reservation setting information file 184, to set the dedicated server connection network 6, cable television network 3B, or ADSL network 3C selectable in the user PC 4. This invention, however, is not limited to this and the connection circuit control unit can be constructed by another kind of circuit-type information receiving means and connection circuit control means.

Furthermore, the aforementioned embodiment has described the case of constructing the server reservation control center by: the network interface 154 as a receiving means for receiving the type of circuit, the cable network 3B or ADSL network 3C, which can connect the user PC 4 as a user terminal and the Internet 2 as a network, as the reservation demand information file including the circuit-type information, from the user PC 4; and the live casting server 150 as a number-of-streams control means for limiting the number of streams by which the user PC 4 performs the parallel transmission of a plurality of live content at different transmission rates to the streaming server 8 serving as a content distribution control server, by the Internet connection via the cable television network 3B or ADSL network 3C, based on the reservation demand information file. This invention is not limited to this and the server reservation control center 5 can be constructed by another kind of receiving means and number-of-streams control means.

Furthermore, the aforementioned embodiment has described the case of constructing the user PC 4 as a content transmission device by: a network interface 18 as a transmitting means for transmitting the type of circuit, the cable television network 3B or ADSL network 3C, which are connectable circuits with the Internet 2 as a network, to the live casting server 150 as a content distribution control server as the reservation demand information file; a network interface 18 as a receiving means for receiving the number of streams limited based on the reservation demand information file by the live casting server 150, from the live casting server 150 as the reservation setting information file 184, the number of streams being used to perform the parallel transmission of live content to the streaming server 8 by the Internet connection via the cable television network 3B or ADSL network 3C; and the CPU 10 as a number-of-streams automatic setting means for automatically limiting and setting the number of streams to be used to perform the parallel transmission to the streaming server 150, on the basis of the reservation setting information file 184 received from the live casting server 150. The present invention is not limited to this and the content transmission device can be constructed by another kind of transmitting means, receiving means and number-of-streams automatic setting means.

According to the aforementioned configuration, the content distribution control server limits according to the type of circuit the number of streams by which the user terminal performs the parallel transmission of a plurality of content at different transmission rates, which can previously prevent the user terminal from performing the parallel transmission of content using the untransmittable number of streams, thus reliably executing the transmission of content according to the communication environment of the user terminal.

Further, the content transmission device receives the setting information indicating the number of streams limited according to the type of circuit by the content distribution control server, and automatically limits and sets the number of streams for the parallel transmission to the content distribution control server, based on the number of streams, which can previously prevent the content transmission device from performing the parallel transmission of content using the untransmittable number of streams, thus making it possible to reliably executing the transmission processing of content.

While there has been described in connection with the preferred embodiment of the invention, it will be obvious to those skilled in the art that various changes and modifications may be aimed, therefore, to cover in the appended claims all such changes and modifications as fall within the true spirit and scope of the invention.

The invention claimed is:

1. A content distribution system comprising
a user terminal; and
a content distribution control server for distributing content received from said user terminal to clients over a network, wherein:
said content distributing user terminal transmits a kind of transmission channel which can connect said content distributing user terminal and said network, as transmission channel-type information to said content distribution control server; and
said content distribution control server limits the number of streams according to said transmission channel-type information, said number of streams being used when said content distributing user terminal performs the parallel transmission of a plurality of said content at different transmission rates to the content distribution control server via said circuit.

2. The content distribution system according to claim 1, wherein:
said user terminal transmits said transmission channel-type information including the contents of service desired by a user in addition to said kind of transmission channel, to said content distribution control server; and
said content distribution control server limits said number of streams according to said kind of transmission channel and said contents of service.

3. The content distribution system according to claim 1, wherein
said content distribution control server notifies said user terminal of said number of streams, the maximum band of said circuit and the transmission rate for each stream as setting information.

4. The content distribution system according to claim 3, wherein
said content distribution control server notifies said user terminal of a recommended value of the transmission rate of said each stream as setting information.

5. The content distribution system according to claim 1, wherein:
said content distribution control server notifies said user terminal of a content distribution control server address, the band of said content distribution control server and the telephone number of said dedicated circuit as minimum essential setting information; and
said user terminal displays a graphical user interface (GUI) screen showing items required to be set by a user, based on said setting information.

6. A content distribution control server, connected to a user terminal via a network, for distributing content received from said user terminal, to clients, said content distribution control server comprising:
receiving means for receiving a kind of transmission channel which can connect said content distributing user terminal and said network, as transmission channel-type information from said content distributing user terminal;

number-of-streams control means for limiting the number of streams according to said transmission channel-type information, said number of streams being used when said content distributing user terminal performs the parallel transmission of a plurality of said content at different transmission rates to said content distribution control server via said circuit.

7. The content distribution control server according to claim 6, wherein:

said receiving means receives said transmission channel-type information including the contents of service desired by a user in addition to said kind of transmission channel, from said user terminal; and said number-of-streams control means limits said number of streams according to said kind of transmission channel and said contents of service.

8. The content distribution control server according to claim 6, wherein said number-of-streams control means notifies said user terminal of said number of streams, the maximum band of said circuit and the transmission rate of each stream as setting information.

9. The content distribution control server according to claim 8, wherein said number-of-streams control means notifies said user terminal of a recommended value of the transmission rate of said each stream as said setting information.

10. The content distribution control server according to claim 6, wherein said number-of-streams control means notifies said user terminal of a content distribution control server address, the band of said content distribution control server and the telephone number of said dedicated circuit as minimum essential setting information, and makes said user terminal display a GUI screen showing items required to be set by a user, based on said setting information.

11. A content transmission processing control method for controlling transmission processing performed by a user terminal to transmit content via a network, from the outside, said content transmission processing control method, comprising:

a receiving step of receiving a kind of transmission channel which can connect said content distributing user terminal and said network, as transmission channel-type information from said content distributing user terminal; and a number-of-streams control step of limiting the number of streams according to said transmission channel-type information, said number of streams being used when said content distributing user terminal performs the parallel transmission of a plurality of content at different transmission rates via said circuit.

12. The content transmission processing control method according to claim 11, wherein:

said receiving step is to receive said transmission channel-type information including the contents of service desired by a user in addition to said kind of transmission channel, from the user terminal; and said number-of-streams control step is to limit said number of streams according to said kind of transmission channel and said contents of service.

13. The content transmission processing control method according to claim 11, wherein said number-of-streams control step is to notify said user terminal of the number of streams, the maximum band of said circuit and the transmission rate of each stream, as setting information.

14. The content transmission processing control method according to claim 13, wherein said number-of-streams control step is to notify said user terminal of a recommended value of the transmission rate of said each stream as said setting information.

15. The content transmission processing control method according to claim 11, wherein said number-of-streams control step is to notify said user terminal of a content distribution control server address, the band of said content distribution control server, and the telephone number of said dedicated circuit as minimum essential setting information, and to make said user terminal display a GUI screen showing items required to be set by a user, based on said setting information.

16. A computer readable medium including a content transmission processing control program for causing a computer to distribute content received from a user terminal via a network to a client, comprising:

a receiving step of receiving a kind of transmission channel which can connect said content distributing user terminal and said network, as circuit-type information from said content distributing user terminal; and a number-of-streams control step of limiting the number of streams according to said transmission channel-type information, said number of streams being used when said content distributing user terminal performs the parallel transmission of a plurality of said content at plural transmission rates via said circuit to said content distribution control server.

17. The computer readable medium according to claim 16, wherein:

said receiving step is to receive said transmission channel-type information including the contents of service desired by a user in addition to said kind of transmission channel from said user terminal; and said number-of-streams control step is to limit the number of streams according to said kind of transmission channel and said contents of service.

18. The computer readable medium according to claim 16, wherein said number-of-streams control step is to notify said user terminal of said number of streams, the maximum band of said circuit, and the transmission rate of each stream as setting information.

19. The computer readable medium according to claim 18, wherein said number-of-streams control step is to notify said user terminal of a recommended value of the transmission rate of said each stream as said setting information.

20. The computer readable medium according to claim 16, wherein said number-of-streams control step is to notify said user terminal of a content distribution control server address, the band of said content distribution control server and the telephone number of said dedicated circuit as minimum essential setting information, and to make said user terminal display a GUI screen showing items required to be set by a user, based on said setting information.

21. A computer readable medium including a content transmission processing control program for causing a content distribution control server to perform a content transmission processing control method comprising:
- a receiving step such that said content distribution control server for distributing content received from a content distributing user terminal connected via a network, to clients, receives a kind of transmission channel which can connect said content distributing user terminal and said network, as transmission channel-type information from said content distributing user terminal; and
- a number-of-streams control step limiting the number of streams according to said transmission channel-type information, said number of streams being used when said content distributing user terminal performs the parallel transmission of a plurality of said content at different transmission rates via said circuit.

22. The computer readable medium according to claim 21, wherein:
said receiving step is to receive said transmission channel-type information including the contents of service desired by a user in addition to said kind of transmission channel, from said user terminal; and
said number-of-streams control step is to limit said number of streams according to said kind of transmission channel and said contents of service.

23. The computer readable medium according to claim 21, wherein
said number-of-streams control step is to notify said user terminal of said number of streams, the maximum band of said circuit and the transmission rate of each stream as setting information.

24. The computer readable medium according to claim 23, wherein
said number-of-streams control step is to notify said user terminal of a recommended value of the transmission rate of said each stream as said setting information.

25. The computer readable medium according to claim 21, wherein
said number-of-streams control step is to notify said user terminal of a content distribution control server address, the band of said content distribution control server, and the telephone number of said dedicated circuit as minimum essential setting information, and to make said user terminal display a GUI screen showing items required to be set by a user, based on said setting information.

26. A content distribution system constructed by connecting a content transmission device for providing content and a content distribution control server for distributing said content received from said content transmission device to clients, to each other via a network, said content distribution system wherein:
said content distribution control server receives a kind of transmission channel which can connect said content transmission device and said network, as transmission channel-type information from said content transmission device, limits the number of streams according to said transmission channel-type information, and notifies said content transmission device of said limited number of streams as setting information, said number of streams being used when said content transmission device performs the parallel transmission of a plurality of said content at different transmission rates via said circuit; and
said content transmission device automatically limits and sets said number of streams to be used to perform the parallel transmission to said content distribution control server, based on said setting information.

27. The content distribution system according to claim 26, wherein
said content transmission device automatically sets the transmission rate of each stream to be used to perform the parallel transmission of said content to said content distribution control server, based on said setting information including the maximum band of said circuit and the transmission rate of said each stream to be used to transmit said content.

28. The content distribution system according to claim 27, wherein
said content transmission device automatically sets the transmission rate of said each stream corresponding to a recommended value based on said setting information including the recommended value of the transmission rate of said each stream.

29. The content distribution system according to claim 26, wherein
said content transmission device automatically takes in said setting information from said content distribution control server, and displays a GUI screen where the transmission rate of each stream of said number of streams is selectable, based on said setting information.

30. The content distribution system according to claim 26, wherein
said content transmission device receives a content distribution control server address, the band of said content distribution control server and the telephone number of said circuit as minimum essential setting information from said content distribution control server, and displays a GUI screen showing items required to be set by a user, based on said setting information.

31. A content transmission device for transmitting content to a content distribution control server connected via a network, in order to distribute said content to clients via said content distribution control server, said content transmission device comprising:
transmitting means for transmitting a kind of transmission channel which can connect said content transmission device and said network, to said content distribution control server as transmission channel-type information;
receiving means for receiving the number of streams as setting information from said content distribution control server, said number of streams limited by said content distribution control server according to said transmission channel-type information such that said content transmission device performs the parallel transmission of said content to said content distribution server via said circuit; and
number-of-streams automatic setting means for automatically limiting and setting said number of streams to be used to perform the parallel transmission to said content distribution control server, based on said setting information.

32. The content transmission device according to claim 31, wherein:
said receiving means receives said setting information including the maximum band of said circuit and the transmission rate of each stream to be used to transmit said content; and
said number-of-streams automatic setting means automatically sets based on said setting information the transmission rate of said each stream to be used to perform the parallel transmission of said content to said content distribution control server.

33. The content transmission device according to claim 32, wherein:
said receiving means receives said setting information including a recommended value of the transmission rate of said each stream; and
said number-of-streams automatic setting means automatically sets the transmission rate of said each stream corresponding to said recommended value, based on said setting information.

34. The content transmission device according to claim 31, wherein:
said receiving means automatically takes in said setting information from said content distribution control server; and
said number-of-streams automatic setting means displays a GUI screen where the transmission rate of said each stream of said number of streams is selectable, based on said setting information.

35. The content transmission device according to claim 31, wherein:
said receiving means receives a content distribution control server address, the band of said content distribution control server and the telephone number of said circuit, from said content distribution control server as said setting information minimum essential; and
said number-of-streams automatic setting means displays a GUI screen showing items required to be set by a user, based on said setting information.

36. A content transmission method for transmitting content to a content distribution control server connected via a network, in order to distribute said content to clients via said content distribution control server, said content transmission method comprising:
a transmitting step of transmitting a kind of transmission channel which can connect said content transmission device and said network, as transmission channel-type information to said content distribution control server;
a receiving step of receiving the number of streams as setting information from said content distribution control server, said number of streams limited according to said transmission channel-type information by said content distribution control server such that said content transmission device performs the parallel transmission of said content to said content distribution control server via said circuit; and
a number-of-streams automatic setting step of automatically limiting and setting said number of streams based on said setting information, said number of streams being used to perform the parallel transmission to said content distribution control server.

37. The content transmission method according to claim 36, wherein:
said receiving step is to receive said setting information including the maximum band of said circuit and the transmission rate of each stream to be used to transmit said content; and
said number-of-streams automatic setting step is to automatically set based on said setting information the transmission rate of said each stream to be used to perform the parallel transmission of said content to said content distribution control server.

38. The content transmission method according to claim 37, wherein:
said receiving step is to receive said setting information including a recommended value of the transmission rate of said each stream; and
said number-of-streams automatic setting step is to automatically set the transmission rate of said each stream corresponding to said recommended value based on said setting information.

39. The content transmission method according to claim 36, wherein:
said receiving step is to automatically take in said setting information from said content distribution control server; and
said number-of-streams automatic setting step is to display a GUI screen where the transmission rate of said each stream of said number of streams is selectable, based on said setting information.

40. The content transmission method according to claim 36, wherein:
said receiving step is to receive a content distribution control server address, the band of said content distribution control server and the telephone number of said circuit from said content distribution control server as said setting information minimum essential; and
said number-of-streams automatic setting step is to display a GUI screen showing items required to be set by a user, based on said setting information.

41. A computer readable medium including a content transmission control program for causing a computer to perform a method comprising:
a transmitting step of transmitting a kind of transmission channel connectable to a network, as transmission channel-type information to a content distribution control server;
a receiving step of receiving the number of streams from said content distribution control server, said number of streams limited according to said transmission channel-type information by said content distribution control server to perform the parallel transmission of said content to said content distribution control server via said circuit; and
a number-of-streams automatic setting step of automatically limiting and setting said number of streams to be used to perform the parallel transmission to said content distribution control server, based on said setting information.

42. The computer readable medium according to claim 41, wherein:
said receiving step is to receive said setting information including the maximum band of said circuit and the transmission rate of each stream to be used to transmit said content; and
said number-of-streams automatic setting step is to automatically set the transmission rate of said each stream to be used to perform the parallel transmission of said content to said content distribution control server, based on said setting information.

43. The computer readable medium according to claim 42, wherein:
said receiving step is to receive said setting information including a recommended value of the transmission rate of said each stream; and
said number-of-streams automatic setting step is to automatically set the transmission rate of said each stream corresponding to said recommended value based on said setting information.

44. The computer readable medium according to claim 41, wherein:
said receiving step is to automatically take in said setting information from said content distribution control server; and said number-of-streams automatic setting step is to display a GUI screen where the transmission rate of said each stream of said number of streams is selectable, based on said setting information.

45. The computer readable medium according to claim 41, wherein:
said receiving step is to receive a content distribution control server address, the band of said content distribution control server and the telephone number of said circuit from said content distribution control server as said setting information minimum essential; and
said number-of-streams automatic setting step is to display a GUI screen showing items required to be set by a user, based on said setting information.

46. A computer readable medium for causing an information processing device to execute a content transmission control program comprising:
a transmitting step of transmitting a kind of transmission channel connectable to a network, to a content distribution control server as transmission channel-type information;
a receiving step of receiving the number of streams from said content distribution control server, said number of streams limited according to said transmission channel-type information by said content distribution control server to perform the parallel transmission of said content to said content distribution control server via said circuit; and
a number-of-streams automatic setting step of automatically limiting and setting said number of streams to be used to perform the parallel transmission to said content distribution control server, based on said setting information.

47. The computer readable medium according to claim 46, wherein:
said receiving step is to receive said setting information including the maximum band of said circuit and the transmission rate of each stream to be used to transmit said content; and
said number-of-streams automatic setting step is to automatically set the transmission rate of said each stream to be used to perform the parallel transmission of said content to said content distribution control server, based on said setting information.

48. The computer readable medium according to claim 47, wherein:
said receiving step is to receive said setting information including a recommended band of the transmission rate of said each stream; and
said number-of-streams automatic setting step is to automatically set the transmission rate of said each stream corresponding to said recommended value, based on said setting information.

49. The computer readable medium according to claim 46, wherein:
said receiving step is to automatically take in said setting information from said content distribution control server; and
said number-of-streams automatic setting step is to display a GUI screen where the transmission rate of said each stream of said number of streams is selectable, based on said setting information.

50. The computer readable medium according to claim 46, wherein:
said receiving step is to receive a content distribution control server address, the band of said content distribution control server and the telephone number of said circuit from said content distribution control server, as said setting information minimum essential; and
said number-of-streams automatic setting step is to display a GUI screen showing items required to be set by a user, based on said setting information.

* * * * *